United States Patent [19]
DeLorme et al.

[11] Patent Number: 5,848,373
[45] Date of Patent: Dec. 8, 1998

[54] COMPUTER AIDED MAP LOCATION SYSTEM

[75] Inventors: David M. DeLorme, Cumberland; Keith A. Gray, Dresden, both of Me.

[73] Assignee: DeLorme Publishing Company, Yarmoath, Me.

[21] Appl. No.: 896,712

[22] Filed: Jul. 18, 1997

Related U.S. Application Data

[63] Continuation of Ser. No. 265,327, Jun. 24, 1994, abandoned.

[51] Int. Cl.[6] .............................. G06F 165/00; G01S 5/00
[52] U.S. Cl. ......................... 701/200; 701/208; 701/212; 340/998; 340/990; 340/995; 342/357
[58] Field of Search .................................... 701/207, 208, 701/210, 212, 216, 217, 300; 340/998, 990, 995; 342/357, 457

[56] References Cited

U.S. PATENT DOCUMENTS

| | | | |
|---|---|---|---|
| 4,543,572 | 9/1985 | Tanaka et al. | 340/723 |
| 4,675,676 | 6/1987 | Takanabe et al. | 340/995 |
| 4,689,747 | 8/1987 | Kurose et al. | 364/449 |
| 4,791,572 | 12/1988 | Green, III et al. | 364/449 |
| 4,796,189 | 1/1989 | Nakayama et al. | 364/449 |
| 4,807,157 | 2/1989 | Fukushima et al. | 364/521 |
| 4,862,374 | 8/1989 | Ziemann | 364/449 |
| 4,891,761 | 1/1990 | Gray et al. | 364/452 |
| 4,972,319 | 11/1990 | DeLorme | 364/419 |
| 4,984,168 | 1/1991 | Neukrichner | 364/449 |
| 4,998,752 | 3/1991 | Judson | 283/34 |
| 5,030,117 | 7/1991 | DeLorme | 434/130 |
| 5,059,970 | 10/1991 | Raubenheimer et al. | 342/451 |
| 5,067,081 | 11/1991 | Person | 364/444 |
| 5,068,654 | 11/1991 | Husher | 340/903 |
| 5,089,816 | 2/1992 | Holmes, Jr. | 340/995 |
| 5,204,817 | 4/1993 | Yoshida | 364/449 |
| 5,212,643 | 5/1993 | Yoshida | 701/212 |
| 5,214,757 | 5/1993 | Mauney et al. | 395/161 |
| 5,268,844 | 12/1993 | Carver et al. | 364/443 |
| 5,289,195 | 2/1994 | Inoue | 342/457 |
| 5,337,242 | 8/1994 | Yamamoto et al. | 364/449 |
| 5,359,527 | 10/1994 | Takanabe et al. | 364/449 |
| 5,396,254 | 3/1995 | Toshiyuki | 342/357 |
| 5,422,814 | 6/1995 | Sprague et al. | 364/449 |
| 5,475,387 | 12/1995 | Matsumoto | 340/990 |
| 5,559,511 | 9/1996 | Ito et al. | 701/201 |

*Primary Examiner*—Tan Q. Nguyen
*Attorney, Agent, or Firm*—Pierce Atwood

[57] ABSTRACT

A computer aided map location system (CAMLS) provides correlation and coordination of spatially related data between a computer (PDA/PC/EC) and a set of printed maps typically printed on paper depicting surface features at desired levels of detail. A first set of constant scale printed maps substantially coincides with or is overprinted with equal area grid quadrangles of a first scale grid. The first scale grid quadrangles are identified by a first set of unique names. The PDA/PC/EC has a computer display or other computer output, a first database, and display subsystem. The first database includes the first set of unique names of the grid quadrangles of the first scale grid. The boundary lines of the respective first scale grid quadrangles are identified in the first database by latitude and longitude location. The display subsystem causes the display of a selected grid quadrangle or gridname on the PDA/PC/EC display in response to a user query. The displayed grid quadrangle or gridname is correlated with a grid quadrangle of a printed map from the first set of printed maps. The PDA/PC/EC may have access to a second database or multiple databases of latitude and longitude locatable objects (loc/objects) for display on selected grid quadrangles. Alternatively or in addition the PDA/PC/EC may incorporate a user location system such as a GPS location system for displaying the location and route of the CAMLS user on the display. Multiple level scales of grids and corresponding multiple sets of maps at the different scales are available. Communications links are provided between CAMLS computers and CAMLS users in various combinations.

19 Claims, 18 Drawing Sheets

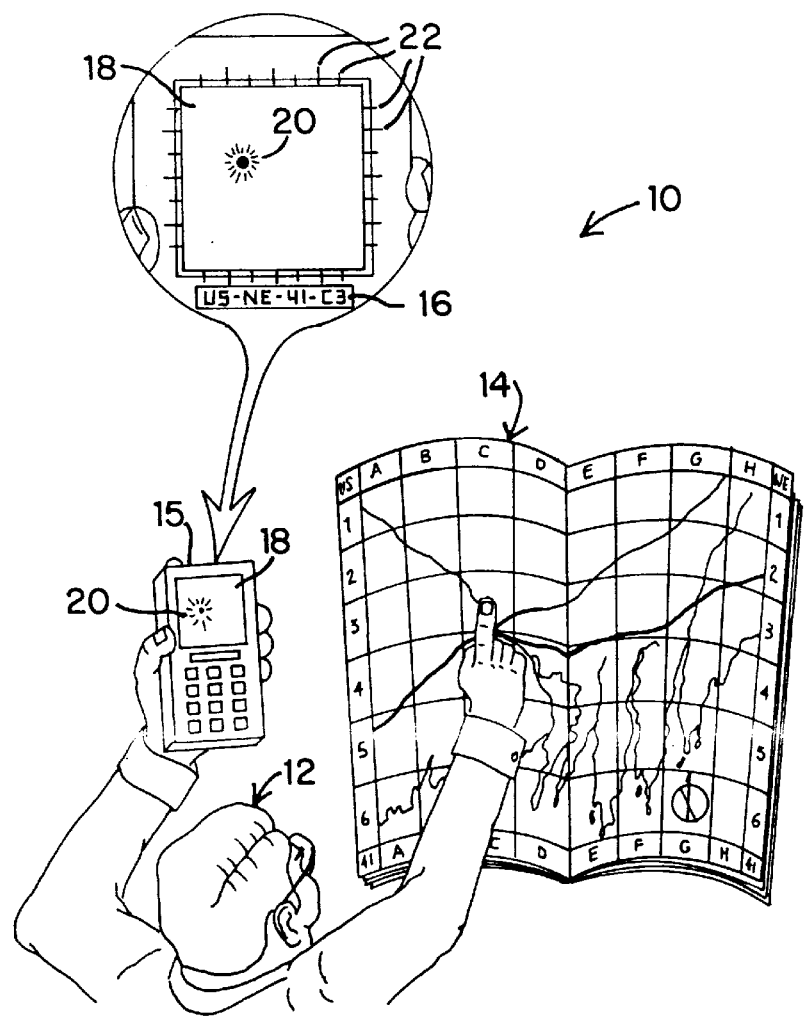
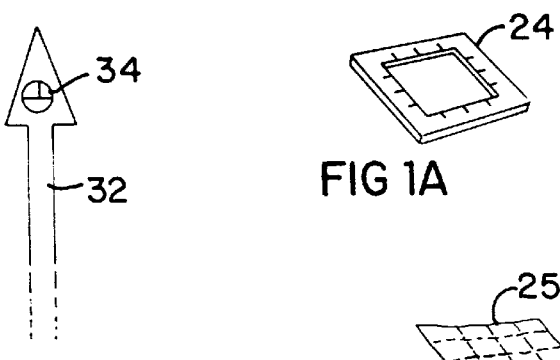
FIG 1
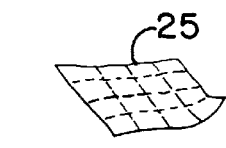
FIG 1A
FIG 1B
FIG 1D
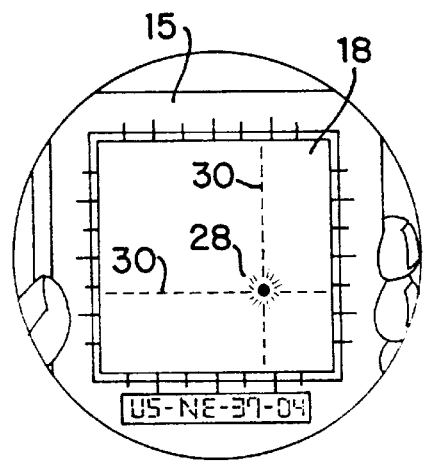
FIG 1C

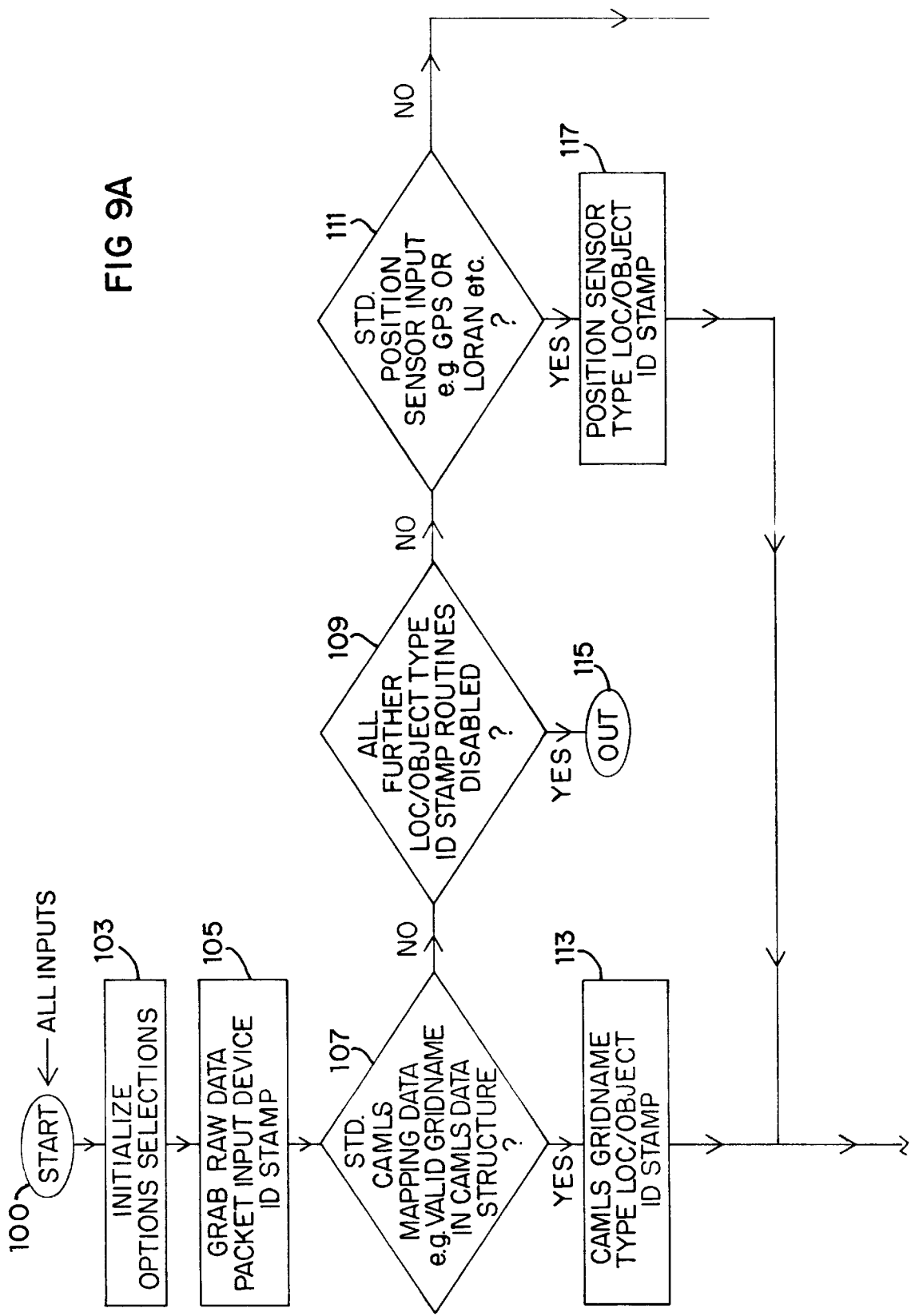

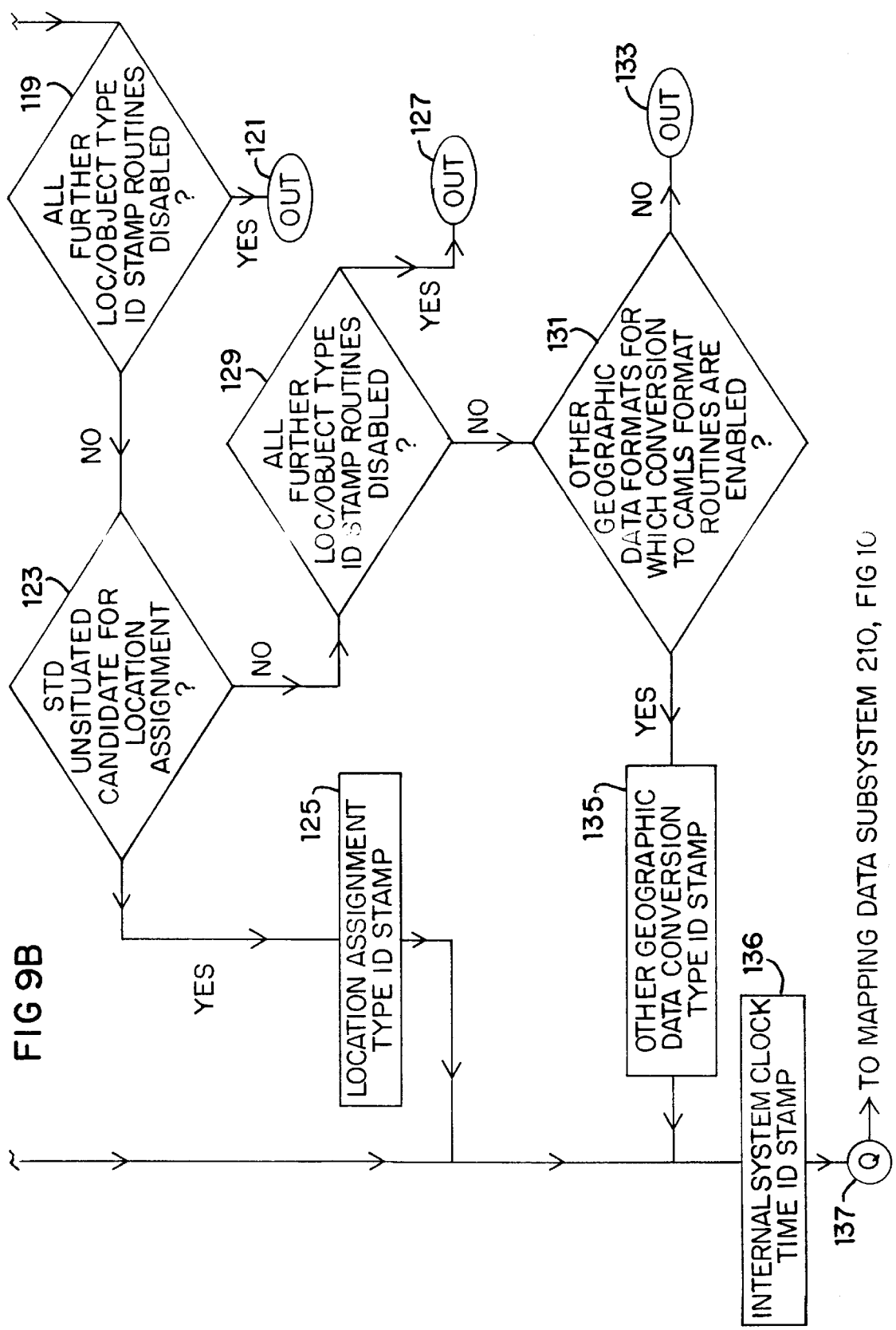

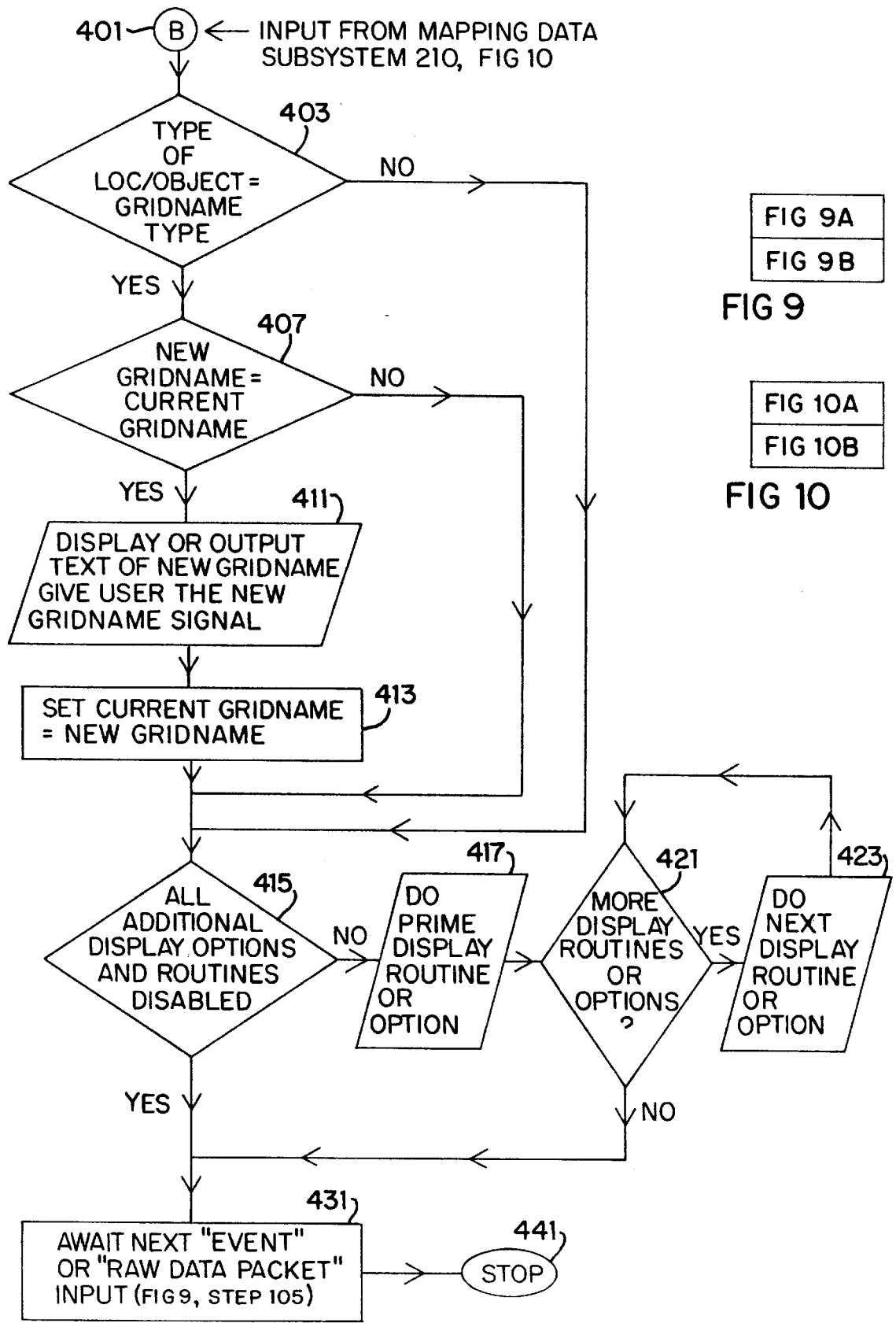

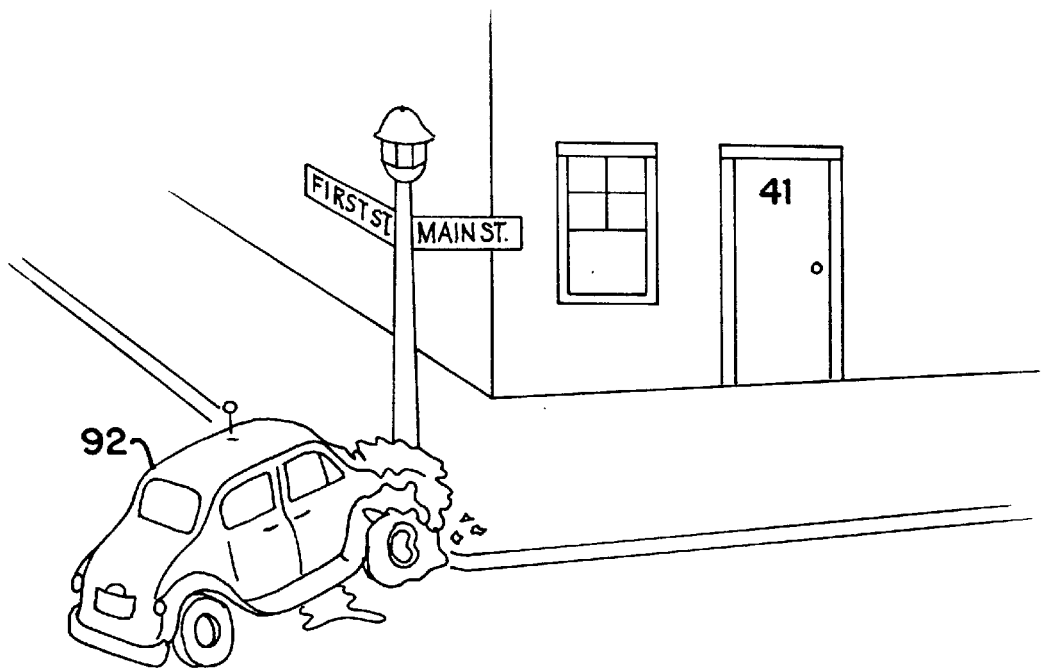
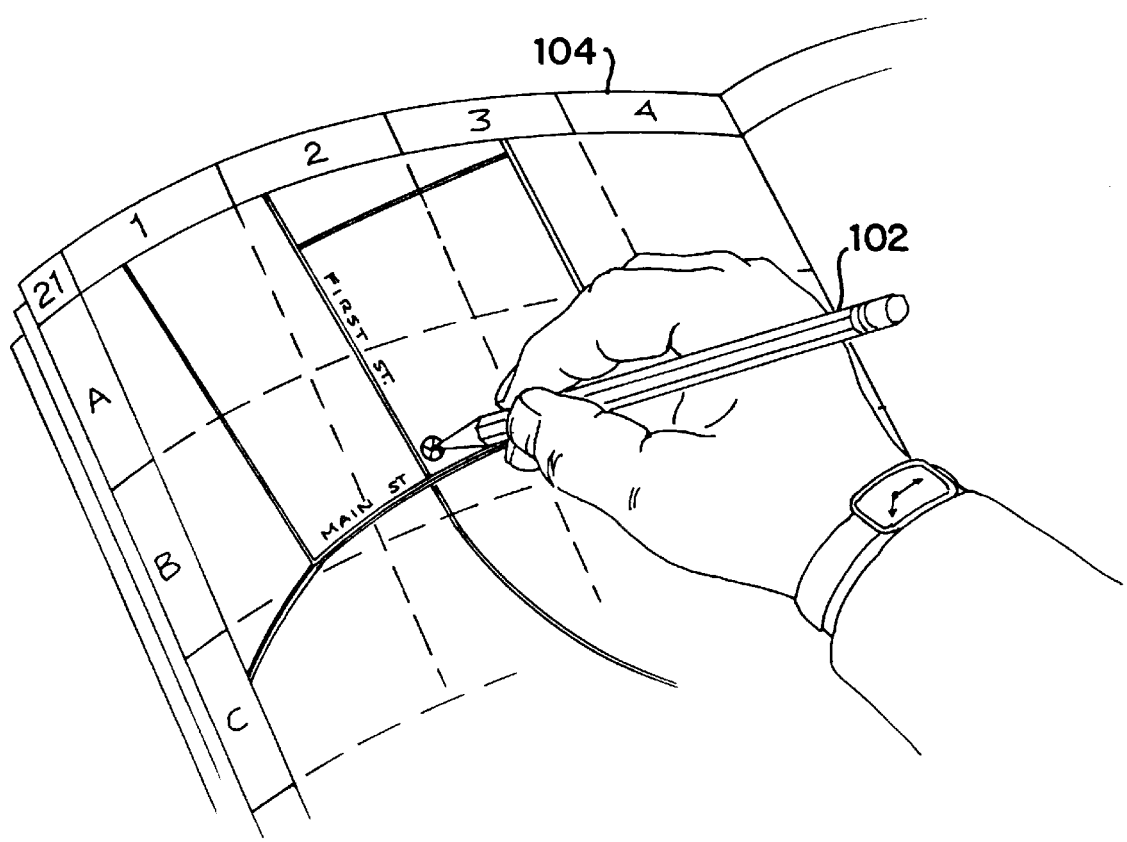
FIG 14E

COMPUTER AIDED MAP LOCATION SYSTEM

This is a continuation of application Ser. No. 265,327, filed Jun. 24, 1994, now abandoned.

TECHNICAL FIELD

This invention relates to a new system for correlation and coordination of spatially related data between digital electronic media such as transitory computer displays or other computer outputs, and a variety of graphic and text media such as printed maps and other related "fixed" graphic and text media. The invention also provides for communication of the spatially related data between computer systems and between users in a variety of contexts and combinations. The invention has broad application for visual, intuitive, and other sensory correlation by the user of spatially related data such as location data for locatable objects between a user readable transitory computer display and other computer outputs, and a corresponding user readable printed map or other fixed media presentation of the same spatial area. The invention provides "intelligent" printed maps and other intelligent fixed media maps by incorporation of a digital electronic data dimension for data processing, computation, and communication.

The invention also provides a novel grid system for user correlation of location data and other specified data between the diverse media. The spatially or geographically related data are correlated and coordinated internally by a computer according to the present invention with reference to a common geographical coordinate system such as the standard latitude/longitude location coordinate system. The spatially related data is correlated and coordinated intuitively by the user between human readable forms of the map using the new grid system and uniquely named grid quadrangles of constant scale. The invention permits correlation, coordination and communication of diverse data such as location data, geographical and GIS data, related text and alphanumeric data, mapping data, and visual, auditory, and other sensory data. Data may be derived from any state of the art available inputs to the system either local or remote, internal or external, and the data correlated and coordinated in diverse media according to the invention can be made available in any state of the art outputs and can be communicated to any location.

In a preferred form, the invention relates to a new computer aided map location system (CAMLS) using a coacting personal digital assistant (PDA) or other digital or electronic computer (EC) such as a digital microprocessor based personal computer (PC), workstation, or mainframe, and a set of detailed printed maps depicting surface features or mappable features for a specified geographical area, typically a set of printed paper maps. The PDA/PC/EC can be either stationary or mobile. The PDA/PC/EC permits generalized display of grid quadrangles of a constant scale grid system representing a specified geographical area and any of a selected group of latitude/longitude located objects. The geographical coordinate system located objects include user location, geographical destinations, and other selected geographical objects, from a set of databases stored in PDA/PC/EC memory devices or accessible through wired and wireless data communications links. The geographical objects are displayed on one or more generalized grid quadrangles or tiles of the grid system.

The grid quadrangles coincide in geographical area with respective printed maps or grid quadrangles overlying the printed maps for correlation of location of geographical objects on the displayed grid quadrangle and corresponding printed map. For example the locations of displayed geographical objects on a user readable transitory computer display are correlated with surface features or mappable features depicted on the corresponding user readable printed map using the grid system. The same constant scale grid systems overlie and coordinate all the diverse media presentations of the same geographical areas. The databases of locatable objects and related information may include for example restaurants, hotels/motels, cities, municipalities, settlements, routes, transportation services such as airports and ferries, parks, recreation areas, campgrounds, hospitals, zoos, museums, tourist and sightseeing attractions, and other geographical landmarks or objects for user selectivity.

The CAMLS is also applicable for use with radio location systems, dead reckoning location systems, and hybrid location systems. For example, the GPS satellite system is used with a GPS receiver for displaying location, travel direction, speed, route, and other traveling data of the CAMLS user on the generalized grid quadrangles for correlation of location with surface features or mappable features on the set of printed maps coinciding with the grid quadrangles. Multiple sets of maps and grid systems at different scales may be interrelated in the CAMLS. The CAMLS system provides "intelligent" printed maps by direct computer output of computed mapping and travel location data on grid quadrangles for correlation with mapped surface features on the corresponding printed maps. This can be accomplished by human senses, e.g. visually and intuitively between human readable forms of the map without the necessity of mentally or quantitatively determining latitude and longitude and without requiring any mathematical calculations by the user. Text and voice or audio outputs can be provided to facilitate use and reading of the printed maps. The invention also adds a communications dimension to the maps for adding and updating the latest spatially related data, for providing software tools for map analysis and reading, and generally for communications between computer systems and between users in a variety of combinations.

BACKGROUND ART

A hand held personal GPS navigation tool has been developed by Trimble Navigation of Austin, Tex. 78759 under the trademark Scout GPS (TM). The Trimble navigation tool incorporates a GPS receiver and a four line character display for displaying position information in alphanumeric characters. It is stated that this hand held GPS system can display alphanumeric position information in a latitude/longitude coordinate system or a Universal Transverse Mercator (UTM) coordinate system. The Trimble navigation tool can apparently also display proprietary coordinate system information for locating the position of a user on a standard topographic map. The Trimble GPS navigation tool displays in alphanumeric characters the horizontal and vertical coordinate distances of the user from the southeast corner or southeast reference point of any standard topographic map.

A disadvantage of the Trimble GPS navigation tool is that it provides a display of coordinate system data only in alphanumeric characters on a multiline LCD display. The user must then perform mathematical measurements and operations to determine the user location on a particular topographic map. While the incorporation of GPS technology provides an improvement over dead reckoning and position estimation from topography, it necessarily requires user reference to quantitative measurements and calculations. Furthermore, the Trimble navigation device does not provide communications access to other geographical information databases for updated information on geographical objects in the spatial area of interest or communications access to other software tools for map analysis and reading. More generally, the Trimble navigation device does not provide a communications dimension for the map reading system.

Silva Sweden AB and Rockwell International USA have developed a hand held GPS compass navigator for use on any standard map. The GPS compass navigator incorporates a GPS receiver for locating the user on any standard map. A built in "compass" gives range and bearing from the known user position to a specified destination. This information is updated on the GPS compass navigator as the user progresses toward the destination. The GPS compass navigator is described as being in the form of a guiding "puck" that apparently rides or is moved over the standard map at the user location. It therefore cannot display multiple geographical objects at the same time and cannot communicate with other sources of spatially related map information.

Thomas Bros. Maps of Irvine, Calif. 92714 has developed a new "Page and Grid" (TM) identification system to locate streets, cities, communities or points of interest on a set of maps. Objects of interest are located by page number and grid name on the Thomas Bros. maps. Trip Builder (TM) products described in U.S. Pat. No. 4,998,752 use transparent map overlays for travel planning. However there is no electronic computer component to the "Page and Grid" (TM) system of Thomas Bros. or the Trip Builder (TM) transparent overlay maps to add an intelligent dimension for computer aided correlation, coordination, and communication.

DeLorme Mapping Company of Freeport, Maine provides a self contained electronic map and navigation device under the trademark "MapKit". A CDROM stores a database of maps for display on a portable computer for assistance in routing, navigation, etc. The "MapKit" (TM) electronic map device is intended for self contained use and does not include a system specifically designed for correlation with human readable maps in other media such as printed maps.

With respect to the abundance of paper maps and paper map series currently available, a user generally picks up a paper map with the questions in mind, "Where am I?", "Where is my proposed destination?", and "How do I get there?". The paper map alone is unable to answer these questions in a direct sensory, visual, and intuitive manner without map reading capability and some deductive reading and calculation by the user. There is no direct visual indication as, for example might be available on an electronic map of the surface features or mappable features of the same geographic area highlighting current location, proposed destination, and even a proposed route.

OBJECTS OF THE INVENTION

It is an object of the present invention to provide a new multimedia system for correlation and coordination of spatially related information between diverse media such as transitory digital electronic displays or other computer outputs and graphics, text, fixed media presentations such as printed sheet media including printed maps. A related object of the invention is to provide communications of spatially related data between computer systems and between users in various combinations. Such a communications dimension permits for example updating with latest mapping and geographical object information and providing additional software tools for map reading and analysis.

Another object of the invention is to provide a novel grid system and grid quadrangle naming system for correlation and coordination of spatially related data including location data, geographic data, mapping data, text data, graphics data, visual, auditory and other sensory data between diverse media. According to the present invention, diverse data in diverse media can be correlated and coordinated internally and automatically by computer through a common geographical coordinate system such as the latitude/longitude location coordinate system. The diverse spatially related data can be correlated and coordinated intuitively by the user using the new grid system and uniquely named grid quadrangles.

A feature and advantage of the novel constant scale grid system according to the invention is that the grid system enables visual, intuitive or other sensory correlation and coordination of spatially related location data. The grid system permits map reading without requiring quantitative determination, analysis, or reasoning and without requiring mathematical calculations by the user.

It is another object of the present invention to provide a computer aided map location system (CAMLS) based on coordination between a PDA or other digital or electronic computer (EC) such as a digital microprocessor based (PC), workstation, or mainframe digital computer, and a set of printed maps typically printed on paper, depicting surface features at desired levels of detail. A feature of this coacting system is particularly useful for embodiments of the invention using hand held devices, small portable and mobile computers, and field applications where available and affordable memory modules may be limited. The massive digital electronic database necessary for depicting surface features in sufficient detail on electronic maps is not required because the full map database is effectively stored and available on paper or other sheet media. In other applications, the electronic map and display can provide greater detail than the printed map, updating and supplementing the printed map, and even printing a new map.

The CAMLS system of the invention adds a computer dimension to the printed maps and is therefore intended to provide intelligent printed maps. The computer correlates, coordinates, and communicates information in a common geographical coordinate system such as the latitude/longitude coordinate system. An object of the invention is to provide direct visual display of intelligent map location information on grid quadrangles of a PDA/PC/EC display for correlation with printed maps depicting geographical areas coinciding with the geographical areas of the grid quadrangles. Coordination and correlation of spatially related data by the user is accomplished intuitively without requiring the user to make any latitude and longitude measurements or UTM determinations or any mathematical calculations whatever.

Another object of the invention is to display on the PDA/PC/EC, geographical coordinate system located objects or other selected geographical objects from other databases with reference to a generalized grid quadrangle also located by latitude and longitude or other geographical coordinate system. The grid quadrangle in turn coincides in geographical area with a detailed map of a set of maps or a grid quadrangle overlay on the map, typically printed on paper for correlation of location of geographical objects on the displayed grid quadrangle and corresponding printed map. For example, the locations of displayed latitude and longitude located objects in a grid quadrangle are correlated with surface features depicted at desired levels of detail on the corresponding printed map for the same geographical area. An advantage of the present invention is that objects are located by the user on one of the detailed printed maps by direct sensory, visual, and intuitive comparison with the PDA/PC/EC display.

A related object of the invention is to provide printed maps and other "fixed" media maps with a communications dimension for updating maps and associated geographical objects with latest geographically related information. The invention provides communications access to a variety of database sources of updated information on latitude/longitude locatable objects. The database sources can be internal or external, local or remote, using memory devices and diverse communications links to multiple database sources and service centers. The communications dimension of the present invention can also make available software tools for map reading and analysis over communications links.

A further object of the invention is to provide a CAMLS for use with radio location systems, dead reckoning location systems, and hybrid location systems for displaying user location. For example, the GPS satellite system is used for displaying the location, direction of travel, route, speed, and other travel data of a CAMLS user on a generalized grid quadrangle for correlation of user location on a coinciding printed map. All this is accomplished by direct sensory, visual, and intuitive methods.

MODULARITY AND SELECTIVITY OBJECTIVES OF THE CALMLS EMBODIMENT

The CAMLS system is intended to provide alternative and multiple levels of detail with alternative and multiple scales of displayed grids, grid quadrangles and corresponding printed maps, and with alternative and multiple databases both internal and external, local and remote, for display of selected geographical objects and spatially related information according to the requirements of the CAMLS user. The invention is intended to provide display of generalized grid quadrangles on a PDA/PC/EC display correlated with selected geographic areas and with selected levels of background context and detail according to the memory capability of the PDA/PC/EC and the communications links and communications services coupling the CAMLS user to other CAMLS systems, external data bases and service centers. The selected levels of background context and detail may vary according to the memory devices or modules available for user requirements, according to wired or wireless on line information services available, according to internal and external databases available, and according to user choice.

In the simplest embodiments, there is no graphic display at all, and uniquely named grid quadrangles, in response to location queries, are identified by text/alphanumeric line displays, audio/voice outputs, or other types of computer outputs. At the next level of detail/background, the grid quadrangle boundaries alone are displayed on the computer display for containing and indicating generalized location of latitude/longitude or other geographical coordinate system locatable objects for correlation of location on a corresponding printed map. The edges of a display screen itself may function as the grid quadrangle boundaries or the grid lines forming grid quadrangle boundaries may be drawn and displayed on the screen inside the edges of the display screen. Multiple grid quadrangles may also be displayed on the display screen. In a radio location, dead reckoning location, or other user location system such as the GPS embodiment, user location, direction of travel, and other travel data are also displayed on the selected grid quadrangle.

In embodiments with greater memory capacity, multiple memory device capability affording access to selected internal databases, or wired or wireless on line communication access to external databases, additional software tools for map interpretation, and other spatially related information, the grid boundaries may be displayed with selected background features and landmarks of the correlated geographic area for further sensory, visual, or intuitive orientation by the user. Furthermore, latitude/longitude or other geographical coordinate locatable objects selected for display may be displayed with major routes or street locations or other geographical landmarks adding visual cues for rapid visual correlation and location on the corresponding printed maps. Similarly, the user location, route, speed, and direction of travel determined by a radio location system, dead reckoning location system, or hybrid location system may also be displayed with greater or lesser background context and detail of selected routes and landmarks or other geographical landmarks to facilitate visual correlation of the display with printed maps.

The invention is intended to provide a computer aided map location system in which the user can fill the screen of the PDA/PC/EC display to whatever level of selectivity the user requires. For example a municipal planner might display a database of local fire hydrants, residential housing information, or GPS positioning of particular selected objects on the selected grid quadrangle or quadrangles. This may be shown for example, in association with the street layout or other infrastructure layout of the municipality. Memory modules can be made available to supplement displays on the PDA/PC/EC display with a variety of alternate internal databases. In the case of a desktop computer workstation, PC, or mainframe with essentially unlimited hard disk drive capacity, the user can display on the PC/EC screen whatever level of background context and detail is required or desired to supplement the display of geographical coordinate located objects. Alternative external databases are also available through wired and wireless data communication links with other CAMLS systems and users, external databases and software tools, and service bureaus, affording the user further selectivity and modularity in choosing levels of background context and detail.

On the other hand, in the simplest PDA, the screen itself is used to define the boundaries of a grid quadrangle and the screen boundaries may be molded with "hash marks" or grid subdivisions for more detailed geographical location. In a full PC/EC desktop system or workstation, multiple grid quadrangles may be displayed, e.g. 16 grid quadrangles with display of selected levels of detail. Multiple grid quadrangles may also be displayed on the simplified PDA embodiment accompanied by simplified background commensurate with a lesser level of detail. The system components can be modular, with regular addition of new and different internal databases through updated memory modules and devices and external databases through wired and wireless data communications links to other CAMLS systems and users, external databases and software tools, and communication service centers. Any desired level of information can be displayed in association with the correlated printed maps depicting surface features in greater or lesser amounts of detail.

The selectivity and modularity of the CAMLS system are important features of the invention permitting implementation of the invention from the simplest PDA's to effective desktop PC/EC systems workstations, and mainframes. The invention permits the CAMLS user to display on a displayed grid quadrangle whatever subject matter and level of detail are deemed appropriate for the user requirements and to access whatever spatially related data may be required.

The system can be programmed with greater or lesser degrees of database content, software tools for map reading, interpretation, analysis, and expansion, and display logic for correlation with the generally more detailed printed paper or other sheet media maps. In either case the CAMLS system can facilitate user selection of the correct uniquely named grid quadrangle so that it is correlated with the correct printed map. The varying levels of detail from selected database modules, memory devices, and data communication links can be displayed on the generalized grid quadrangles for correlation with the generally more detailed surface features or mapping features depicted on the corresponding printed paper or other fixed media maps. The end result may be printed maps, trip tickets, and itineraries printed by the PDA/PC/EC printer for a variety of traveling and data collecting and selective display purposes. A variety of supplemental and updating information for any required spatially related data about geographical objects, etc., can be made available on modular memory devices such as PCM/CIA cards, CD ROMS, diskettes, etc. and over wired and wireless broadcasting and telecommunications data communications links and networks.

It is also intended and contemplated by the invention that the present system for coordination, correlation and communication of spatially related data in diverse media in the CAMLS system can be operated by the user concurrently with other user software applications on the same computer. Such other applications may be non-geographical or non-mapping applications such as e.g., word processors, spread sheets, calendars, reminders, communications software, etc. These applications may permit import or export of data between the software applications or be entirely independent and operate concurrently or sequentially by interrupts, user menu selection, windows etc. The CAMLS system according to the invention can also be operated through communications links between multiple CAMLS computer systems, between multiple CAMLS users, and between various combinations.

DISCLOSURE OF THE INVENTION

In order to accomplish these results, the invention provides in the preferred examples a computer aided map location system (CAMLS) having at least one printed map corresponding to a selected geographical area. The printed map depicts surface features or mappable features at a desired level of detail. The printed map incorporates grid lines which, in the preferred example, are substantially parallel with lines of latitude and longitude. Other geographical coordinate systems may also be used. The grid lines define boundary lines of grid quadrangles or grid tiles identified by unique names.

A personal digital assistant, portable personal computer, or other digital or electronic computer (PDA/PC/EC) provides a display or other computer output. The PDA/PC/EC can be either mobile or stationary and is programmed to display an image of at least one selected grid quadrangle identified by unique name by displaying the boundary lines of the grid quadrangle for correlation with a corresponding grid quadrangle of a printed map. The unique gridname is also displayed for selection of the correct similarly named corresponding printed map. In one embodiment of the invention, the edges of the screen display themselves form the boundary lines of the selected grid quadrangle and the screen edges can be formed with hash marks or grid subdivisions to facilitate location within the selected grid quadrangle.

The PDA/PC/EC incorporates or provides access to at least one database of selected latitude/longitude locatable objects (loc/objects) identified in the preferred example by latitude and longitude location. The PDA/PC/EC is programmed to display the location of selected loc/objects in a grid quadrangle for user correlation of locations on the grid display with locations on the printed map. For example, the user can make this correlation and coordinate locations using surface features or mappable features depicted on a corresponding grid quadrangle of the printed map.

Alternatively or in addition, a radio location receiver such as a GPS receiver is coupled to the PDA/PC/EC. The PDA/PC/EC is programmed to display the location of a user based on signals from the GPS receiver or other radio location receiver in a selected grid quadrangle image. A full screen can be constituted to be the selected grid quadrangle. Or, multiple grid quadrangles may be displayed. The user correlates and coordinates locations on the grid quadrangle computer display with locations on a corresponding grid quadrangle of a printed map. Additional travel data can also be displayed including user direction of travel, velocity, altitude, and route traveled, all derived from the GPS receiver or other radio location receiver. In addition to radio location, other user location systems may also be incorporated into the CAMLS such as dead reckoning location systems that measure user location from a known origin. Hybrid location systems are also available combining radio location and dead reckoning.

The CAMLS user can be provided with communications links for on line communication and transfer of spatially related data and software tools for map reading between computers and between users. For example a CAMLS user may communicate with another CAMLS system or user for transfer of user location data and any other spatially related data. The CAMLS user can communicate with external data bases, a central communications service bureau, and on line mapping services for latest information relating to loc/objects, routes, and map modifications, priority messages, etc.

In the preferred example embodiments, the invention provides a computer aided map location system (CAMLS) with a first set of substantially constant scale printed maps at a first scale depicting surface features over a specified geographical area. The printed maps of the first set of printed maps substantially coincide, in geographic area depicted, with substantially equal area grid quadrangles of a first scale grid. The first set of maps may constitute, for example, a national atlas for a selected country, dividing the country into constant scale regional grids at a regional scale with a detailed printed map for each region. The first scale grid tiles are identified by a first set of unique names. The CAMLS PDA/PC/EC has a display and memory device incorporating a first database and a mapping display subsystem performing functions of a database manager, controlling the presentation of mapping data. The first database includes the first set of unique names of the grid quadrangles of the first scale grid.

The first scale grid is formed by grid lines defining the boundary lines of the first scale grid quadrangles. These boundary lines of the first scale grid quadrangles are, in the preferred example, substantially parallel to lines of latitude and longitude across the specified geographical area and are identified by the computer in the first database by latitude and longitude location. Other geographical coordinate systems such as Universal Transverse Mercator (UTM) may also be used.

According to the invention the mapping display subsystem is constructed to cause the drawing and display of a selected grid quadrangle of the first scale grid identified by its unique name by displaying on the PDA/PC/EC display the boundary lines of the selected grid quadrangle. Alternatively, the edges of the screen display function as the boundary lines of the selected grid quadrangle and the selected grid quadrangle fills the display screen. The grid quadrangle unique name is displayed on an alphanumeric digital display such as a single line or multiline display. The grid quadrangle is correlated by the user with a printed map from the first set of printed maps coinciding with the uniquely named selected grid quadrangle.

In various embodiments of the invention the selected grid quadrangles are displayed with different amounts of detail associated with the displayed grid quadrangle according to available memory capacity, available modular and replaceable memory devices providing internal databases, available wired and wireless data communications links to external databases, communications with other CAMLS systems and users, communications service centers, according to user choice. According to one embodiment, the boundaries of the grid quadrangle alone are displayed bounding a selected geographic area or the full screen is constituted as the grid quadrangle for correlation of locations on a corresponding printed paper map. With greater memory capacity achieved for example with add on memory devices or modules, or external data communications links, the grid quadrangle may be displayed with additional visual context such as selected major routes, cities, or landmarks in the geographical area of the grid quadrangle.

Such greater or lesser visual context can be used to facilitate visual orientation by the user and to facilitate visual and intuitive cross reference, correlation, and coordination of a location on the computer display with a location on the corresponding printed map, for example using surface features provided generally in greater detail on the corresponding printed map. The modularity of the system with a variety of internal memory device modules or external data communications and telecommunications links affords greater selectivity to the user in deciding what subject matter features and what level of detail to portray on the screen display of the PDA/PC/EC. The various embodiments with different levels of detail are available in the different versions of the invention as hereafter described.

Thus, the invention contemplates presentation of two human readable or user readable maps for user cross reference, correlation, coordination, and communication. One map, the printed map, is fixed in a relatively permanent medium and taken alone is "dumb" and is not readily changeable. The other map, a digital computer electronic map, is presented on a transitory computer display, is readily changeable, and "intelligent", adding an intelligent dimension to the relatively permanent printed map. The two map presentations are correlated intuitively by the user using the novel grid system of uniquely named grid quadrangles which overlie the two coordinated maps.

The memory device or devices of the PDA/PC/EC or external data communications links also provide a second database of latitude and longitude locatable objects (loc/objects) identified by the computer in the second database by latitude and longitude location in the specified geographical area. The display subsystem is constructed to cause selected loc/objects to be displayed in the selected grid quadrangle of the first scale grid. The displayed loc/objects can thereby be correlated by the user with locations on the corresponding printed map of the first set of printed maps coinciding in geographic area with the specified grid quadrangle. While the standard latitude and longitude coordinate system is the preferred coordinate system for automated computer location of the loc/objects, other geographical coordinate systems such as UTM may also be used.

In various embodiments of the invention, the second database of latitude/longitude located objects (that is objects identified by the computer in the second database by latitude and longitude coordinate location and referred to herein as loc/objects) may incorporate different amounts of detail associated with the loc/objects for display on the PDA/PC/EC. According to one embodiment, the location of a loc/object alone is displayed on a grid quadrangle presented on the CAMLS PDA/PC/EC display for correlation and coordination of that location with a corresponding location on a printed paper map. With greater memory capability, additional or alternative memory devices, or external data communications links, the loc/object may be associated with additional visual cues such as major routes, street location, cities, or other geographical landmarks in the grid quadrangle to facilitate sensory, visual, and intuitive orientation and visual correlation by the user with the printed paper map. This can be accomplished with replaceable modular memory devices storing a variety of databases suitable for use with the selected hardware or through data communications links to external databases, information service bureaus, other CAMLS systems and users, etc. For example PCM cards may be used with the PDA while diskettes, CDROMS and similar devices may be used with portable and desktop PC's and workstations. The user can then more easily associate the loc/object with for example, surface features or mapping features generally depicted in greater detail on the corresponding paper map. The various embodiments with different levels of detail are presented in different versions of the invention as hereafter described e.g. with or without location of the user position, velocity, route, etc.

An advantage of the computer aided map location system is that a massive digital electronic database necessary for depicting surface features or mappable features in sufficient detail for full electronic maps is not required. The detailed map database is effectively stored and available on the printed maps. This advantage of the CAMLS system is particularly applicable for hand held device and smaller portable, mobile, and field computers with limited or expensive memory. In other applications the electronic map may provide greater mapping information than the printed map.

The second database of latitude and longitude or other geographical coordinate loc/objects is provided by relatively smaller specialized databases or database modules such as selected restaurants, hotels/motels, cities, municipalities, settlements, routes, transportation services such as airports and ferries, parks, recreation areas, campgrounds, hospitals, zoos, museums, tourist and sightseeing attractions and other selected geographical objects and landmarks in the specified geographical area. For example the second database of loc/objects may also incorporate recommended routes between selected loc/objects for display on corresponding grid quadrangles for correlation with surface features of a printed map of the first set of maps coinciding with the selected grid quadrangle. Routing software and routing algorithms may also be used.

The internal databases can be stored on memory devices such as replaceable PCM cards or PCMCIA cards for use in association with the PDA/PC. The PCM cards can be regularly upgraded and updated with latest information. For portable and desktop PC's and workstations, diskettes, CDROMS, and other appropriate memory devices are used for the database memory modules. External databases are also made available through wired or wireless data communications links. The communications dimension provides access not only to effectively unlimited external data bases, but also additional software tools for mapping and map reading use, exchange of information with other CAMLS users, communications service bureaus, etc.

The invention also provides a first set of printed maps having a second scale grid formed on the maps of the first set. The second scale grid subdivides each of the grid quadrangles of the first scale grid into a plurality of substantially equal area second scale grid quadrangles. The second scale grid quadrangles are identified by a second set of respective unique names. The second scale grid is also formed by grid lines defining the boundary lines of the second set of grid quadrangles. The boundary lines of the second scale grid quadrangles are, in the preferred embodiment, substantially parallel to lines of latitude and longitude across the specified geographic area. Other geographical coordinate systems may of course consistently be used.

According to the invention the database manager is constructed for drawing and displaying on the PDA/PC/EC display the boundary lines of a selected grid quadrangle of the second scale grid identified by unique name. Alternatively, the selected grid quadrangle of the second scale grid is expanded to fill the screen display so that the edges of the screen constitute the boundaries of the selected grid quadrangle. The database manager also displays selected loc/objects of the second database on the grid quadrangles of the second scale grid presented on the CAMLS PDA/PC/EC display for coordinating and correlating locations on the computer display with locations on corresponding printed maps. Surface features and mapping features on a printed map of the first set of printed maps can assist finding locations.

In the preferred example embodiment the CAMLS incorporates a second set of substantially constant scale printed maps at the second scale depicting surface features or mappable features in greater detail than the first set of maps over the specified geographical area. The printed maps of the second set of printed maps substantially coincide, in geographic area depicted, with grid quadrangles of the second scale grid. The second set of printed maps may constitute, for example, a regional atlas for a selected region of the country dividing the region into constant scale subregional grid quadrangles at a subregional or state scale with a detailed printed map for each subregion or state. Selected loc/objects are displayed on a second scale grid quadrangle on the PDA/PC/EC display screen for correlation of locations indicated on the CAMLS computer display with corresponding locations on the respective printed map, for example using surface features or mapping features depicted at desired levels of detail on the coinciding printed map of the second set of printed maps.

As in the first scale grid, the second scale grid quadrangles and loc/objects of the second database may be stored and displayed in different embodiments with different levels of detail according to the available memory capability, available memory devices and modules, and available external data communications links. Greater levels of detail provide additional visual framework to facilitate user orientation and visual or other sensory correlation and coordination between the grid display and the corresponding paper map. The modularity of the CAMLS system again affords greater selectively to the user in deciding what level of detail of visual or other sensory cues and context and what content and subject matter to provide. Additional geographic detail may be stored for example in memory devices such as PCMCIA cards for use with the PDA, diskettes and CDROMS for portable PC's, desktop PC's, and workstations, or be made available via data communications links from external databases, communications service centers, other CAMLS systems and users, etc.

The second set of maps may also include a third scale grid formed on the maps of the second set. The third scale grid subdivides each of the grid quadrangles of the second scale grid into a plurality of substantially equal area third scale grid quadrangles. The third scale grid quadrangles are also identified by a third set of unique names in the first database. The third scale grid quadrangles are, in the preferred example, also defined by boundary lines identified internally by the computer using the latitude and longitude coordinate system or other consistent geographical coordinate system in the first database. As in the first and second scale grids, the third scale grid quadrangles and loc/objects from the second database may be stored and displayed in the various embodiments with different levels of detail according to the available memory capacity, memory device capability, or data communications links, to facilitate user orientation. Additional scale grids and component grid quadrangles can also be provided for displaying and correlating further levels of detail by the CAMLS.

In the preferred example embodiment, the CAMLS incorporates a third set of substantially constant scale printed maps at the third scale. The printed maps of the third set of printed maps cover smaller geographic areas than either the first or second sets of maps and depict surface features or mappable features in greater detail than the first and second sets of maps. The printed maps of the third set of printed maps substantially coincide in geographic area depicted, with grid quadrangles of the third scale grid. The third set of printed maps may constitute, for example, a metro atlas for the selected country, or selected region of the country, or selected subregion or state, dividing selected metropolitan areas of subregions into substantially constant scale metropolitan grids at a metropolitan scale with a detailed printed map for each metropolitan area.

According to another preferred embodiment of the invention, the PDA/PC/EC is provided with a radio location receiver such as a loran receiver or a GPS receiver for generating signals corresponding to the geographical coordinate location and direction of travel of a CAMLS user. Dead reckoning location systems and hybrid location systems may also be used. The database manager is constructed for displaying on the PDA/PC/EC display the location, direction of travel, speed and traveling route of the CAMLS user on a selected grid quadrangle displayed on the PDA/PC/EC display. The displayed location and route can be correlated with locations on the printed map coinciding in geographic area with the selected grid quadrangle. The GPS CAMLS can be used in a separate and independent CAMLS system without any databases of loc/objects as a stand alone system or in combination with the second database and other available internal and external databases for display of selected loc/objects from such databases. The CAMLS systems and users can exchange data for display or other use such as user location information as well as other spatially related data. This is accomplished over a variety of communications links, wired or wireless, adding a communications dimension to the CAMLS.

In the various embodiments of the invention, the radio location data such as GPS data processed by the receiver may be displayed in a variety of formats conveying lesser or greater amounts of information according to the memory capacity, available replaceable memory devices or modules, on line wired or wireless data links to external databases, information bureaus, other CAML systems and users, etc. In the simplest embodiment the user location may be pinpointed on a generalized grid quadrangle displayed on the PDA/PC/EC. In further embodiments the user location may be displayed by an arrow also indicating the direction of travel of the user. A "hole" or "circle" in the arrowhead is used to show current user location. User velocity may be indicated by the length of the arrow. User location, direction of travel, and velocity information is therefore recorded if the display is printed in hardcopy. The device can also trace and display the route of the user across the grid quadrangles displayed on the PDA/PC/EC.

Furthermore, the user location may be associated with a street address location, major routes, cities, or other geographical landmarks in the vicinity of the user location also displayed on the grid. Such additional visual or other sensory information can be made available on memory devices such as PCMCIA cards used in association with a PDA, other memory devices for PC/EC's, and over data communication links to external databases, information bureaus, and other CAMLS systems and users. This additional information associated with the user location can facilitate user map orientation and correlation of the user location, direction of travel, and route, with a location on the corresponding printed map for example, using surface features depicted at desired levels of detail on the corresponding printed paper map. This capability provides greater user selectivity in determining what level of detail and what content and subject matter to display.

According to another aspect of the invention, the grid quadrangles or tiles for the same scale or level and grid quadrangles or tiles at different scales or levels can be related to each other by a database manager of the PDA/PC/EC in a manner similar to the "space ship" algorithm set forth in the David M. Delorme U.S. Pat. No. 4,972,319 issued in 1990 for "Electronic Global Map Generating System" and the David M. DeLorme U.S. Pat. No. 5,030,117 issued in 1991 for "Digital Global Map Generating System". According to the "space ship" algorithm, the CAMLS user can "scroll", "fly", or shift between different grid quadrangles, tiles or windows at the same scale or level and "zoom" between grid quadrangles, tiles, or windows at different scales or levels. The grid quadrangles, tiles or windows at different levels are organized in a "tree" data structure. In the preferred example set forth in U.S. Pat. 4,972,319 and 5,030,117 the grid quadrangles at different levels are related to each other in a quad-tree data structure although other tree data structures such as hex and octal may of course be used. The specifications of the two DeLorme Pat. Nos. 4,972,319 and 5,030,117 are incorporated herein by reference for further details of this example.

An example of printed maps constructed in substantially equal area constant scale grid quadrangles can be found in the DeLorme Publishing Company *Atlas and Gazetteer Series* available for most of the states of the United States. The pages of the volumes from the *Atlas and Gazetteer Series* constitute the constant area and constant scale grid quadrangles for each volume.

For example in *The Maine Atlas and Gazetteer* published by DeLorme Publishing Company, Freeport, Me., revised and updated annually, the printed map on each page represents a grid quadrangle at a scale of approximately one half inch equals one mile, that is one unit of distance on the printed map equals approximately 125,000 units of distance on the earth. This scale is maintained consistently for the grid quadrangle pages. The scale of each map is selected so that each grid quadrangle, that is each page, is composed of twenty-five minutes each of latitude and longitude. Each map covers approximately twenty-nine miles of longitude or height on the earth's surface by twenty-one miles of latitude or width on the earth's surface. Lines of longitude running north and south eventually merge at the North Pole causing maps in the northern area to be narrower than those in the southern area of any particular *Gazetteer*. This format allows projection of the round earth on flat pages with minimum departure from the constant scale for all grid quadrangles.

As exemplified in the DeLorme Publishing Company *Atlas and Gazetteer Series* the side boundaries of the grid quadrangles near the side edges of the pages are aligned with true north/south coinciding with lines of longitude. The top and bottom boundaries of the grid quadrangles near the top and bottom edges of the pages are aligned to run true east/west coinciding with lines of latitude. In reading the maps, adjustment is made for declination of magnetic north from true north when orienting the maps using a compass. Such constant scale grid quadrangle maps exemplified by the DeLorme Publishing Company *Atlas and Gazetteer Series* are contemplated for use as the printed maps or fixed media maps of the present invention. However, a national grid system can be provided so that the grid systems for each state match and are consistent with each other.

According to an alternative embodiment of the invention, the digital electronic media aid for use with a corresponding printed map or maps need not take the form of a visual or graphic computer display. The coordination and correlation of spatially related data between a computer output and the more detailed fixed media representation of a geographic area may take the form of an alphanumeric or text computer output, an audio or voice computer output, or some combination of non-graphic display outputs. By way of example a PDA output in the form of an alphanumeric or text line output can identify location information or information spatially related to a location by naming or identifying the smallest grid quadrangle containing the subject location. Such a gridname may be, for example "US/NE/B2/A1/B1/A2". The smallest grid quadrangle at the highest resolution scale encompassing a pertinent geographical location can also be identified by an audio or synthesized voice output as well as or instead of an alphanumeric line output.

It is not essential that the CAMLS user have the coordinated computer display and corresponding printed map at the same location. Thus, the invention contemplates "distributed" CAMLS systems. For example, a CAMLS computer and display equipped user may be at one location and a CAMLS printed map user be at another location joined by a communications link such as a telephone/FAX communications link. The CAMLS computer user can FAX an image of a grid quadrangle showing loc/object location for coordination and correlation of locations on the grid and printed map by the CAMLS printed map user. A simple display may improve the quality and lower the cost of the FAX transmission. Or, the CAMLS printed map user can FAX a corresponding image of the printed map to the CAMLS computer user. The result is a complete distributed CAMLS system with elements of the complete system at two locations. The communications link might also include voice telephony and mobile radio.

As used in the specification and claims the phrases "computer display" and "display" are intended to include transitory visual displays such as graphic screen displays, alphanumeric or text line displays, and hard copy output displays. The phrases "computer outputs" and "outputs" are intended to be more general, however, encompassing not only computer displays, hard copy displays, and odometer style line displays or outputs, but also voice and sound outputs, other sensory outputs such tactile and braille outputs, and "virtual reality" outputs.

Upon correlation and coordination of the uniquely named grid quadrangle with the corresponding printed map, additional information related to the selected grid quadrangle area can then be interrogated including selected information from any available internal and external databases using memory devices and on line communications services. Alternatively, input of particular queries about identified restaurants, motels, ferry services, tourist attractions, and any geographical landmarks or objects of interest etc. can prompt a non-graphics text or alphanumeric response by the PDA or other digital computer identifying the location within the smallest uniquely named grid quadrangle. The response can be made in any available or appropriate computer output including voice/audio outputs alone or supplementing other computer outputs including computer screen displays, line displays, and hard copy outputs. Reference can be made to the corresponding printed map and additional spatially related information can be queried from databases relevant to the selected grid quadrangle.

According to various alternatives, the electronic media computer output may take the form of text or alphanumeric indicia only, voice output only, and voice and text outputs in combination. Furthermore the invention contemplates electronic computer media outputs in the form of visual graphic displays and map displays only and visual graphic computer displays in combination with either text and alphanumeric indicia or voice/audio output or both.

As used in the specification and claims, the phrase "printed map" is intended to cover all human readable fixed media representations of a geographic area or map such as printed maps printed on paper, Mylar (TM), as well as other "sheet media". The term "printed map" is also intended to encompass photographs, photographic images including positives, negatives, slides, microfilm, and microfiche that can be rendered in a human readable format. The phrase "printed map" is used herein and in the claims to cover video maps and video films, facsimile reproductions or faxes, and other fixed or developed media. The phrase "printed map" also encompasses projections of map images from all of the foregoing fixed media and other optical transformations. Such "printed maps" in fixed media may also take the form of three dimensional relief cartography, maps on deformable media such as rubber sheets, globes, and other three dimensional map presentations. Thus, printed maps also includes enlarged wallpaper maps and murals, paper wall maps or other enlarged maps such as backlighted wall maps and desk maps mounted over grids of lights controlled by the computer to illuminate the active grid areas or grid quadrangles of interest. The phrase "printed map" is used in the specification and claims to encompass all fixed media presentation of mapping analog imagery in two and three dimensions in human readable form including projections from the fixed media presentations and generally media which can present a map in user readable form.

The word "fixed" is used in its broadest sense including the expansive meaning under the U.S. Copyright Laws encompassing all media in which a map or similar work may be embodied. Thus "fixed" encompasses not only "still" embodiments of maps and map related works but also animated maps, "movies", etc. and any fixed medium that presents a map in human readable form.

As used in the specification and claims the phrase "locatable objects" or "loc/objects" is intended to encompass all objects either stationary or moving whose location can be identified in a selected geographical coordinate system related to the digital electronic media displays and outputs or the printed maps. The phrase "loc/objects" can encompass all stationary features either natural or man made associated with a selected grid quadrangle. Thus "loc/objects" can encompass any selected natural features of the landscape or any human constructed objects or structures of interest to the user including the list of objects of interest to travellers set forth above. With respect to moving objects, the "loc/objects" can include the travelling user location, location of any selected vehicles such as, for example, a fleet of vehicles used in a business, vehicles in the air, on land and in the sea and any other moving objects of human or natural origin that can be localized in space and time and whose locus may be of interest to the user. Moving objects may also encompass natural phenomena such as tides, currents, sediment transport, lava flow, tectonic plates, animal migrations and any aerial, terrestrial, marine or submarine movements which can be identified and may be of interest or the subject of study.

As used in the specification and claims the phrases "surface features", "mappable features", "mapping features", or "mapped features" referring to surface features of the earth are not limited to features on the literal surface of the earth but are intended to encompass features throughout a depth dimension of the earth accessible to human exploration, study, or knowledge including subterranean, submarine, terrestrial, airborne, atmospheric, ionospheric features, etc. and generally any mappable or locatable features of the earth's core, moho, lithosphere, biosphere, noosphere, and cyberspace.

The phrase "surface features" is generally used to identify fixed features of the surface of the earth which may be of natural origin or human origin for example hills, forests, rivers, lakes, swamps, and highways, roads, settlements, buildings and structures. More generally the phrase "surface features" is intended to encompass "mappable features" or "mapping features" and "mappable events" and "mapping events". Thus, "surfaces features" and "mapping features" refer to substantially localized features and events of natural and human origin which can be identified by location in a geographical coordinate system and assigned a location and symbolic representation on an electronic map or a printed map.

The word "geocoding" in the CAMLS system is used to characterize the computer operation of assigning a location to an object. In the case of a geographical or latitude/longitude locatable object this constitutes in the preferred embodiment assigning a latitude and longitude coordinate location on the Earth's surface. The loc/object is also assigned a grid name for the unique grid including its location. The location assignment task commits the location to computer memory in the appropriate database and enables the mapping function of displaying a symbol at the appropriate location on displayed maps. A subsidiary function of geocoding is assigning a location for a non-geographical object such as a text message for the purpose of "located screen sharing". Geocoding assigns a display location on a map for purposes of screen sharing even though the text message has no real geographical location on the face of the earth.

In the simpler hardware embodiments of the present invention it is generally contemplated that the fixed media presentation of a geographical area such as a printed map will depict surface features or mappable features in greater detail than the electronic media presentation such as a transitory computer display or output which adds an intelligent dimension to the printed map. However in more complex hardware embodiments, the electronic media presentation in the form of a digital computer display of an electronic map may in fact depict greater detail of surface features or mappable features than the fixed media printed map presentation. This situation may occur for example when the digital computer and its accompanying transitory display are used to update the printed map or are the source of a printed map from a multicolor printer or plotter coupled to the output of the digital computer. In this respect the present invention may provide the capacity for map making or map creation resulting in a derivative printed map having greater detail than an original printed map correlated with an original transitory display of a digital computer. The correlation of spatially related data according to the present invention is generally between a printed map with surface features and mapping features and a coordinated and correlated digital computer display or output adding an intelligent dimension. As noted above, the invention contemplates and encompasses situations in which the electronic media digital computer display may exhibit greater detail of surface features and mapping features than the coordinated and correlated fixed media presentation.

By way of another example, a user by wired or wireless data communications link may access an external database or information service bureau that provides detailed information not available on the corresponding printed map. For example a service bureau might provide very detailed information on selected mappable topics of interest to the user resulting in a computer display of surface features or mappable features in greater detail than the original corresponding printed map. According to another example, an information service bureau might provide an updated map or updated data for constructing an updated map on the digital computer display. In this respect, the new map presented on electronic media may have greater detail of surface features or mapping features than the original corresponding printed map.

While the description of the present invention is primarily directed to the applications of the invention for computer aided map reading, analysis and interpretation and for supplementing the maps with spatially related data from databases derived from memory devices and communications links, the invention is also applicable for map making and map creation. Thus, the GPS CAMLS may communicate GPS location data from on-site geocoding to a home office for accumulation and assembly of mapping data. At the same time the invention can provide on-line mapping information services to other CAMLS systems and users.

The invention contemplates a wide variety of computers and computer hardware configurations for incorporation in the CAMLS system. PDA/PC/EC as used herein is intended to cover computers that are portable, mobile, or stationary. The computers contemplated by the CAMLS system include in vehicle computers such as a dashboard, firewall, sun visor and rear view mirror computer mapping displays and associated computer processors. The CAMLS computers also include embedded computer technology applications where the computer is embedded in a non-computer apparatus without a computer style interface. For example, the GPS CAMLS invention is applied in an in-vehicle alarm system transmitting grid location and position data in the event of accident, theft, unauthorized entry. The response service uses the corresponding printed maps to reach the vehicle from a central dispatch location.

Other objects, features and advantages of the invention are apparent in the following specification and accompanying drawings.

BRIEF DESCRIPTION OF THE DRAWINGS

FIG. 1 is a diagrammatic action view of the CAMLS system showing a user operating the computer aided map location system (CAMLS) including a set of printed paper maps, PDA/PC with screen graphics display, and an enlargement of the graphics display showing a grid quadrangle correlated with a corresponding grid quadrangle of a printed map depicting mapping features in greater detail.

FIG. 1A is a detailed perspective view showing a snap on template while FIG. 1B shows "peel off" decals, for adding hash marks or grid quadrangle subdivision marks to the boundaries or edges of the PDA/PC screen display coinciding with similar subdivision marks on the printed maps.

FIG. 1C is a detailed fragmentary plan view showing an alternate PDA display with cross hairlines to facilitate user location relative to the grid quadrangle subdivision marks.

FIG. 1D is a detailed diagrammatic plan view of an arrow for presenting user travel information on a PDA/PC display.

FIG. 9 composed of FIGS. 9A and 9B is a flow chart showing the operation of the input bus or data handler of the CAMLS computer system of FIG. 7.

FIG. 11 is a generalized flow chart for the selection and display of grid quadrangles identified by unique grid quadrangle name or geocode.

FIG. 14E is a simplified action view showing a CAMLS printed map user manually entering the accident location on the appropriate grid quadrangle of the printed map.

Figure 2:
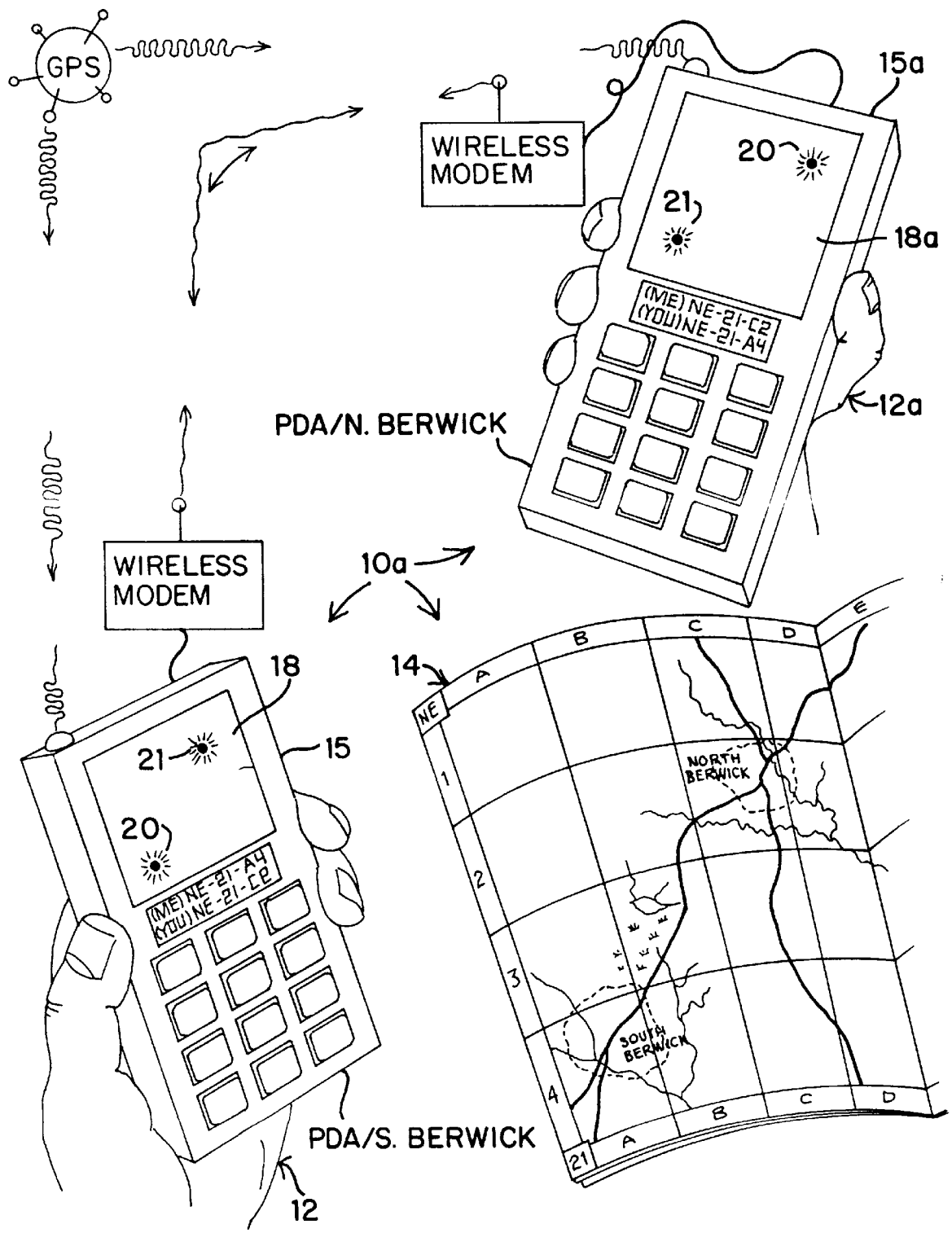
FIG. 2 is a diagrammatic action view of the CAMLS system with two GPS CAMLS embodiments and two CAMLS users in direct communication over a wireless communications link.

DETAILED DESCRIPTION OF PREFERRED EXAMPLE EMBODIMENTS AND BEST MODE OF THE INVENTION

A computer aided map location system 10 according to the present invention is illustrated by way of example in FIG. 1. A user 12 coordinates operation of the system 10 using an atlas 14 of printed paper maps and a personal digital assistant or PDA 15. According to one mode of operation of the system 10, the PDA 15 incorporates a GPS receiver. The user 12 may initiate operation of the system 10 by posing the query "Where am I?" with reference to the maps of the atlas 14. Based upon GPS data, the PDA responds by identifying the unique gridname or address US-NE-41-C3 for the grid quadrangle of a map where the user 12 is located. The gridname US-NE-41-C3 is displayed in an "odometer" style alphanumeric display 16, in this example below the graphics display 18 of the PDA. The unique gridname may alternatively be displayed directly on the graphics display 18.

In this example, the unique gridname of the subject grid quadrangle is understood as follows. "US" refers to the country atlas series, in this case the United States Atlas Series. "NE" refers to a particular regional atlas 14 for the northeast region of the United States. "41" refers to the page number of the NE Regional Atlas, while "C3" identifies the particular grid quadrangle on page 41, all as illustrated in FIG. 1. Other grid naming systems may of course also be used providing unique gridnames for the respective grid quadrangles.

The PDA further responds by displaying on the graphics display 18 the grid quadrangle US-NE-41-C3 and a blinking dot 20 showing the location of user 12 in that grid quadrangle. The user 12, having turned to page 41 of the NE Regional Atlas 14, identifies the grid quadrangle C3, and then visually and intuitively determines his or her location with reference to detailed mapping surface features depicted on the paper map at page 41 by comparison with the blinking dot 20 on the PDA graphics display 18.

It is noted that in FIG. 1, the grid quadrangle US-NE-41-C3 is displayed in the simplest form, essentially a blank grid quadrangle with no background or context except for the boundary lines of the grid quadrangle. The boundary lines of the selected grid quadrangle can actually be drawn and displayed on the graphics display 18 near the edges of the rectangular display window. Or, as in the example of FIG. 1, the edges of the graphics display window are used as the boundary lines of the grid quadrangle.

As shown in the blow up or enlargement of the PDA graphics display 18 in FIG. 1, the boundary edges of the graphics display window 18 are formed with "hash marks" or subdivision marks 22 which further subdivide the selected grid quadrangle C3 on page 41. These hash marks or subdivision marks are also reproduced on the printed maps (not visible in FIG. 1) to further assist the user 12 in visually and intuitively determining his or her location with reference to the detailed mapping features depicted on the printed map. The hash marks or subdivision marks can be provided by a snap on adapter 24 as shown in FIG. 1A, which fits over the PDA graphics display window or a set of decals or "peel off" indicia 25 as shown in FIG. 1B which can be applied around the display window. The adapter hash marks can also provide necessary adjustments for change in aspect ratio of grid quadrangles in southern latitudes of Mexico and northern latitudes of Canada.

Referring to FIG. 1, the pages of the NE Regional Atlas themselves can be viewed as the first or highest level grid quadrangles of a first level grid that covers the selected country. The grid subdivisions of each page of the grid defining grid quadrangles such as C3 can be viewed as the second or intermediate level grid quadrangles of a second level grid. The hash marks or subdivision marks on the PDA graphics display window and also reproduced on the printed maps of, e.g., the NE Regional Atlas can be viewed as defining a set of third level or lowest level grid quadrangles of a third level grid. The first level grid of grid quadrangles of lowest resolution, the second level grid of grid quadrangles of intermediate resolution, and the third level grid of grid quadrangles of highest resolution can all be represented by paper maps of different series of the United States or other Country Atlas Series. Additional level grids with additional levels of resolution can also be provided.

By way of example, a first set of printed maps can be provided in the format of a country atlas such as a United States Atlas in which the pages coincide in geographic area depicted with the first level grid quadrangles, each covering a region of the country such as the northeast region. A second set of paper maps can be provided in the format of regional atlases such as the NE Regional Atlas 14 in which the pages coincide in depicted geographic area with the second level grid quadrangles. An additional or optional set of paper maps can be provided in the format of subregional atlases in which the pages coincide with the grid quadrangles such as the C3 grid quadrangles shown at Page 41 of the NE Regional Atlas of FIG. 1. The additional set of paper maps depict surface features in greater detail and with greater resolution than either the first or second set of maps. A third set of paper maps can be provided in the format of, for example, metropolitan or metro atlases in which the pages coincide in geographic area represented, with the third level grid quadrangles defined, e.g., by the hash marks or subdivision marks within the second level grid quadrangles. The third set of printed paper maps covering smaller geographic areas than the first or second sets of printed maps depict surface features in even greater detail, for example showing all streets of an urban or suburban metro area.

Furthermore, the PDA or other digital computer (EC) such as a personal computer (PC) can be programmed to shift between grid quadrangles at the same grid level and zoom between the grid levels and present grid quadrangles at any selected level filling the graphics display screen. Each grid quadrangle at each level is identified by a unique identification code, name, or address similar to US-NE-41-C3 for presentation on the graphics display. As hereafter described, the user can select the desired grid level of detail or resolution of a printed map and display a corresponding grid quadrangle on the PDA or other PC.

In the preferred example illustrated in FIG. 1 and subsequent figures, the grid lines forming the grid quadrangle boundary lines are substantially parallel with and substantially coincide with lines of latitude and longitude as the preferred geographical coordinate system. Processing and computation of geographical locations and grid boundary lines therefore ultimately occurs in calculations based on the traditional latitude and longitude coordinate system. However other geographical coordinate systems such as the Universal Transverse Mercator (UTM) coordinate systems and other mapping coordinate systems may also be used for defining the grid quadrangles and grid lines.

The simplified CAMLS system set forth in FIG. 1 requires minimal electronic memory to bring to life the paper maps and add an interactive dimension. An initial database is required identifying all the unique ID codes of the respective grid quadrangles along with the geographical coordinate location of grid boundary lines. A database manager and drawing algorithm presents each grid quadrangle as required by user queries or inputs and by GPS data and GPS data processing algorithms.

The invention provides additional levels of display background detail and context to facilitate user correlation between the PDA/PC/EC screen graphics display and the printed paper maps. For example, as shown in FIG. 1C, the blinking dot 28 showing user location based on GPS data can be accompanied by cross hairlines 30 to correlate the user location with subdivision lines at the border of the screen display or grid quadrangle boundary lines for correlation with similar marks printed on the paper maps. Additional GPS travel data can be imparted using an arrow 32 instead of a blinking dot to show the direction of travel of the user as shown in FIG. 1D. Exact user location can be shown by a "hole" or circle 34 in the arrow head, and the length of the arrow can be correlated with speed. The previous path of travel can also be shown in a track on the display.

A variation on the CAMLS system of FIG. 1 is illustrated in the system 10a of FIG. 2. According to system 10a two PDA's 15,15a are provided with GPS receiver capability for two users 12,12a. The two PDA's are also linked to each other by cellular or wireless modems for direct communication of each other's position. Each PDA is programmed to display a "me" position blinking dot 20 and a "you" position blinking dot 21. In this case each PDA is displaying on its respective graphics display, a higher level grid quadrangle corresponding to the entire page 21 of the NE Regional Atlas showing the respective locations of the two users 12,12a on the same grid quadrangle. The two users can then correlate respective positions with surface features depicted in detail on the page 21 printed paper map and then approach each other or meet at an agreed upon common point. The system 10a of FIG. 2 can be expanded to track an entire fleet of vehicles or other delineated groups of mobile units for a variety of purposes.

According to another mode of operation of the computer aided map location system 10 of FIG. 1, the PDA 15 may have no GPS receiver and capability. The user 12 may initiate operation of the CAMLS system with a query on the PDA such as "Where is Freeport, Me.?" The PDA responds by displaying in the alphanumeric display the unique grid-name of the grid quadrangle in which Freeport, Maine is located. The respective grid quadrangle is displayed on the graphics display window of the PDA. A dot or shaped image is presented and highlighted on the grid quadrangle at the location of Freeport, Me. for correlation with surface features depicted in greater detail on the printed paper map as heretofore described.

Seeking greater information the user might ask for all e.g., hotels/motels in grid quadrangle US-NE-41-C3, or all e.g. restaurants. These are displayed at respective latitude and longitude locations on displayed grid quadrangle C3 correlated with grid quadrangle C3 of the map on Page 41 of the Northeast Regional Atlas. The displayed image locations can therefore be correlated with locations on the printed map using, for example, mapped surface features depicted in detail on the printed map. Locations of the selected objects such as hotels or restaurants may be derived from databases stored in separate memory devices such as PCMCIA cards inserted in the PDA. External databases can be accessed by wired or wireless data links. Hotels or restaurants may be indicated and displayed using standardized symbols and accompanying text information.

Or, the user might request all restaurants in Freeport, Maine in turn located e.g. within the grid quadrangle C3 of the map on Page 41. For this purpose the user may initiate a zooming transition to a third level grid quadrangle within C3 and assigned a unique ID code by alphanumeric indicia associated with the hash marks or subdivision marks which subdivide grid quadrangle C3 of the map at Page 41 of the NE Regional Atlas. On this metro level grid quadrangle representative streets of Freeport, Maine may be available for display in association with the selected loc/objects located by geographical coordinates within Freeport, Me. In this respect, it is apparent that a variety of levels of context or background may be displayed with selected loc/objects identified by geographical coordinates for display on the PDA or other PC display as hereafter described.

A variety of locatable objects (loc/objects) may be available for queries posed by the user according to the memory capacity of the PDA, memory devices available to supplement PDA memory with additional internal databases, and data links for accessing external databases. Such classes of objects may include hotels/motels, restaurants, tourist attractions, destinations, routes, cities, municipalities, transportation services, parks, recreation areas, campgrounds, hospitals, museums, zoos, etc., each shown by characteristic symbols and where appropriate accompanying text identification. For categories of users other than travelers such as city and town planners and officials other classes of objects may be available in supplemental databases such as fire hydrants, classes of buildings, land use categories, municipal infrastructure, etc., again all shown by characteristic symbols, etc.

By way of example another mode of operation of the system of FIG. 1 is for routing. The user enters current location and proposed destination. Alternatively, with a GPS receiver and capability, the current location of the user is derived from GPS data and the user enters a proposed destination. The user location and proposed destination are displayed on an appropriate grid quadrangle on the graphics display window of the PDA for correlation with locations depicted in detail on a corresponding printed map. The grid quadrangle is selected at an appropriate grid level to encompass both current location and proposed destination. The user then asks for a proposed route or alternate routes to the destination which may be derived from a database of routes, e.g. on a supplemental memory device. In this respect the routes can be viewed as locatable objects (loc/objects) with geographical coordinates located on the PDA graphics display for correlation with mapped features depicted on the corresponding paper map. Alternatively, routing software such as the Sedgewick-Vitter algorithm described in James A. McHugh, ALGORITHMIC GRAPH THEORY, Prentice Hall (1990) pp 107–108 can be used to determine an optimum route from the user location to proposed destination for display on the selected grid quadrangle.

Important features of the CAMLS system of FIG. 1 may be characterized as modality, selectivity, and modularity. Modality refers to the different modes of use of the system summarized above including capability of providing responses to the queries "Where am I?", "Where is Freeport, Me.?", and "How do I get there?" Additional queries can be posed relating to classes of locatable objects (loc/objects) locatable in the selected geographical coordinate system for display on the graphics display and derived e.g. from supplemental databases. The CAMLS system can be operated in a communications mode adding a communications dimension to the mapping data. This varied and rich modality of the invention brings to life the paper maps and gives them a dimension of intelligence not otherwise available to the map reader. All features displayed in simple and bare outline on a grid quadrangle of the graphics display of the PDA or other PC correlate with surface features depicted in far greater detail on the printed map for visual and intuitive correspondence and map reading without mathematical calculation or quantitative determination required.

Figure 3:
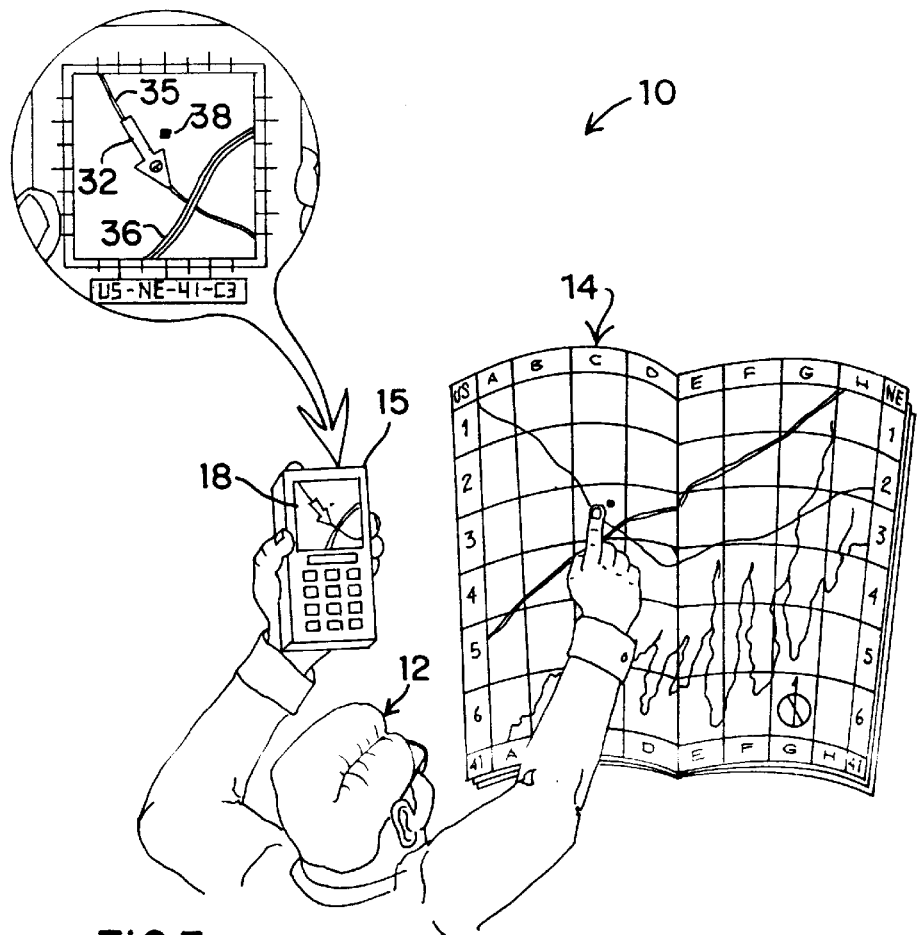
FIG. 3 is a diagrammatic action view showing a user operating the CAMLS system with selected background context also presented on the PDA display to facilitate user correlation with mapping features depicted in greater detail on the printed map.

Selectivity refers to system capability that allows the user to select greater or lesser amounts of context and background to accompany a blinking dot display of user location, image display of a proposed destination and proposed route, or loc/objects selected for display on a grid quadrangle. The greater or lesser degrees of background, overlays, or loc/object types, can be used to facilitate user correlation with locations and mapped surface features depicted on the printed maps. By way of example, use of the CAMLS system 10 with a selected level of background context is illustrated in FIG. 3. As shown in FIG. 3, the graphics display screen 18 of the PDA not only shows the user location by arrow 32 of the type illustrated in FIG. 1D, but also two major routes 35,36 and a loc/object 38, for example a well known landmark that may also be accompanied by identifying text. This modest contextual background facilitates correlation by user 12 between the grid quadrangle display on PDA 15 with the surface features depicted on the correct grid C3 of the corresponding paper map of e.g. the NE Regional Atlas 14. The level of detail of this background context can be selected by the user by specifying a priority level of background detail as hereafter described. Such different levels of background detail may be available in the internal PDA memory, by supplemental memory devices such as PCMCIA cards, or by communications links with other databases, information services, and other CAMLS systems.

The modularity of the invention refers to the availability of multiple databases, internal databases in computer memory or in separate modules or memory devices, and external databases through wired and wireless data communication links. This modularity makes possible the foregoing selectivity in the hands of the user, permitting the user to select and pose queries relating to many different classes of loc/objects for display of the graphics display screen of the PDA or other PC and with many different levels of context or background according to the user requirements.

Figure 3A:
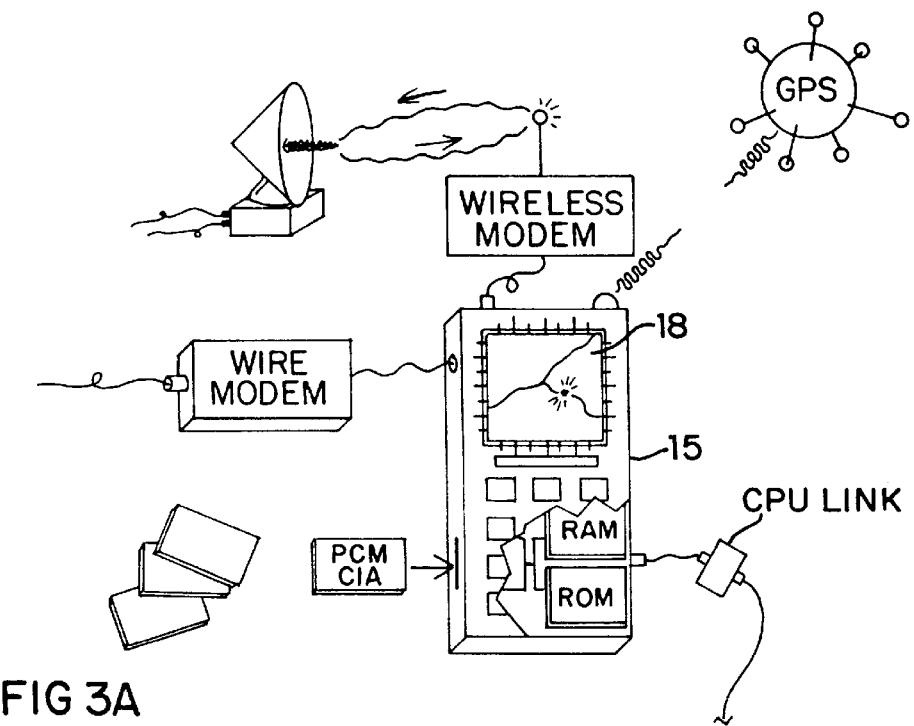
FIG. 3A is a detailed diagrammatic view of the CAMLS PDA/PC showing alternate sources of mapping information including memory devices, wire communications links, and wireless communications links.

An added dimension to each of the foregoing embodiments of the invention is that the databases available for queries on the system 10 are not limited to memory devices such as PCMCIA cards carried with the system. By means of wireless modem and FM and cellular communications links as well as wire modems, the user can query databases for loc/objects and contextual background from central locations, information service bureaus, or other databanks on line or in real time for latest updated information. As hereafter further described essentially unlimited databases and sources of information can be made available to the user for display and correlation with the detailed paper maps of the accompanying atlas as illustrated in FIG. 3A.

Figure 4:
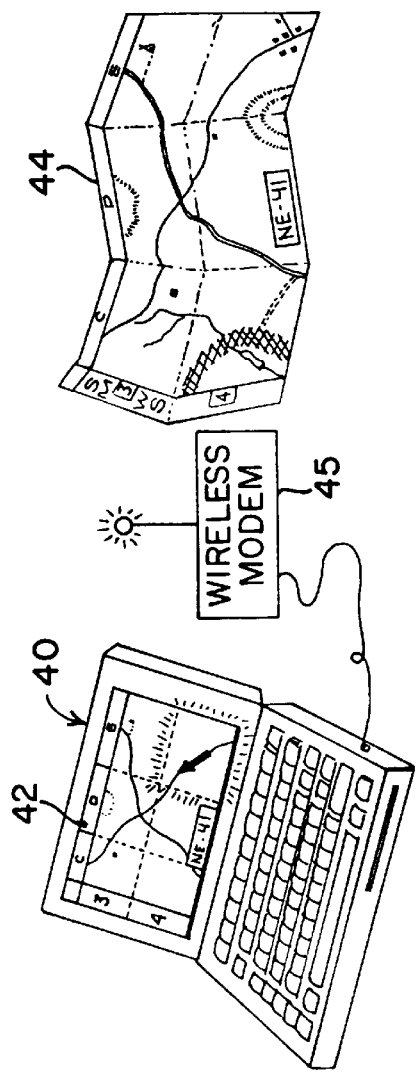
FIG. 4 is a diagrammatic view of an "upgraded" CAMLS system using a notebook or powerbook PC.

As database sources of information and contextual background increase in complexity, the CAMLS system appropriately upgrades in system hardware to handle the information load. As shown in FIG. 4, a notebook or powerbook computer 40 becomes the hardware medium for display of selected grid quadrangles and user queried loc/objects. With increased memory and computing capability, the graphics display 42 of powerbook 40 can be used to display at the same time multiple grid quadrangles correlated with a printed map 44. The active grid quadrangle on the display can be highlighted at the grid boundary lines as shown in FIG. 4. The user can select varying degrees of background context for display by specifying a priority level of detail at the keyboard as hereafter described. Such a priority level of background context may include, for example, major highway routes 35,36, as in FIG. 3 to facilitate correlation with the printed map 44 which still depicts surface features in far greater detail than is available on the display of grid quadrangles of the powerbook display 42. Supplemental databases of loc/objects are available to the powerbook 40 on floppy disks and over wireless modem 45 through cellular and FM communications links. Additional spatially related data about the loc/objects can also be queried from the supplemental databases.

Figure 5:
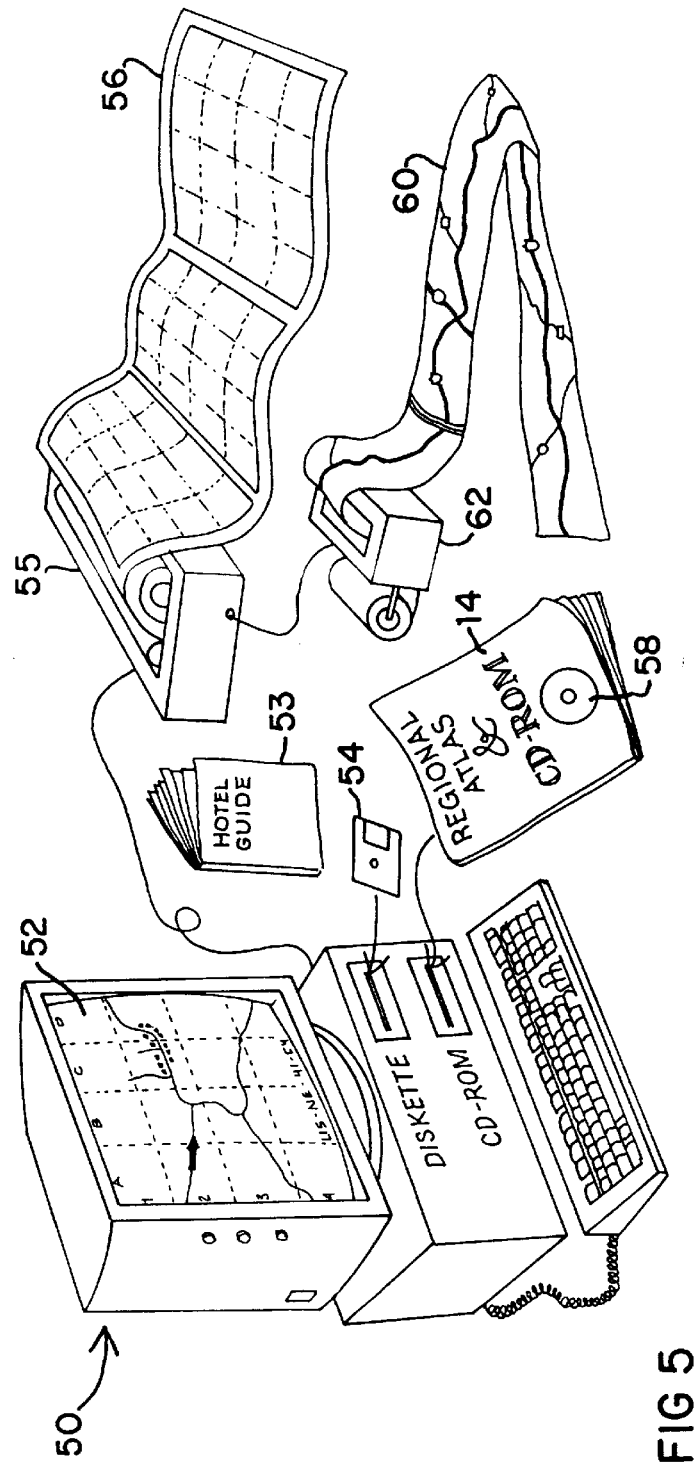
FIG. 5 is a diagrammatic view of a further "upgrade" of the CAMLS system using a desktop PC or workstation with hard copy output.

A further upgrade in CAMLS system capability is illustrated in FIG. 5 using a desktop PC or workstation 50 for further elaborating grid quadrangle displays on the computer graphics display 52 for correlation with the more detailed printed maps of atlas 14. Loc/object databases such as hotel/motel guides 53, restaurant guides, etc. are available on floppy diskettes 54 selected by the user. Extensive information about the loc/objects can be queried by the user from the CAMLS computer. The additional background detail capability for graphics display, also provides the opportunity for printing hard copies of the display on printer 55 providing simplified maps 56 in different formats. With provision of the atlas 14 in the form of CDROM 58 full map making capability for printing more detailed maps is also available.

According to another variation of the CAMLS system, the desktop PC embodiment 50 can be used with routing capability and software to generate selected routes from origin to destination. The route can be made available in hard copy in the form of strip maps, trip ticket, or route maps 60 from printer 62. As shown in more detail in FIG. 6, the grid format graphic displays of PC 50 can be made available in hard copy in a variety of formats including strip maps 64, page maps 65, and individual grid quadrangle maps 66. Databases for loc/objects of interest can also be provided on memory devices, on line information services, and other communications links.

In the preferred example embodiments according to the invention illustrated in FIGS. 1–6, the grid quadrangles are selected to be approximately square in area in the middle latitudes for example across the northern United States. A typical grid quadrangle size is selected to be for example approximately 2"×2" (5 cm×5 cm). For a NAFTA Atlas, however, the maps and associated grid quadrangles range from southernmost latitudes in Mexico to northern most latitudes in Canada. Because the preferred geographical coordinate system is the traditional latitude/longitude coordinate system, the longitudinal width of the grid quadrangles would otherwise vary considerably from the selected square area of the middle latitudes at the extreme southernmost and northernmost limits of the NAFTA Atlas range. For example, the grid quadrangles which are substantially square in the mid latitudes will be substantially fatter or wider in the southernmost latitudes and substantially thinner or narrower in the northernmost latitudes while retaining the same height dimension as the aspect ratio changes throughout the range. This variation in aspect ratio presents a visual layout problem in uniform map presentation and appearance over the NAFTA range.

According to the preferred example, the maps and grid quadrangles at a selected grid level are also ideally selected to be constant scale throughout the range of interest. The endeavor to preserve constant scale however encounters the dilemma of uniform map presentation and appearance. As a result it is permitted according to the invention to vary the scale slightly at the southern and northern extremes of the range to maintain a uniform number of grids across a map page of the Atlas. For example at exactly constant scale, 8 grid quadrangles may fit across a map page of the Atlas in mid-latitudes while only 7 of the fatter grid quadrangles fit across the page in south Mexico. On the other hand 9 grid quadrangles may fit across the page in north Canada. By slightly varying the scale at extreme ranges, a uniform number of 8 grid quadrangles can be presented across the page for uniform presentation at all latitudes of the range. This slight variation in scale at the north and south extremes of the range to achieve uniform presentation is intended to be and is encompassed within the phrase "substantially constant scale" as used herein and in the claims.

SYSTEM BLOCK DIAGRAM FIG. 7

Figure 7:
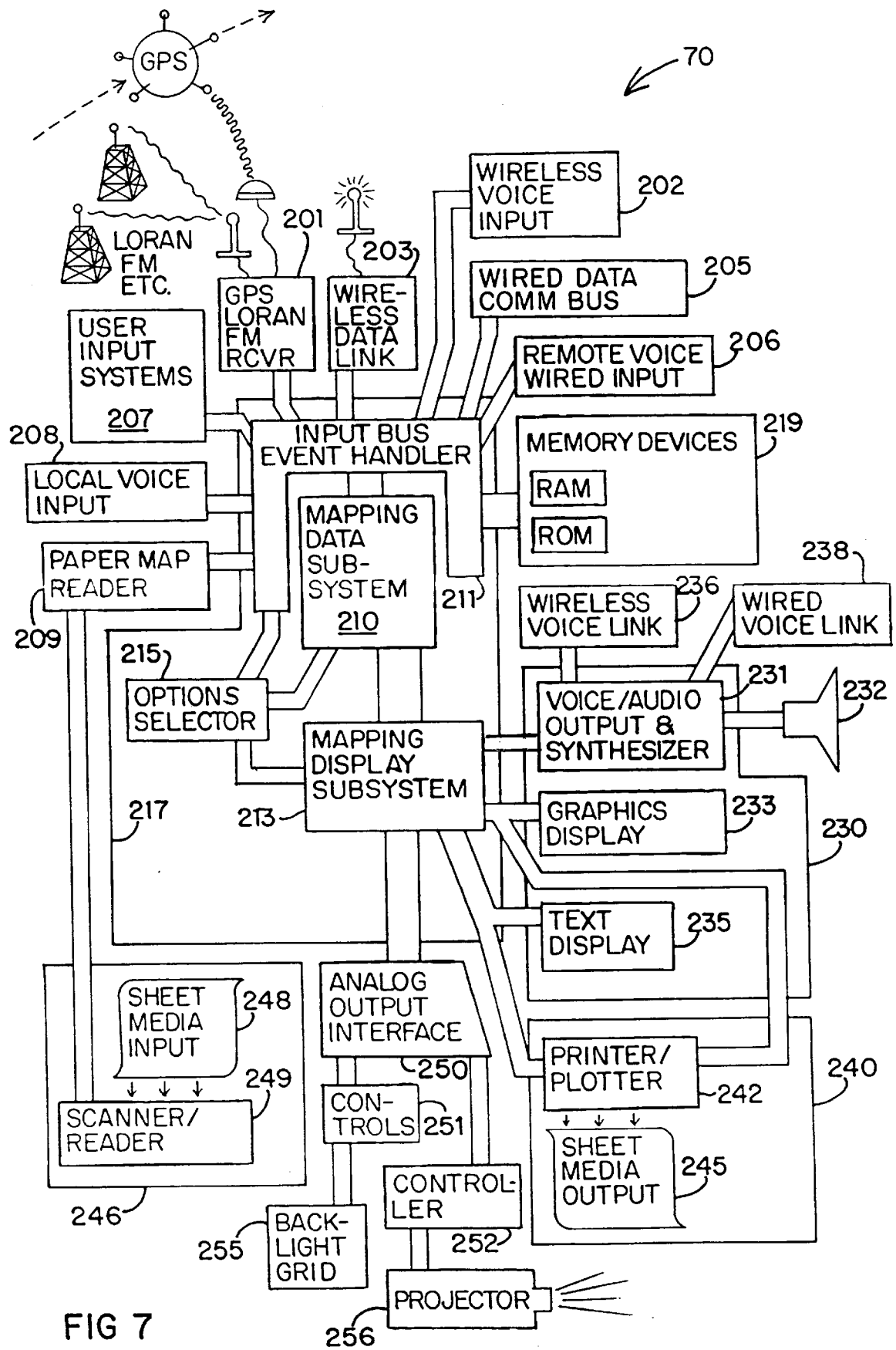
FIG. 7 is a system block diagram of the data processing computer system of the CAMLS.

A system block diagram of a complete data processing computer system 70 for a high end computer aided map location system is illustrated in FIG. 7. An input bus 211 also designated the event handler 211 performs the initial event handling function of receiving and passing valid data items from a variety of mapping data input sources. The event handler 211 therefore handles data events at, for example, a GPS, LORAN, or FM real time position data receiver 201, voice and data wireless links 202, 203, hardware communications bus, wire link, cable and modem 205, remote and local wired voice inputs with voice recognition 206, 208 user input devices 207, local voice input with voice recognition 208, scanner or paper map reader 209,246 and memory devices 219 which may include hard drives, CDROMS, floppy disks, PCMCIA cards, tapes RAM, and ROM etc. The overall function of the event handler 211 is to read, validate, order and pass all of the mapping information data input items into the CAMLS system under control of the options selector 215.

The data processing system 70 of the CAMLS system as shown in FIG. 7 includes hard copy input system 246 with sheet media input 248 and scanner/reader 249 associated with the paper map reader 209. Voice input is provided with voice recognition through wireless 202 and wired 206 remote voice input links and local voice input with voice recognition 208. As also shown in FIG. 7, the mapping data subsystem 210, option selector 215, and mapping display subsystem 213 form part of the microprocessor or CPU 217. Other applications software may be resident in the CPU 217 for operation concurrently or sequentially through interrupts, menu selections, windows, etc.

Another part of the CPU 217, the event handler 211, is coupled not only to all mapping data inputs 201, 202, 203, 205, 206, 207, 208, 209, 219 and 246, but is also coupled to any other non-mapping data sources of the computer system of FIG. 7. These non-mapping data sources may include other applications software also running on the computer system 217 such as word processors, spreadsheets, calendars, games, communications software, etc. The event handler 211 recognizes the valid data structures for mapping data or potentially mappable inputs and passes these to the mapping data subsystem 210 after performing initial typing operations. Nonmapping data is diverted or directed by the input bus event handler 211 to other applications software resident in the CPU 217 of the computer system of FIG. 7. A flow chart of event handler 211 operations is presented hereafter in FIG. 9.

The mapping data subsystem 210 receives valid CAMLS mapping data and other types of mappable inputs from the event handler or input bus 211. Standardized CAMLS data records are fast-tracked through to the mapping display subsystem 213. Optional mapping data subsystem procedures can organize other mappable inputs into standard CAMLS format or loc/object data structures. Data items ordered in the standard CAMLS format or data structure are passed to the mapping display subsystem 213 for possible display/output. FIG. 10 and Tables I, II and III deal with mapping data subsystem 210 operations. FIG. 11 and Table IV concern the mapping display subsystem 213 management of display/output options.

When the CAMLS data processing system 70 is first turned on, the options selector 215 is consulted to assess the current status of user selections or automatic subprograms enabled or available within the specific software configuration. For high end CAMLS implementations, such as desktop or mainframe systems, the options selector 215 provides the entire range of user selections and automatable optional routines and parameters hereafter disclosed in Tables I, II, III and IV. Menus, dialog boxes, etc. facilitate user selection among the optional system settings and executable operations managed by the options selector 215. Simpler CAMLS implementations, such as special purpose hand held devices with embedded CAMLS software incorporate truncated, but generally compatible, versions of the complete range of CAMLS options, disclosed in Table I, II, III and IV.

The options selector 215 is also associated with control panel, setup and management functions for particular sets of hardware inputs and outputs connected to specific devices which implement different versions of the CAMLS software. After being turned on, the CAMLS system continues to operate according to the user selections, hardware setups and enabled software options recorded and managed by the options selector 215. The user can interrupt CAMLS operations to change options selections while the system is in use.

As discussed in the next paragraph, options selections can also be adjusted during operations by automated subprograms.

The options selector 215 is adjustable and programmable for interacting with the event handler 211, mapping data subsystem 210 and the mapping display subsystem 213. The options selector 215 facilitates coordination and forming combinations of the optional routines or procedures for data conversion, location assignment, data structure building and output/display disclosed hereafter in TABLES I, II, III and IV respectively. This is accomplished by well known programming methods for managing lists of computerized procedures, as implemented within a generalized options loop for each TABLE. Through appropriate menus, in more capable CAMLS implementations, users can coordinate and combine the optional routines for customized operations using macros or batch files. Automated subprograms provided with "higher end" CAMLS software systems also integrate optional procedures in order to perform advanced CAMLS functions disclosed in the TABLES, such as displaying a scripted series of digital maps, sharing of the map, display by text messages assigned a geographic location, sequencing display of digital map overlays on chosen topics, or voice outputting topical information linked to specific locations as an accompaniment or alternative to map displays for the specific locations.

For an alternative embodiment, the options selector 215 can set the order in which the input bus 211 processes inputs, or polls input sources shown at 201, 202, 203, 205, 206, 207, 208, 209 plus 246, and 219 in FIG. 7. This is not necessary, because in the preferred CAMLS embodiment, the event handler 211 processes inputs as received from all available and enabled input sources.

As disclosed in TABLE IV and related specifications on the optional display/output routines, the options selector 215 also enables users and automated subprograms to set different levels of quantitative display intensity or topical subject matter shown on screen. In effect, the user selections or automated routines alter the level of map detail displayed ranging from a virtually blank background and singular loc/object display in a named grid quadrangle to substantially whole map displays which are made up of multiple map overlays or collections of multiple loc/object types. Referring to TABLE IV and the data structure of qualified CAMLS loc/objects disclosed in FIG. 8, the options selector 215 in response to user selection or automated subprograms can declutter and select the output and display. For example, user selection or automated subprograms can cause a graphic display consisting exclusively of major highways, gas stations, natural landmarks, or campgrounds, etc.

The mapping display subsystem 213 cooperating with the options selector 215 controls the selection of digital displays 230 including graphics display 233 and text display 235, local voice output 231, 232, wireless and wired remote voice outputs 236, 238, hard copy outputs 240 including printer 242 with sheet media output 245 and analog output controllers 251,252 for wall map display 255 and projector 256. The mapping display subsystem 213 also performs database manager functions in selecting and organizing data for presentation at the various outputs. FIG. 11 presents a flow chart of the mapping display subsystem 213 with related optional output/display procedures disclosed hereafter in Table IV and accompanying description.

In addition to or even instead of the graphics display 233, text display 235, and hard copy output 240, the digital outputs 230 of the CAMLS computer system also includes local voice/audio output using e.g. a voice synthesizer 231 and speaker 232. Voice output/sound output can also be transmitted to remote locations over wireless 236 and wired 238 voice data links. The CAMLS system computer output may provide only a voice identification or text identification of a uniquely named grid quadrangle where a loc/object is located. Reference is then made by the user to the corresponding printed map containing the identified grid quadrangle.

Additional outputs include an analog output interface 250 for controlling a variety of display outputs. For example, the analog output interface 250 is shown coupled to the control 251 for a backlighted translucent wall map display 255 hereafter described with reference to FIG. 14. It is also coupled to a projector controller 252 for controlling a map and grid projector 256. Additional outputs also include functional or operational outputs such as a line output or odometer style alphanumeric display.

STANDARD CAMLS DATA STRUCTURE FIG. 8

Figures 6, 8:
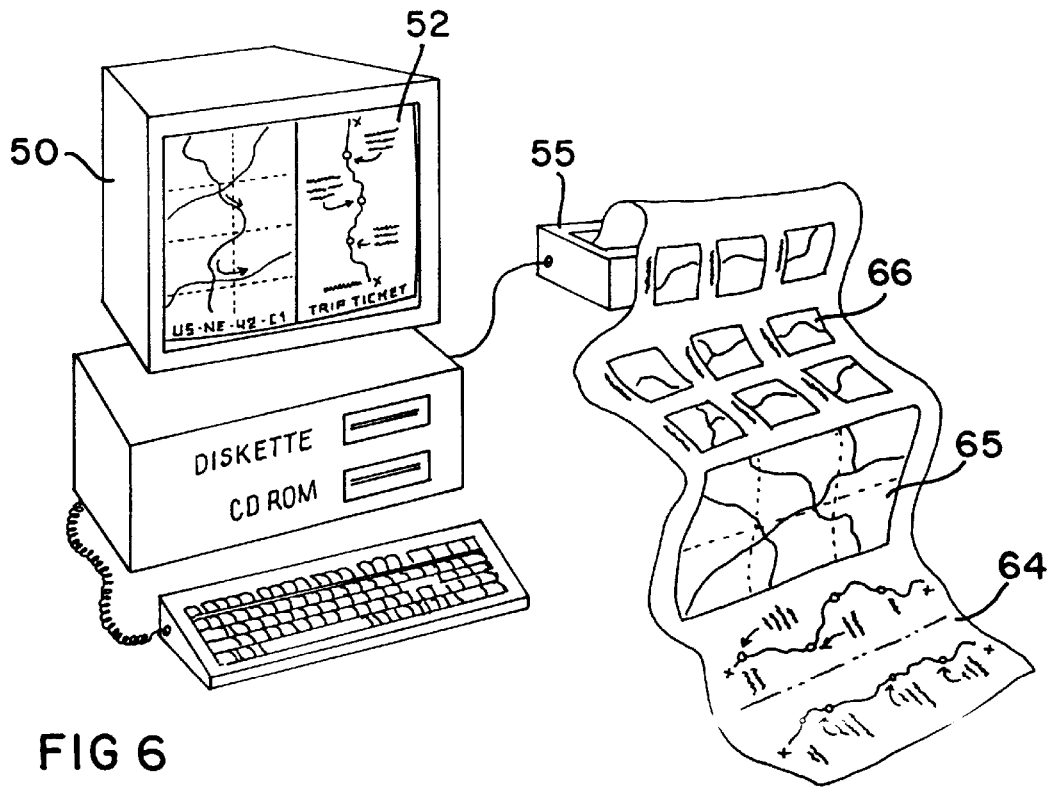
FIG. 6 is another diagrammatic view of the CAMLS system with desktop PC or workstation programmed for printing strip maps or "trip tickets" showing proposed routes of travel from a point of origin to a destination.
FIG. 8 is a diagrammatic view of a data structure for mappable data items corresponding to loc/objects in the data stream of the data processing computer system of FIG. 7.

FIG. 8 is a general representation of the standard CAMLS data structure. This standard data structure constitutes a format for recording and transferring units of CAMLS data broadly defined, recognizable to the CAMLS software as being in proper form for processing. Particular CAMLS data structures, which satisfy minimum criteria for completeness and correctness, thereby qualify as standard CAMLS loc/objects i.e. candidates for output/display routines. However, lack of conformity with this standard CAMLS data structure, i.e. presence of certain predefined conditions of incomplete or incorrect data structure which CAMLS software is not able to repair, results in the nonconforming raw data packet either being returned to the originating application in a multitasking environment or simply being garbaged out. The CAMLS structure shown in FIG. 8 works like a jig or template or more aptly a blank form for the formatting and processing of raw data packets or input events handled and processed by the CAMLS software system for selective output/display.

The data structure or data item for each loc/object handled by the CAMLS data processing system and integrated into the display data stream is described with reference to FIG. 8. Each data item is characterized by a first header data element which is an ID code identifying the data item by the input device source of the data item, the loc/object type, e.g. hotel, restaurant, campground route, tourist attraction etc., and the chronological date and time of entry or processing by a date and time stamp. Thus, the event handler 211 and mapping data subsystem 210 can initially organize data items according to input device source, loc/object type, and chronological date and time of entry or processing.

The second data element of the data structure of FIG. 8 includes lat/long, the latitude and longitude coordinate location of the locatable object according to the traditional latitude/longitude geographical coordinate system. This data element permits manipulation and display of the respective loc/object in any context according to underlying calculations based on the universal latitude/longitude coordinate system. All grid quadrangles and loc/objects are ultimately characterized within the universal latitude/longitude geographical coordinate system. While other geographical coordinate systems may be used, as noted above, the preferred coordinate system is the universal latitude and longitude coordinate system. The second data element in the data structure also includes the grid name in which the loc/object appears. This enables the CAMLS system to respond to the query, for example, "Where is Freeport, Me.?" by responding with the correct grid name in which Freeport, Maine appears. The grid name data element also permits selection of pertinent loc/objects by grid name for display in response to user defined queries. As used in the specification and claims, "grid name" refers to the unique grid quadrangle name generally specified in alphanumeric characters.

The third substance data elements shown in FIG. 8 designated "content" or "link" data elements refer to any associated text information, image shape or symbol characterizing the loc/object, specifically required algorithms, graphics, audio, etc. The data structure illustrated in FIG. 8 is referred to herein as a data structure or data item and when constructed with valid logical contents becomes loc/object which can be selected for display or output on the PDA/PC/EC graphics display or other output format. The grid quadrangles themselves can be viewed as data items or loc/objects ordered and presented in the data structure of FIG. 8. All of the data structures are passed in the order received in a data stream to the mapping data subsystem 210. The separable and intelligible portions of the data stream are thus the data structures or data items which in turn coincide with the locatable objects or loc/objects from more simple points and lines to more complicated geographical and mapping images and including the grid quadrangles.

In summary, as shown in FIG. 8, there are three major components of every CAMLS data structure. First, there is the unique ID composed of three elements: an input device stamp; plus a loc/object type stamp; along with a time & date stamp. These three stamps, combine to form the ID of every CAMLS data structure. The second major component of the standard CAMLS data structure is location data consisting of lat/long as well as CAMLS gridname entries. The third major component of standard CAMLS data structures consists of the data substance comprised of at least one content or link. One single data structure might embrace more substance, including multiple contents in addition to a plurality of links to associated data records.

Contents or links constitute the substance, the information or function of interest to the user for any CAMLS data structure. In the case of hotel data, all information of interest to the user may be included such as the hotel name, street address, room prices, phone number, details on facilities and amenities, and even for example the picture of the ocean view from the honeymoon suite. This substantive information appears either as contents contained inside the particular CAMLS data structure under consideration, or available elsewhere in other data records identified by links or pointers. Such pointers are the digital addresses of the related records containing the significant information.

It is important to note that the example of hotel information does not exhaust the possible substantive diversity of contents and links in a standard CAMLS data structure. A CAMLS loc/object may consist substantively of anything and everything a standard CAMLS data structure contains as contents or links. Consistent with the broad concept of the invention, valid contents and links, making up the substantive contents of a CAMLS loc/object, can include all (or any) of the following: symbols such as dots, arrows, a tent image as a campground symbol, a fuel pump image to symbolize gas stations, etc.; text ranging from a placename to a lengthy document; graphics including digital images, analog pictures, video or animated visual images; sound recordings; complex data structures such as databases; polygons as well as point and line or vector geographical or cartographical entities representing roads, topography, water bodies, political boundaries, proposed routes, paths traveled, trajectories, lines of fire, lines of position, survey lines, abstract co-ordinate systems, etc.; sub-programs or algorithms functions or operations which unfold or proceed to work from a specified location.

Such a sub-program may be designed e.g. to search both internal and external databases in order to retrieve, and make available for display, information on all facilities of a specified kind e.g. inside of a 50 mile radius around some specified point on the face of the earth. By way of example the sub-program may be an algorithm or a sub-program which performs an operation, like ringing an alarm or initiating a communication, when and if the user of a GPS equipped CAMLS device approaches a pre-selected spot or enters a specified CAMLS grid quadrangle. A complex CAMLS loc/object can still have a relatively compact standard CAMLS data structure if the bulk of its substance is made up of links to other data records. The information is actually stored at specified addresses in internal memory or some accessible external databases. On the other hand, a valid CAMLS loc/object can contain a lengthy document or an extensive database inside of its standard CAMLS data structure among its list of contents.

The standard CAMLS data structure consists partly of actual substance which is a very flexible or plastic structure capable of containing or linking to a great variety of data and functions. By contrast, the header portion of all standard CAMLS data structures is cast in a more rigid or formalistic framework consisting of ID and Location Data components in a precise arrangement. This enables the CAMLS software to readily recognize and process CAMLS loc/objects according to their ID and location data. In other words the exactly organized ID and location data components of each standard CAMLS structure form an identity tag so that it is easy for the CAMLS software to read each identity tag and its ingredients. Moreover, the rigid formal data structure that CAMLS software can readily recognize whether any entries in the ID or location data blanks are improper or whether any blanks are empty or not yet filled-in.

Known programming techniques, which involve a process of matching the particulars of identified data structures with pre-defined criteria, are sufficient to enable CAMLS software to perform the reading and recognition tasks. In more detail, these programming techniques rely on the fact that the ID and location data always consist of entries, or space reserved in memory, of particular dimensions, ordered in certain ways and with characteristic features. CAMLS software is enabled not only to sort standard CAMLS data structures for processing by reading the ID and location data tags but also to distinguish and selectively process CAMLS data structures with incomplete, or empty, or improperly filled-in location data or ID data structure entries. This allows CAMLS software to utilize the formalistic ID and location data header portion of each standard CAMLS data record for processing unknown location data by "location assignment", for error detection and repairs, and to identify and reject incomplete or incorrectly filled-in data structures.

Every particular standard CAMLS data structure, complete and correct enough to qualify as a CAMLS loc/object, must possess an ID necessarily consisting of the three ID elements: an input device stamp; a loc/object type stamp; and a time & date stamp. Each stamp is subject to modification as the particular standard CAMLS data structure is processed within the software. The time & date stamp grants a unique identity to each particular CAMLS data structure. Data structures are stamped one at a time. Therefore there is at least a nanosecond difference between each and every CAMLS data structure. But, many individual CAMLS data structures or loc/objects will often share the same input device stamp or identical loc/object type stamps. For example, several inputs from one GPS position sensor device would share the same input device stamp. Similarly, several comparable units of hotel information will each possess the same hotel loc/object stamp. In summary, while the unique time & date stamp permits CAMLS software to identify particular individual CAMLS loc/objects, the other two stamps for input device and loc/object type can be used singly or in combination by CAMLS software to sort and group standard CAMLS data structures as required for processing and possible display/output operations.

The location data elements in each CAMLS data structure are designed and intended to be somewhat redundant. Lat/longs can be calculated from grid quadrangle names, at least to a limited degree of accuracy or detail. A gridname is readily derived from a lat/long, sufficiently precise. Every unique CAMLS grid quadrangle is identified and located according to one example by the lat/long of its upper lefthand or northwest corner, factoring in its scale or magnitude. Other locations may of course also be used. In the FIG. 10 flow chart for the mapping data subsystem 210, at steps 313, 315, 331 & 335, lat/longs are extracted from gridnames, and vice-versa. These transformations are done by calculation methods well known in the art of computer mapping. Such calculations or transformations, in general, entail formulae for computing XY coordinate relations, taking into account both map scale differentials and map projection variables involving various imperfect spheroid geometries. The result is lat/longs and grid names with calculated redundancy.

Data compression in order to save memory or to speed up communications such as facsimile transmissions can be achieved by stripping out grid names. Stripped out grid names then can be readily calculated again as needed, from the retained lat/long location data whenever the compressed CAMLS data structure is retrieved from memory, or emerges at the other end of a streamlined communication between separate devices equipped with CAMLS. However, many routine data building and display processes, as well as obvious buffering techniques for speeding up computer operations, involve searching or retrieving and interrelating many data records associated with the immediate and adjacent grid quadrangles. It is therefore useful to retain a separate entry or blank for grid name location data within the standard CAMLS data structure.

CAMLS loc/objects standard data structures, can be readily classified or typed by well known processes. These typing procedures enable the CAMLS software to classify standard CAMLS loc/objects or data structures according to their substance or contents and links as recognized by routine or obvious techniques for programming comparisons between specified data records and predefined profiles. Therefore, the CAMLS software can classify or type and re-classify and re-type standard CAMLS data structures with refinement sufficient to distinguish between the types. For example, the typical ingredients or substance, or contents and links appropriate for optional location assignment routines performed in the options loop are disclosed generally at steps 317, 319, 321 & 323 in FIG. 10A and shown in more detail in TABLE II. CAMLS software makes the distinction between a text message which is the appropriate type of substance for located screen sharing, and predefined cartographic symbols associated with established categories of proper place names or hotel names, etc. which are suitable candidates for geocoding. Since geocoding and located screen sharing are both subsumed within the larger category of location assignment procedures, particular symbols associated with proper place names are typed for location assignment, in addition to being sub-typed for geocoding. Longer text messages, not connected to tell-tale cartographic symbols, typed as a general matter for location assignment, are appropriately sub-typed for optional located screen sharing procedures. Thus the separate marked type and sub-type are provided within the FIG. 8 loc/object type box or space.

In the FIG. 8 standard CAMLS data structure, information needed to fill in blanks in a given data structure may often be found in other parts of that same data structure. For example, grid quadrangle names can be derived from lat/longs, and vice versa as shown in steps 313, 315, 331 and 335 in FIG. 10. For another example, geocoding can sometimes be accomplished as follows. Suppose that CAMLS software is used to geocode a hotel database. Each data record in the hotel database includes information on street address, zip code and phone numbers, all ordinary location indicators. CAMLS software assimilates each data record into a unique CAMLS data structure, but as yet lacking location data in the form of entries or lat/longs or gridnames. Geocoding is often accomplished by searching in other internal or external databases. But in this fairly common instance, the lat/long and gridname location data necessary for geocoding is derived from the everyday location indicators e.g. street address, phone numbers, zip codes, etc. already part of the substance of each of the standard CAMLS data structures under development. Each one becomes a full fledged CAMLS loc/object of the hotel type or sub-type. In short, the CAMLS software searches both the contents and links of the data structures at hand, along with the available internal and external databases, for information to complete and correct or locate a CAMLS loc/object.

FLOW CHART APPLICATIONS OF THE STANDARD DATA STRUCTURE

The FIG. 8 standard CAMLS record format or loc/object data structure facilitates the workings of the event handler 211, the mapping data subsystem 210 and the mapping display subsystem 213. For example, after performing routine validity tests on incoming inputs, the event handler or input bus 211 utilizes the standard CAMLS data structure to distinguish among mapping, mappable and non-mapping inputs. The preferred embodiment event handler 211 initially process all inputs as raw data packets in the order that the inputs appear at the respective input sources or ports. One alternative input bus 211 embodiment, typically a slower and less portable software process, polls the input sources or ports looking for certain predefined types of input. In either version of the invention, the event handler input bus 211, and the other subsystems, utilize the normative FIG. 8 CAMLS loc/object data structure like an identity tag or benchmark for sorting inputs.

Characteristic features of orthodox CAMLS data structures, appearing in the input stream, enable the event handler or input bus to identify all incoming raw data packets constituting standard CAMLS mapping data items at step 107 in FIG. 9. Such prepackaged standard CAMLS loc/objects are typed appropriately, at steps 113 and 136, then passed directly to the mapping data system 210 for further processing. In other words, at step 107 in FIG. 9, the CAMLS software fast tracks all raw data packets with the characteristic CAMLS data record header consisting of valid input device, loc/object type and time and date stamps, plus appropriate location data. At step 107, nonconformity with this standard data structure prompts raw data packets to be shunted aside. Moreover, in FIG. 9, if enabled, steps 111, 123 and 131 identify mappable types of inputs or raw data packets insofar as they approximate or partially conform to the standard boc/object data structure. For example, particular raw data packets, which are candidates for location assignment, are recognizable as such because they possess a standard CAMLS data structure but for the lack of regular CAMLS location data i.e. lat/long or grid name entries. Thus, at steps 123 and 125, absence of location data in an otherwise complete CAMLS data structure provides the key to sorting and typing such unsituated or locatable loc/objects for the optional location assignment procedures disclosed hereafter. In FIG. 9, at steps 111 and 131, if enabled, partial conformity with the CAMLS standard data structure facilitates sorting and typing of position sensor inputs and inputs in other geographic formats suitable for conversion to the CAMLS format. Moreover, the standard loc/object data record formats provide a benchmark to distinguish nonmapping data. In FIG. 9 at steps 115, 121, 127 and 133, raw data packets, characterized by a considerable lack of correspondence with the normative CAMLS data structure criteria, are garbaged out or diverted to other applications in a multitasking environment. In summary, the standard FIG. 8 CAMLS data structure facilitates initial sorting and typing of inputs.

The mapping data subsystem 210 also takes advantage of the standard FIG. 8 CAMLS loc/object data format. In FIG. 10, steps 301, 313, 315, and 331, for example, all involve the recognition of the presence or absence of the overall standard CAMLS format, or the presence or absence of specific location data components, namely lat/longs or grid names. Thus, the CAMLS loc/object data structure is used as a benchmark to sort and type input items for conversion from other geographic data formats, transformations between lat/longs and grid names, assignments of location data, and the building of related, available information to enhance loc/objects. Moreover, the standard CAMLS data structure also plays an important role in the optional mapping data subsystem 210 procedures which actually perform other data conversions, location assignments and building routines. In FIG. 10, these optional procedures are represented as generalized option loops, described hereafter in greater detail in conjunction with Tables I, II and III. In summary, the FIG. 8 standard CAMLS data structure facilitates processing within the mapping data subsystem 210.

The standard FIG. 8 data structure further assures that all mapping or mappable inputs are linked to particular geographical coordinates, according to the preferred embodiment, latitude and longitude. Prepackaged CAMLS loc/objects, the typical discrete contents of a manufactured CDROM map database or geographic data items available from a CAMLS service bureau for downloading on a fee per item basis, will contain location data already installed in the form of lat/longs and related grid names in standard CAMLS data record format as shown in FIG. 8. Open CAMLS systems also process raw data packets which are not located or identified with specific geographic coordinates or lat/long location data. Some examples include user location queries, candidate items selected for location assignment, inputs located within other geographic coordinate systems and nonmapping data passing through the event handler 211 in a multitasking environment. All raw data packets, not discarded or diverted as nonmapping items in the mapping data subsystem 210, became identified with specific latitude/longitude coordinates, for example by means of optional location assignment procedures disclosed hereafter with respect to Table II. All raw data packets are installed in CAMLS format by reorganization into loc/objects modeled on the standard CAMLS data structure shown in FIG. 8 before passing from the mapping data subsystem 210 to the mapping display subsystem 213. Therefore, all loc/objects passed to the mapping display subsystem 213 must possess location data in the form of lat/longs and grid names consistent with the FIG. 8 data structure format. In summary, the FIG. 8 standard CAMLS data structure enables the mapping display subsystem 213 to manage the CAMLS display/output with reference to particular lat/longs along with unique grid names formally associated with all loc/objects.

The standard CAMLS data structure plays a vital part in the mapping display subsystem 213, as shown in FIG. 11. For example, steps 403, 407, 411 and 413 concern the naming or display of a new CAMLS grid quadrangle, e.g. when users zoom or shift to a different scale or an adjacent grid. These same steps deal with the case of a moving user location, such as a traveling vehicle in which the user is operating a CAMLS device equipped with a GPS position sensor, when the vehicle moves from one CAMLS grid into an adjacent CAMLS grid. Steps 403, 407, 411 and 413 are engaged whenever the focus of the CAMLS display/output changes to another uniquely named grid. In other words, many operations that prompt new grid display/output can be conveniently described in terms of naming the new grid then changing the display/output accordingly. Another example is the process whereby CAMLS responds to location lookup queries such as "Where is Freeport, Me.?", "Where is the Spruce Point Inn?", or "Where am I?" on a CAMLS GPS equipped device. Such queries get answered by the display/output of the responsive gridname, and typically a map display including the named grid.

This same general process of the display/output of a new grid, according to its unique name, is also invoked when the user or an automated subprogram requests the display/output of the grid quadrangle, or a loc/object situated within that grid, corresponding to a set of geographical coordinates like UTM or lat/longs, or specified ordinary location identifiers such as a street address, phone exchange or zip code. The CAMLS software responds to such queries with display/output in relation to the uniquely named grid quadrangle which corresponds to the street address, phone exchange or other ordinary location identifier, or set of geographical coordinates. Of course, steps 403, 407, 411 and 413 also come into play when the user or automated functions actually enter the unique name of any adjacent, remote, smaller or larger scale CAMLS grid, i.e. any valid, unique grid name other than the name of the grid which is currently the focus or subject of the display/output. Entry of a new gridname is done by users entering alphanumeric text, or by clicking a mouse on listed grid names or graphically represented grids, or by various automated processes such as the search and retrieval operations responsive to a location lookup query, as well as optional procedures for sequencing or scripting map display/output concerning a group of grids disclosed hereafter relative to TABLE IV, step 457 and FIG. 15G. In summary, within the mapping display subsystem 213 steps 403, 407, 411 and 413 in FIG. 11 manage all such new grid name events, which impact on the display/output, utilizing particular aspects of the FIG. 8 standard CAMLS loc/object data structure.

Operations managed within the mapping display subsystem 213, involving new grid display/output, take advantage of two aspects of standard CAMLS data structure. First, every CAMLS loc/object includes the unique grid name as a location data component in the header portion the standard CAMLS data structure or data record format shown in FIG. 8. Second, also shown in FIG. 8, all CAMLS loc/objects are classified as to types or subtypes within the ID header portion of every standard CAMLS data structure. Hotels, campgrounds, restaurants, streets, political boundaries, users' locations, and water bodies are straightforward examples of types of loc/objects, further classifiable into subtypes for particular display/output purposes. The preferred embodiment of the CAMLS software invention also manages grid names and graphic displays of grid quadrangle boundaries as special types or subtypes of the standard CAMLS data structures or loc/objects. The following two paragraphs detail how gridname location data and gridname types are structured and used for mapping display subsystem 213 tasks.

First, here is an illustration of how the mapping display subsystem 213 deals with inputs ordered into standard CAMLS data structures which contain operant new gridname location data and prompt new gridname display/output. For example, take the case of a series of GPS position sensor inputs, indicating the moving location of a CAMLS equipped user traveling in a car. Each input event would be enrolled in the standard CAMLS data record format and typed as GPS position sensor loc/objects. Thus, all the GPS loc/objects would contain a gridname as a part of the standard location data indicative of the unique grid in which the user is currently positioned. This illustration is first concerned with travel within a single grid and next with the case of travel into an adjacent grid. As long as the gridname location data remains the same because the GPS position sensor is engaged in reporting successive locations inside a single grid, then step 407 in FIG. 11 keeps determining that the current grid name has not changed. But, when the user's vehicle moves into a new grid, adjacent to the grid previously traveled, all subsequent GPS position sensor inputs will contain the new gridname derived from the lat/long location data generated by the GPS sensor. Lat/long location data are transformed to gridnames and installed in the standard CAMLS data structure of GPS position type loc/objects in FIG. 10 in steps 313, 315, and 335.

Step 407 in FIG. 11 will determine that this new gridname is not the same as the current gridname of the grid quadrangle just exited by the user's vehicle. Then, step 411 implements the display/output of the new gridname and signals the user with a screen blink or audible beep. Step 413 performs the housekeeping chore of reinitializing the current gridname setting. Direct entry of a new gridname, responses to user location lookup queries, zooming to another map scale, and shifting or scrolling to an adjacent grid or map display are all examples of other processes also executed by the mapping display subsystem 213 as new gridname display/output operations through steps 411 and 413 in FIG. 11. Simple CAMLS devices or operations do no more than cause such display/output of the new gridname at this juncture. For complex CAMLS devices or tasks which involve greater database access, memory and graphic capabilities respond to the process of naming and entering the new grid with optional procedures such as redrawing the map display centered on the new grid, displaying a new selection of map overlays, or an intuitive symbol display representing the user's location, velocity, travel direction, etc. Optional display/output procedures are accomplished in steps 415, 417, 421, and 423 disclosed hereafter in relation to Table IV and for example steps 451, 455, 461 and 463 therein. In summary, many changes in the display/output managed by the mapping display subsystem 213 are prompted by steps 407 and 411 evaluating the gridname location data component of the standard FIG. 8 data structure of loc/object input.

Second, at least for more complex CAMLS implementations, not all input containing a new or noncurrent gridname produces the changes in display/output discussed in the preceding paragraph. Complex CAMLS procedures, implemented on higher capacity hardware devices, involve fetching and processing many loc/objects related to multiple grids. Steps 457, 463 and 465 disclosed hereafter in relation to TABLE IV, for example, concern optional and advanced procedures for sequencing map or grid displays, user location or position display/outputs, routing or line segment display/outputs often involving input across a plurality of grids, etc. FIGS. 4, 5 and 6 disclose multiple grid displays. Multiple grid inputs and outputs require a method for distinguishing new grid names meant to alter the current gridname setting. Operant new gridnames, so intended to change the display/output to focus on a new grid, have to be distinguished from noncurrent gridname location data in loc/objects passing through the CAMLS system for purposes incidental to computations and display/output operations involving multiple grids. The FIG. 8 standard CAMLS data record format facilitates this necessary distinction by the designation of special gridname types or subtypes. Loc/objects, containing new or noncurrent gridnames and intended to generate a new grid display/output, get specifically typed for that purpose. Special typing as an operant new gridname is accomplished as part of the process of the user making a selection designed to result in new grid display/output. Step 403 in FIG. 11 recognizes operant new gridname types and passes such loc/objects to step 407. On the other hand, in absence of special gridname typing, step 403 also functions to bypass steps 407, 411 and 413 in the event of loc/objects with new or noncurrent gridnames intended only for incidental and optional multiple grid procedures. In summary, the typing feature of the standard FIG. 8 data structure enables the mapping display subsystem 213 to manage display/output routines involving new or alternative and multiple grids.

Furthermore, there is a larger significance associated with the distinction between loc/objects specially typed to prompt new grid display/output versus "plain" loc/objects typically serving as the contents of the current output/display. This distinction coincides with the differential concept of a first database of grid quadrangles, each with a unique name and location, which can interact with a second database comprised of various other types of loc/objects ordinarily displayed as digital electronic mapping content. For a particular graphic map display, the current named grid quadrangle, with adjacent grids in the case of multiple grid display, provides the overall context or framework within which selected loc/objects like road networks, natural features or user locations are displayed within grids at their specific geographic coordinates. Zooming to a larger or smaller grid, shifting or scrolling to adjacent grid, a new operant gridname entered by the user or responding to some user query are all events which reorganize the context or framework of the CAMLS display/output around a new operant gridname. This reorganization of the CAMLS display/output is accomplished, or is at least initiated, through the recognition of specially typed new gridname location data in the standard FIG. 8 data structure embodied in loc/objects which are processed through steps 403, 407, 411 and 413 in FIG. 10.

THE FLOW CHARTS, FIGS. 9, 10 AND 11

The following flow charts detail the software logic and steps of the CAMLS system and cooperate to achieve a number of common objectives. First the software steps are designed to process data items already prepackaged in the authorized loc/object data structure on a fast track. This fast track processing is found in the primary flow path for fundamental operations down the left hand side of each of the flow charts of FIGS. 9, 10, and 11 from "START" to "STOP". Second, for multitasking CAMLS computer systems running several software applications, mappable data is separated from non-mapping data for processing by the CAMLS software. Third, the CAMLS software assimilates and assigns location or place information to any mappable or screen sharable information which is not in the final form of the accepted data structure. Such routines are shown in option loops branching from the fast track on the left to option loop paths on the right. Such option loops can complete the geocoding of mappable objects or standard loc/objects.

The option loops branching to the right thus function primarily to convert or transform information about geographical locations from formats not understood by the CAMLS software into the standard CAMLS data structure for loc/objects handled by the CAMLS system. Additionally the program option loops can also assign or tie specific geographical locations to various data objects, symbols, graphic images, algorithms, text information, and messages which are otherwise unsituated or unmappable but which the user would like to display on the map. Location assignment for this purpose is referred to as "screen sharing". This process of geocoding generally non-map objects brings them into the CAMLS mainstream for display as loc/objects at specified locations on a map or other forms of output. These option loop subprograms and routines for putting such objects and things at places on maps are referred to herein as selectable and programmable procedures for "geographic data conversion", "location assignment", and "building loc/object data structures" and are shown generally in FIG. 10.

The generalized options loops serve to make CAMLS software modular. Optional procedures are enabled or disabled by user choice or automated subprograms. Various implementations of the CAMLS software incorporate more or less options. Simple CAMLS devices like an electronic gazeteer, location look-up device, shirt pocket "pager", and text only CAMLS field units, need few optional procedures. Such devices for example do not require capabilities to convert data to other geographic formats. Advanced desktop and mainframe implementations will incorporate the full range of optional procedures.

If information is not appropriate for mapping nor are geographic data conversion routines available for the raw data packet, the non-mappable unwanted information is passed on to other applications programs of the computer system or exited from the computer system through "garbage out". The availability of the out or exit permits the CAMLS system to work with other applications software and exchange data in a multitasking environment. The out and exit steps permit the CAMLS system to return data to other concurrent applications or eliminate the data after screening the information for mappability. The outs and exits also enable simple CAMLS devices, not equipped with data conversion options for example, to process an input stream comprised of standard CAMLS loc/objects mixed in with data in other formats. The limited device would process the standard CAMLS data garbaging out the rest. A fourth objective is to provide such adequate exits and outs in the CAMLS processing.

A flow chart showing basic operation of the event handler 211 is illustrated in FIG. 9. The event handler provides a path of least resistance to all data inputs organized and structured according to the mapping data structure or loc/object data structure of FIG. 8. Thus appropriately packaged or structured mapping data inputs retrieved, for example, from internal memory 219, downloaded over communications links 203, 205, etc. pass directly on to the mapping data subsystem 210 and mapping display subsystem 213. Other input data such as raw data packets from the radio location or other location sources may not yet be structured in the fully acceptable mapping data structures. Such raw data packets may still be recognized by the event handler as locatable or mappable objects or data structures passed to the mapping data subsystem 210 for appropriate restructuring or reorganization.

The event handler 211 initially checks the options selector for current user defined selections and receives data events from the respective input devices and sources in the form of raw data packets. As shown in the flow chart of FIG. 9 the input bus data handler 211 then checks for the presence of the standard mapping data structure of FIG. 8 in a raw data packet received from an input device. The input bus data handler 211 also checks for the presence of critical geocoding information even in the absence of full conformance with the mapping data structure of FIG. 8. Data events recognized as geocoded or capable of geocoding in terms of spatially relating the data event to the common geographical coordinate system are passed to the mapping data subsystem 210 for completing the correct data structure.

The ID stamp applied at each step refers to the procedure that stamps or assigns each object processed by the event handler 211 with an ID reflecting its input device source, loc/object type, and a record of the unique internal data and clock time of this process of assignment of an ID. The complete ID includes the input device ID stamp, loc/object ID stamp, and clock time ID stamp. The three components together form the complete ID stamp.

For clearly nonmapping data, each step in the input bus data handler process of FIG. 9 diverts the nonmapping data away from the mapping data subsystem 210. Thus each step looks for a permitted data structure geocoding in some form or a data structure capable of being geocoded. If the data event after all completed steps is still found lacking in any mapping or geographically locatable characteristic, the non-mapping data is diverted at the output to other software applications programs for handling or is simply eliminated at "out". In summary, the event handler flow chart of FIG. 9 determines whether a raw data packet at the input proceeds to the mapping data subsystem 210 and where required begins to construct the ID header portion of the CAMLS data structure for loc/objects. This task is completed by the mapping data system 210.

Figure 10A:
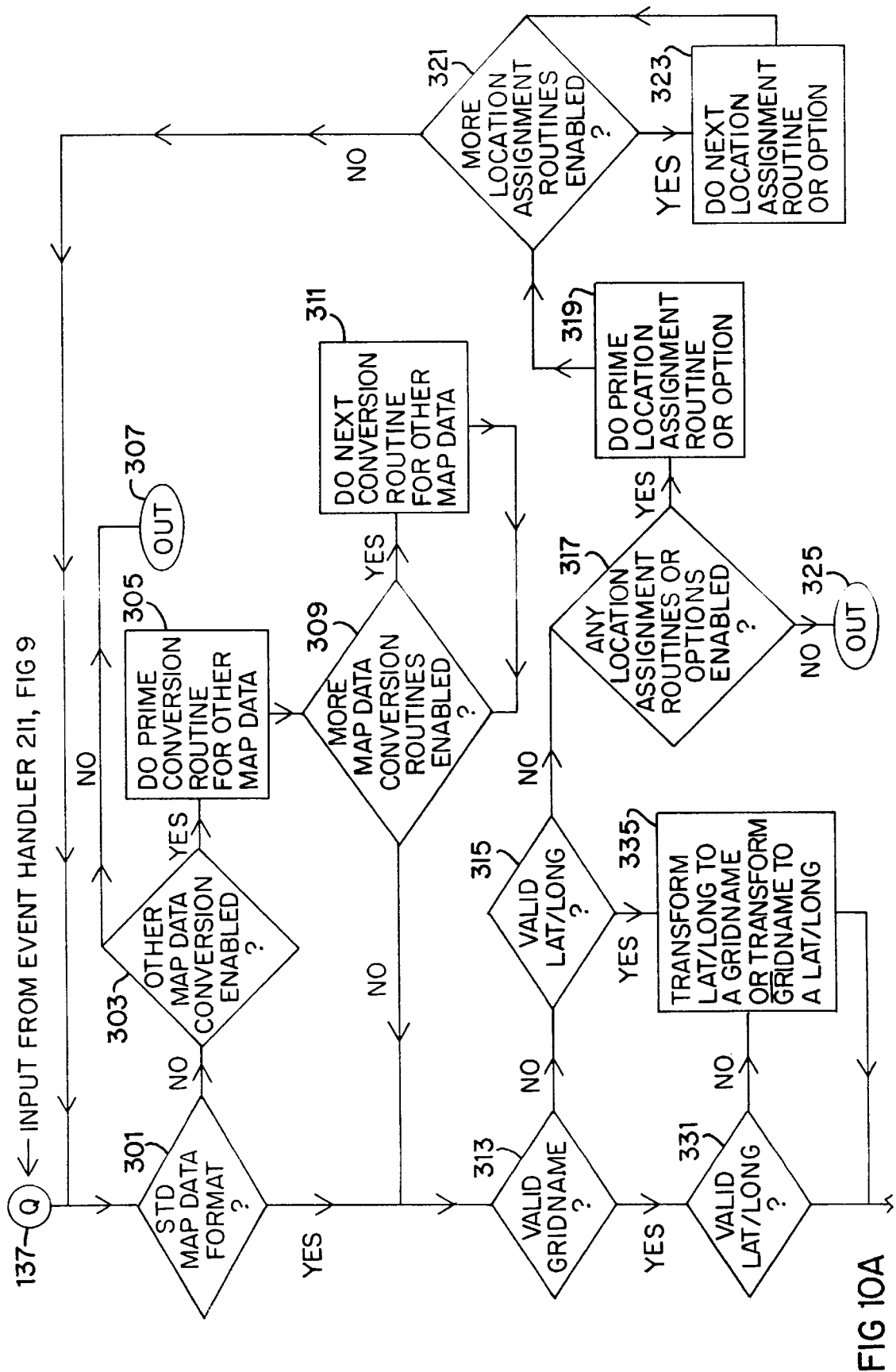
FIG. 10 composed of FIGS. 10A and 10B is a flow chart for the construction of the data stream of data items by the mapping data subsystem of FIG. 7.
Figure 10B:
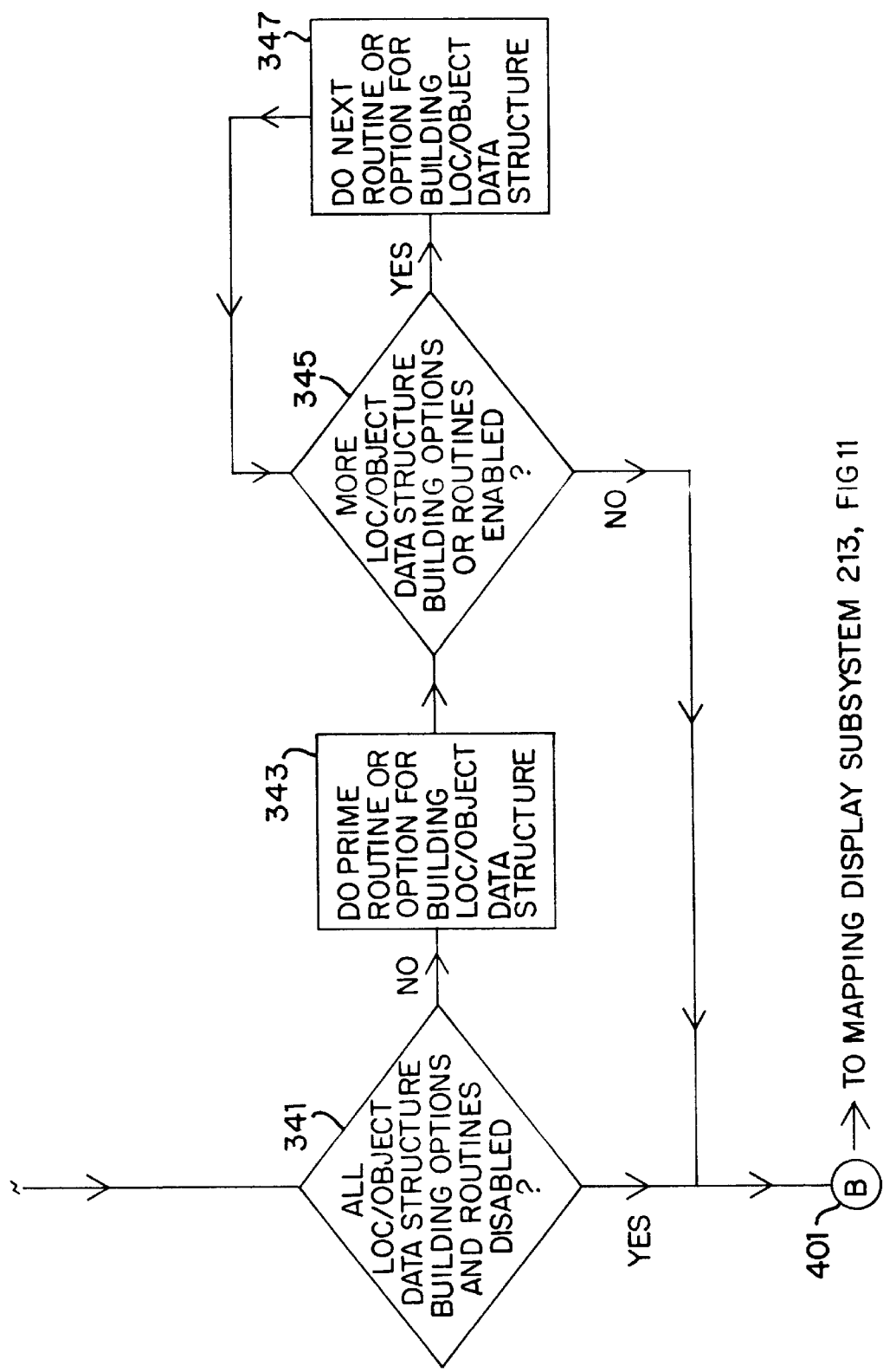

A flow chart of the overall mapping data subsystem for the CAMLS system is illustrated in FIG. 10. The mapping data subsystem 210 inspects each data item and if not valid or complete attempts to repair or complete the data structure to provide a fully valid data item. The valid data items are then transferred to the mapping display subsystem 213. The option loops for conforming data items to the data structure of FIG. 8 are generally shown in option loops to the right of FIG. 10A while the mainstream of conforming loc/object data structures is shown to the left.

In FIG. 10, the first of these option loops at 301, 303, 305, 307, 309 and 311 concerns conversion of mapping data from other formats. The second option loop of FIG. 10, at 317, 319, 321, 323 and 325 involves varied location assignment processes, i.e. operations such as screen-sharing by located messages and geocoding of unsituated objects. The third option loop of FIG. 10 at 341, 343, 345 and 347 deals with the building of loc/objects according to system standard record structures and display requirements. The fourth option loop appears at 415, 417, 421 and 423 in FIG. 11 and involves optional display routines. Details of the option loops are set forth in TABLES I–IV and accompanying description.

The FIG. 10 flow chart shares important features with the flow charts for the event handler 211 and the mapping display subsystem 210, shown in FIGS. 9 and 11 respectively. The FIG. 10 mapping data subsystem flow chart begins at Q where the FIG. 9 event handler flow chart of FIG. 9 ends. The mapping data subsystem 210, as drawn in FIG. 10, ends at B where the FIG. 11 mapping display subsystem flow chart begins. Like the event handler and mapping display subsystem, the flow chart for the mapping data subsystem includes a fast-track for priority items like grid names, position sensor data as well as loc/objects already built in the standardized CAMLS data format. This fast track for dropping through qualified loc/objects runs down along the lefthand side of FIG. 10, much the same as FIGS. 9 & 11. The branches of the flow chart extend horizontally to the right across the page in FIGS. 9, 10 and 11 and show optional procedures.

FIGS. 10 and 11, flow charts for the mapping data and display subsystems respectively, both make specific use of generalized options loops, for example compare 301, 303, 305, and 307 in FIG. 10 with 415, 417, 421 and 423 in FIG. 11. These options loops take the form "do prime procedure" followed by "do next enabled procedure", until the current listing of procedures is exhausted. Option loops addressing selectable, programmable lists of routines or procedures are set forth in TABLES I–IV. The options selection lists are not static and are not performed in the same rote order at all times and in all modes of operation. Rather the options lists are variable or dynamic subject to automated changes and user input implemented by the software itself and manual adjustments or menu selections by the user.

For another example of an options loop the GEOCODING+SCREEN SHARE+LOCATION ASSIGNMENT loop is shown at 319, 321, 325 and 327 in FIG. 10. This loop in the mapping data subsystem can only be entered by potential i.e. unsituated, loc/objects which have no gridname and no lat/long. At 319, this loop is only entered when its constituent operations are enabled, or effectively turned on. Less advanced CAMLS devices might not incorporate location assignment options, in which case unsituated inputs intended for location assignment would be garbaged out of those CAMLS implementations. Location assignment includes geocoding objects and events having unknown but ascertainable geographic coordinates and screen sharing or the assignment of a specific geographic locations to functions, messages, etc. with no natural place on the face of the earth.

A concrete example of geocoding is assigning a location to the site of an automobile accident. Screen sharing is exemplified by the task of displaying a message such as BUY MILK ON THE WAY HOME. For example, the message is displayed on the PDA screen when the user is driving home after work and when the user is approaching a grocery store near home on the user's usual commuting route. The geocoding and screen sharing chores just described both entail location assignment, the operation of identifying and linking the message text, or the symbol for an auto accident to a specific address, location, intersection, zip code, lat/long or other set of geographical coordinates.

Screen sharing is not limited to messages. A time and place location might be assigned to a function like placing a call to a selected phone number as well as a received message. Thus, at breakfast, a homebound spouse can program the commuting worker spouse's PDA to CALL HOME, during the usual commute home, from a selected location. The PDA proceeds to wake up and place the call from the commuter's vehicle when GPS position sensor data coincides with the selected place e.g. the neighborhood grocery store, within the proper time frame e.g. 5 to 6 PM. No call issues if, in the course of the working day, the commuter spouse passed by the selected location, on a job-related errand, for example. A pleasant, characteristic, audible signal tells, or reminds the user about the preprogrammed call as it is being placed. The screen display reveals how and to whom the call is being made in the form of a text display, or the same information might be conveyed by a synthetic or prerecorded voice message. The screen can display the location being called cartographically i.e. by highlighting the marital home on a graphic map display.

For the preferred embodiment, TABLE I below comprises the user-selectable, programmable and amendable listing of optional procedures and sub-programs managed by the options selector 215. These options are implemented in the options loop shown at steps 303, 305, 309 and 311 in the FIG. 10 flow chart for the mapping data subsystem 210. In this options loop are performed data conversion operations which translate information expressed in other geographic data formats, or other non-CAMLS data structures, into at least partially complete, standard CAMLS data structures generally described in FIG. 8. The successful results of such data conversion operations then become eligible for further processing and completion within the mapping data subsystem 210 and thereafter for possible output/display routines in the FIG. 11 mapping display subsystem.

As received by the event handler input bus 211, input events or raw data packets are identified and stamped for possible processing in the data conversion loop in two ways. First, if input in some other data format has been selected for conversion, then at step 105 in FIG. 9, CAMLS software recognizes and stamps every raw data packet, so selected for conversion, as originating from the conversion input device. For example, a user picks and loads a set of mapping data, known to be in a UTM geographic data format, and enters instructions for its conversion from UTM to CAMLS. Second, geographic data in other formats appearing in the input stream, without the user commanding a specific conversion procedure, can also be recognized and typed for conversion to standard CAMLS format. At step 131 in FIG. 9 enabled at 129, raw data packet contents are tested by CAMLS software looking for characteristic features that match pre-defined profiles for other data formats. Thus, at step 135, raw data packets, whose contents match other data formats, are typed for possible processing in the FIG. 10 conversion options loop at steps 303, 305, 309 and 311. These steps use one or more of the data conversion procedures or routines listed in TABLE I presented below.

Generally, the objective of these data conversion procedures and routines listed in TABLE I below is to transform raw data packets with potential for becoming CAMLS loc/object output into standard CAMLS data structures as shown in FIG. 8. For example, information on a particular hotel appears in the input stream as a record consisting of associated text and graphic information in ascertainable formats with the location of the hotel indicated by street address, phone number and UTM coordinates. If enabled and included in a particular CAMLS implementation, appropriate conversion routines sort and recompose this raw data packet into text, graphics and database formats readily assimilable by CAMLS. Other conversion procedures focus on the location indicators, i.e. UTM coordinates, street address, and telephone number, converting each into lat/longs or grid names, checking the various location indicators for congruence and resolving any conflicts between location indicators by pre-defined procedures. The overall conversion process also installs all the reorganized information into the standard CAMLS data structure of FIG. 8.

In more detail, the required data conversion routines involve a variety of known or obvious programming techniques such as particular datum shifts; syntactical conventions like leading zeroes and upper case letters; file conversion procedures e.g. for importing from a document stored in a proprietary word processing format into standard CAMLS text format; routine or readily devised procedures for transformation and comparison among geographic coordinate systems and other ordinary location indicators; database record protocols to deal with common variants of ordinary language expressions of location information such as street addresses, zip codes, etc.

Consider again the example of information on a hotel where the information must be converted to the CAMLS data structure. The hotel location, related text, and possible graphics are converted and installed into the standard CAMLS data structure. This former raw data packet in non-standard format transformed to a partially complete CAMLS loc/object receives a new identity for purposes of further processing within the CAMLS software. No longer does it remain typed as a raw data packet which needs conversion from another data format. It is retyped as a standard CAMLS hotel type loc/object for further processing in CAMLS software on the same basis as equivalent hotel information originally packaged as a CAMLS hotel type loc/object.

Therefore, the last procedure, step 365, on the conversion options loop list deals with testing and retyping every raw data packet which has undergone conversion. In step 365, in the Table I below, the results of preceding conversion procedures are analyzed for adequate conformity with the standard CAMLS data structure protocols. Once past this initial test, the newly qualified CAMLS loc/objects are compared or matched to predefined profiles for retyping as characteristic CAMLS loc/objects types e.g. as hotel type data versus road type data or routing type data, etc. In step 365, raw data packets not meeting minimum correctness and completeness criteria based upon the standard CAMLS data structure format are either subjected to error detection and correction procedures, returned to another software application also operating within a multi-tasking environment, or garbaged out of the overall system.

In the TABLE I data conversion routines, step 363 constitutes an empty seat or open slot reserved for additional data conversion procedures which might be supplied on diskette or similar media as a product update, or downloaded for a fee from a central service bureau via communication links. This open slot feature, embodied in step 363, is consistent with the overall architecture of all of the options loop lists or tables including TABLES I,II,III, & IV. As revealed in step 363, the options loop lists are intrinsically amendable. They are designed to facilitate importing and integrating supplemental mapping tools with related functions.

Furthermore, employing obvious programming techniques for arrays, menus and command sequences such as batch files or macros, all of the CAMLS options loops including the listing of data conversion routines for the preferred embodiment below in Table I are both user selectable and programmable. The end user can enter a menu and select, enable or disable any or all of the listed procedures implemented in the version of CAMLS software in use. Also, automated programs, part of the CAMLS software or developed as custom macros by the end user, can coordinate and sequence the operation of enabled procedures and routines within any of the options loop lists. These CAMLS data conversions involve routine combinations of the listed procedures of TABLE I.

TABLE I

Data Conversion Procedures FIG. 10 STEPS 303, 305, 309. 311

351: CONVERSION ROUTINES FOR LAT/LONG DATA An array of conversion routines for transforming lat/long data presented in commonplace alphanumeric text string formats such as ASCII variants, popular proprietary word processing, and database formats into the standard CAMLS format for lat/longs.

353: CONVERSION PROCEDURES FOR PROPRIETARY DATA FORMATS An array of conversion procedures for data conversion from a variety of other commercially significant, proprietary formats for digital geographic data e.g. Map info (TM), ESRI (TM), Intergraph (TM), GDT (TM), ETAK (TM), Automap (TM), Thomas Bros. (TM), etc. into the corresponding standard CAMLS data structures.

355: CONVERSION ROUTINES FOR GRAPHIC DATA An array of conversion routines for graphic data in various universal or public domain geographical coordinate systems and grid systems, used both in digital databases and on printed maps which are scanned into CAMLS, e.g.: State Plane, UTM, US Air Force System, Ordinance Survey Maps, standard lat/long grid systems graphically presented in digital or printed form according to various map projection geometries. These are transformed or converted into the standard CAMLS format and grid system for cartographic data.

357: CONVERSION ROUTINES FOR RASTER DATA, SYMBOLS & ANNOTATIONS An array of conversion routines for conversion of raster data consisting of mapping graphics and related text, derived from input devices such as scanned in paper maps, message pads, digitizing tables, graphics and CAD programs, fax and wireless data transmissions into standard CAMLS data structures. These conversion routines read standardized, pre-defined CAMLS symbols and markings easily made by handheld pencil, pen or the equivalent digital pen or mouse or drawing device. Such symbols may include an X inside a circle representing a freshly geocoded site, or an H within a box as a handwritable and digitally readable convention for hotel, certain kinds of dotted lines or double lines as political boundaries versus roads, etc. This facilitates geocoding and making other map annotations on printed paper maps for later scanning into CAMLS software as well as receiving input from pen-pad type digital devices.

359: CONVERSION ROUTINES FOR LOCATION INDICATORS An array of conversion routines for recognizing and then converting commonplace variants of everyday location indicators as expressed in ordinary language such as telephone numbers, street addresses, zip codes, political subdivisions, etc. into standard CAMLS data structure location data i.e. lat/longs and unique gridnames.

361: CONVERSION ROUTINES FOR VOICE, TOUCH TONE, ETC. An array of conversion routines responsive to inputs from handwriting recognition software, voice recognition software and touch tone telephone input which provide conversion of spoken, touch tone or handwritten gridnames and other basic CAMLS symbol and terminological conventions into standard CAMLS data structures. These conversion routines concern communication of pure textual grid names and related basic CAMLS information into and between simpler CAMLS devices such as a device for communication of text gridname locations and a stand alone electronic gazeteer for looking up locations. These conversion routines also apply to voice recognition input generally, as well as input from small communications devices in the field into a centralized database or networking server.

363: OPEN SLOT FOR ADDITIONAL PROCEDURES Empty seat or open slot available for additional data conversion tools provided, for example, on tangible media or by downloading from a central service bureau.

365: TESTING & QUALITY CONTROL PROCEDURES Testing and matching quality control procedures to make sure that all the results of conversion procedures meet criteria of correctness and completeness in conformity with the standard CAMLS data structure shown in FIG. 8. Also matching procedures which compare the contents of qualifying CAMLS loc/objects, newly converted from other data formats, in order to identify and restamp the new CAMLS loc/objects with the appropriate loc/object type index, which is part of the ID of every CAMLS loc/object in standard format. For example, hotel information, freshly converted from a data record consisting of various other data formats into a standard CAMLS data structure, is typed in this step as a Hotel type CAMLS loc/object. End-products of conversion routines, which fail to meet the basic criteria for correctness and completeness as CAMLS loc/objects, are subjected to error detection and repairs then retested, or exit OUT of the CAMLS software in this step either returning to other applications or garbaged out altogether.

(END OF TABLE I)

Table II presented below, shows a programmable, user selectable and amendable listing of optional procedures and subprograms managed by the options selector 215. These procedures are implemented in the options loop shown at steps 317, 319, 321 and 323 in the FIG. 10 flow chart for the mapping data subsystem 210. As detailed in TABLE II, this location assignment loop facilitates the assignment of location data, in the form of lat/longs or gridnames, to a special group of CAMLS loc/objects which either have an unknown location or no natural geographic locus.

In TABLE II below, steps 367–371 include location assignment routines, termed geocoding, which apply to a broad variety of digital objects representative of entities assumed to exist at a specific natural geographic location such as a hotel, a town or the current position of a person or a vehicle. Steps 373–378 involve a second set of location assignment operations termed "located output and operations" applied to digital objects not possessed of an inherent or natural geographic location such as text messages, alarm signals, and functional operations like placing a communication. This is also referred to as screen sharing. Step 380 is an empty seat or open slot to facilitate the addition of further location assignment procedures provided on tangible digital media or downloaded via communications links. Step 381 analyzes CAMLS loc/objects which have undergone location assignment routines checking for specific indicia of completeness and correctness and also performing error correction, defect rejection and retyping functions.

TABLE II

LOCATION ASSIGNMENT ROUTINES AND PROCEDURES FIG. 10, STEPS 317, 319, 321, 323

1. GEOCODING PROCEDURES

367. USER "LOOK-UP" QUERIES: An array of location assignment routines for responding to user queries, such as "Where is Freeport, Me.?" or "Where is the corner of 5th Avenue and 14th Street in New York City?" or "Where is Zip Code 04103-3105?". The responsive output/display is based upon location data i.e. lat/longs or gridnames computed or retrieved from available external or internal databases. CAMLS software processes the location indicators, which the user enters in everyday language e.g. state, city or town, street addresses, street intersections, zip codes, phone numbers, etc. as input in making the query.

368. GPS QUERIES: An array of location assignment routines for responding to user queries such as "Where am I?" or "Where is other GPS equipped device?". The responding routines are based upon location data from a position sensor input device, typically a GPS sensor. The position sensor is directly connected to user's own device; or location data communicated from another GPS equipped device is downloaded at user's device.

369. PUSH-BUTTON GEOCODING: An array of geocoding routines, performed by the user of a range of CAMLS devices whereby upon pushing a button, or otherwise entering a specific command on the CAMLS device, an instruction is given to the CAMLS software for the assignment of a specified location to a particular digital object selected by the user for location assignment. The assigned location data is based upon the current position sensor data on devices equipped with enabled GPS or upon user selection of a particular gridname or a cursor position displayed within a map grid quadrangle for CAMLS devices not equipped with GPS or an equivalent position sensor.

371. RECORDING REMOTE GEOCODING: An array of location assignment recordation routines whereby CAMLS software memorizes locations assigned to digital objects by users at remote sites. The recorded geocoding or location assignments are transported or transmitted to a CAMLS software equipped device in various formats. These may include database records or text files recorded on tangible media in digital format or downloaded via communication links between computer devices and voice input communicated from a remote site and assimilated by suitable voice recognition software. CAMLS printed maps can also be annotated or marked at the remote site by hand using standard symbols and terms that CAMLS software can recognize. The maps are thereafter transported to, and scanned into, a CAMLS software equipped computer device.

372. COMPUTERIZED GEOCODING OF LISTS: An array of automated location assignment routines for the processing or geocoding of lists of candidate CAMLS loc/objects by searching the candidate data records as well as any available internal or external databases for associated location data i.e. lat/longs or gridnames. Optional procedures are also included for the search and retrieval of pertinent geographical coordinate data in other formats or relevant ordinary indicators of location such as place names, street addresses, phone numbers, zip codes etc. The optional procedures also provide for conversion into CAMLS standard lat/longs or gridnames.

B. LOCATED OUTPUT AND OPERATIONS

374. PANIC BUTTONS: An array of location assignment routines which result in an alarm, or characteristic signal, or a message being communicated to a remote receiver e.g. a dispatcher or public safety agency in conjunction with location data. This alarm or message is triggered by users entering specified commands on a CAMLS equipped device, or by certain predefined input from a sensor device that can detect a collision or the unauthorized entry or use of a vehicle. Location data is based on the GPS position sensor, or other user location detectors, or by users' entry of current estimated location, or in accord with a preset location on stationary devices.

376. SCREEN SHARING OR PLACED OUTPUT: An array of location assignment routines which facilitate output/display of text messages, graphics, sound or prerecorded or synthesized voice output by CAMLS equipped devices on the output/display associated with specified locations chosen by the user. Priorities for output/display are controlled by user selection or automated programming. A user or another party, can enter messages for the user such as "BUY MILK ON THE WAY HOME" or "PICK UP SUZY AT DAY CARE". The entered message is expressed on the user's CAMLS PDA or other device equipped with GPS, as voice or text output, directly as a function of the user location, i.e. approaching a specified destination, entering a predetermined unique CAMLS grid quadrangle, or straying off a predefined route of travel or outside of a preselected geographic area.

377. LOCATED AUTOMATED OPERATIONS: An array of location assignment procedures or subprograms which automatically implement a desired operation on a CAMLS PDA equipped with GPS or another equivalent position sensor as a function of the CAMLS PDA location, e.g. approaching a specific location, entering a predetermined unique CAMLS grid, or straying off a predefined route or outside of a preselected geographic area. The CAMLS PDA implements a specific operation in response to the location data derived from the GPS position sensor. For example, approaching a certain place, the CAMLS PDA outputs an alarm or a message immediately audible or visible to the PDA user. A preselected point along a planned route, the CAMLS PDA places a communication or sends a signal to a remote receiver. A CAMLS in vehicle security device disables the vehicle engine and issues a prominent alarm in response to position data indicative of the vehicle being driven into an unauthorized area.

380. OPEN SLOT FOR ADDITIONAL PROCEDURES: An empty seat or open slot in this programmable list of location assignment routines facilitating amendment or additions to the list. For example, the open slot permits downloading supplemental routines from a central service bureau or facilitates use of an updated or new location assignment routine supplied in object code form on tangible media.

381. TESTING, QUALITY CONTROL AND RETYPING PROCEDURES: An array of testing, quality control and retyping routines applied to the end products of the location assignment procedures listed above which determine correctness and completeness relative to the standard CAMLS data structure of FIG. 8; detect and repair errors in data structure; return substandard and unrepairable data structures to other applications or to garbage; retype qualifying CAMLS loc/objects, as appropriate.

(END OF TABLE II)

TABLE III presented below shows another programmable, user-selectable and amendable listing of optional procedures and subprograms managed by the options selector 215. These are implemented in the options loop shown at steps 341, 343, 345 and 347 in the FIG. 10 flow chart for the mapping data subsystem 210. Within this loc/object building loop are performed data building operations on qualified CAMLS loc/objects enhancing the informational content or links within the standard CAMLS data structure as shown in FIG. 8.

TABLE III reveals how a geocoded loc/object, in response to a user query such as "Where is the Spruce Point Inn?", is linked to additional related information about the Spruce Point Inn in Boothbay, Maine by means of the loc/object building routines. Information of interest to the typical user might be e.g. room prices, amenities and facilities, the hotel phone number, nearby tourist attractions, even access to reservation services.

TABLE III

LOC/OBJECT BUILDING ROUTINES

391. BUILDING CONTENT AND LINKS BY NARROW SEARCHING: An array of data building or enhancement routines, designed to search for a limited selection of data records with search operations based on a restricted set of features of the subject CAMLS loc/object. Searching is confined to a narrow range of databases only for information in certain pre-determined formats. Search results are retrieved or inventoried, and then installed as additional content or links in the specific CAMLS loc/object which prompted the searching.

393. BUILDING CONTENT AND LINKS BY EXTENSIVE SEARCHING: An array of data building or fulfillment procedures, designed to capture comprehensive information related to extended sets of the known characteristics of the subject CAMLS loc/object. Search operations are conducted in many, most or all of the available internal and external databases. Searches are expanded to seek information on related terms and locations across a broad range of data formats. Search results are retrieved or inventoried, and then installed as additional content or links within the specific subject CAMLS loc/object.

397. OPEN SLOT FOR ADDITIONAL PROCEDURES: An "empty seat" or open slot in this programmable list of loc/object building routines, facilitates amendment or addition to the listed building operations, for example, by downloading supplemental routines from a service bureau or a new loc/object building routine supplied in object code form on tangible media.

399. TESTING, QUALITY CONTROL AND RETYPING PROCEDURES: An array of testing, quality control and retyping routines applied to the end products of the loc/object building procedures listed above determining correctness and completeness relative to the standard CAMLS data structure of FIG. 8. Steps include detection and repair of errors in data structure, returning substandard and unrepairable data structures to other applications or to garbage, and retyping qualified CAMLS loc/objects as appropriate.

(END OF TABLE III)

A typical instance of loc/object building under TABLE III occurs in the case of a user inquiry such as "Where is the Spruce Point Inn?". This query can be input on a CAMLS equipped PDA or electronic computer with enough memory, processing and communications capability. As a preliminary step, first, this query is processed as a simple user locational look-up problem. As discussed below, this prior look-up operation geocodes the Spruce Point Inn at Boothbay, Me. Next, as discussed below, loc/object building routines implement searches on the hotel and locale for related information such as room prices, facilities and nearby attractions.

The prior look-up operation, locating or geocoding the Spruce Point Inn, is done in the location assignment loop, at steps 317, 319, 321, 323 and 325 in FIG. 10 and TABLE II. More specifically, the CAMLS software proceeds to locate the Spruce Point Inn by means of the basic geocoding look-up routine shown at step 367 of TABLE II. Step 367 searches available databases to retrieve or compute location data for the Spruce Point Inn. If successful in this endeavor, step 367 locates or geocodes the Spruce Point Inn in association with the location data i.e. lat/longs or gridname for Boothbay, Me.

By installing this location data in the standard CAMLS data structure embodying the user query on the spruce Point Inn, step 367 transforms the query into a CAMLS loc/object capable of the desired locational response. In other words, the loc/object produced by prior step 367 can facilitate text or voice output of "BOOTHBAY, Me." in response to the user query. The resulting loc/object is now also able to facilitate the display of the corresponding lat/long or gridname or to center a responsive map display Boothbay, Me. Inexpensive, low-tech CAMLS look-up devices, such as a handheld electronic gazetter, can perform such simple location look-up or geocoding routines. A simplified CAMLS look-up device need not possess capabilities to seek and facilitate output of additional information, beyond the hotel location, related to the Boothbay, Me. Spruce Point Inn.

Provided adequate memory, processing capacity and database access, more capable CAMLS equipped devices such as a laptop or advanced PDA can readily perform loc/object building procedures based on the results of the hotel geocoding, or location look-up operation described above. In the case of the Spruce Point Inn query, the loc/object building routines disclosed in steps 391 and 393 do searching to enhance the responsive geocoded CAMLS loc/object with additional related information, likely to be of interest to users. Such information might be information on current Spruce Point Inn room specifications and prices, banquet and exercise facilities, nearby restaurants, deep-sea fishing or marina facilities, local summer theaters and places to shop.

In general, the loc/object building routines are executed in the loop at steps 341, 343, 345 and 347 in FIG. 10. More specifically, shown in TABLE III above, steps 391 and 393 perform database searches differing in comprehensiveness for further information related to the loc/object subject matter and its locale. All searches in both steps 391 and 393 are subject to selection by the user or automated adjustment of the topical search focus. For example, the user, or a subprogram automated to identify hotels close to marina facilities, can focus the loc/object building procedures to search specifically for hotels near yacht facilities.

Step 391 includes an array of relatively simple loc/object building routines implementing limited search operations only for narrow ranges of typically prepackaged data records. In the hotel example, step 391 if enabled specifically searches on a finite set of terms such as the hotel name, "Spruce Point Inn", and the location name, "Boothbay, Me.". Step 391 typically confines searching to prepackaged databases, containing data records structured in advance to facilitate the anticipated CAMLS search and output/display techniques. Thus, step 391 provides loc/object building routines appropriate for searching proprietary databases composed of relatively compact, uniformly structured data records, arranged to ease searching and processing. Such databases are typically in "read only" format provided on tangible media such as CD-ROM, or through a central database accessed for specific information items on a fee per item basis.

Step 393 provides more vigorous loc/object building routines implementing extended and intensive search methods for use with CAMLS systems with advanced capabilities to investigate complex and diverse database resources. For example, step 393 routines conduct searches using routine methods on logical or linguistic variants or equivalents of "Spruce Point Inn", "Boothbay Harbor" and associated place names. Other step 393 procedures provide for searching extended location data sets such as circle areas around specified lat/longs or named grids encompassing Boothbay Harbor, and selected, relevant everyday location indicators such as phone number exchanges, street addresses, zip codes, colloquial place names, associated with Boothbay Harbor and the Spruce Point Inn. Step 393 procedures utilize a variety of external databases and even sophisticated "agents" i.e. self-contained search programs communicated and put to work in remote information systems.

Steps 397 and 399 are stock procedures resembling steps 363 and 365 in the TABLE I of other geographic conversion routines, and steps 380 and 381 in the TABLE II of location assignment routines. Step 380 is an empty seat or open slot to facilitate the implementation of further loc/object building procedures provided on tangible digital media or downloaded via communications links. Step 381 analyzes CAMLS loc/objects which have undergone loc/object building checking for specific indicia of completeness and correctness, and performing error correction, defect rejection and retyping functions.

THE MAPPING DISPLAY/OUTPUT SYSTEM 213 FIG. 11 AND TABLE IV

For all implementations of CAMLS software, basic voice/text output of current CAMLS gridname is implemented by step 411 in FIG. 11. All additional output/display options can be disabled at step 415. On all CAMLS equipped devices, step 411 without more suffices to handle the output/display for location "look-up" operations answered only by voiced or textual CAMLS gridnames. With no other output capabilities, step 411 also suffices for certain simple CAMLS devices such as pager style communication devices offering a brief text display confined to CAMLS gridname output. Step 411 still provides the essential CAMLS gridname text/voice output even when further options are enabled at step 415.

For example, even in the case of an optional map display involving at least part of step 461 in TABLE IV to place a loc/object on screen, step 411 is still responsible for the odometer style text display of the relevant CAMLS gridname. As a practical matter however, most CAMLS software implementations and most CAMLS devices engage one or more of the optional output/display routines executed by the mapping display subsystem 213 at steps 417, 421 and 423 in FIG. 11. Step 415 provides for user or software control over access to the display/output options loop. The display/output TABLE IV, presents more detail on the specific functional contents of the display/output options loop of the mapping display subsystem 213 accessed through step 415.

TABLE IV is a listing of programmable, user selectable and amendable output/display procedures made available in an options loop format similar in general structure and operation to the conversion, assignment and building options loops shown in TABLES I,II, & III respectively. Like the other CAMLS options loops, the Display/Output TABLE IV is subject to known or obvious programming techniques for managing listings of computer commands or functional software procedures. In addition to providing for flexible user selection via menus, dialog boxes, control panels and icons, TABLE IV is readily programmed to facilitate implementation of multiple routines in complex combinations or, alternatively, one individual subroutine by itself. Users can write subprograms to combine or select optional routines in the manner of batch files or macros. These specifications assume that certain of the components of the steps listed in TABLE IV consist of integrated routines or subprograms which call functions from other steps and options lists to perform complex operations.

The TABLE IV programmable, user selectable and amendable procedures and subprograms are managed by the options selector 215 and are implemented in the options loop at steps 415, 417, 421 and 423 in the FIG. 11 flow chart. In this loop are performed all optional operations relating to display or output from the CAMLS software system, all except the most basic text/voice output of the current CAMLS gridname, accomplished in steps 407, 411 and 413 in FIG. 11. Consistent with the invention objects of modularity, selectivity and intuitive map reading, all CAMLS equipped devices are capable of conveying location information at least in the form of text or voice output of the current CAMLS gridname. A low tech handheld location lookup device, for example a CAMLS wrist watch or pocket calculator electronic gazetter, can respond to simple location queries with brief text displays or voice outputs of the pertinent CAMLS gridnames based upon steps 407, 411 and 413 in FIG. 11.

Another application relates to mobile users, running or driving a vehicle. The driver needs to keep eyes on the path or road ahead. Mobile users therefore tend to prefer audio output over distracting visual displays. Portable and in vehicle CAMLS devices can provide location information via audio voice output of CAMLS gridnames based on steps 407, 411 and 413 in FIG. 11, without exercising the optional display/output routines disclosed below in TABLE IV. Practically, all other applications of the CAMLS technology for example, any added alphanumeric information text output related to the named CAMLS grid, and all visual graphic map displays use one or more of the optional routines as disclosed in the TABLE IV display/output procedures, below.

TABLE IV

OPTIONAL DISPLAY ROUTINES FIG. 11
STEPS 415, 417, 421, 423

445. TEXT/VOICE OUTPUT RELATED TO CURRENT GRIDNAME: An array of text/voice routines to output verbal information related to the current gridname output. Step 411 in FIG. 11 executes the basic text/voice output of the current gridname. The verbal information is presented in a literal text format such as alpha-numerical display, or as a prerecorded, synthesized or live human voice. The content of the verbal information includes both information naturally or geographically related to the current named CAMLS grid and text/voice messages, documents or communications which are assigned for output with respect to the current named grid quadrangle. Step 376 in TABLE II describes screen sharing or "placed" output.

447. ANALOG OUTPUT ROUTINES: An array of analog output routines for the interface shown at 250 in FIG. 7 to manage and implement various extended mapping and location displays. Such displays include backlighted wall map displays as shown in FIGS. 14 & 15B and 251 & 255 in FIG. 7 and projections, like movie or planetarium projector technologies, involving still or moving mapping images or precisely focused light spots projected against a background screen or image, or through a translucent or transparent media possibly printed with mapping imagery or CAMLS grid lines. The projected map images or spots of light represent specific geographic locations or CAMLS loc/objects as shown in the FIG. 7 block diagram at 252 and 256.

449. INSTRUMENTAL OR FUNCTIONAL OUTPUT ROUTINES: An array of output routines for instrumental output related to operations placed to occur in relation to a named grid quadrangle, or associated locational specifications. For example, see TABLE II steps 374 and 376 on panic buttons and in-vehicle CAMLS devices which disable steering or engine in case of unauthorized entry or travel outside of a specified area. See also FIG. 14A on the operation of sending an automated signal or communication, with location information, in response to a collision as sensed by an air bag type deceleration or impact detector.

451. GRID QUADRANGLE DRAWING ROUTINES: An array of graphic display routines for digital drawing of CAMLS grid quadrangles, grid lines, multiple grids, nested subgrids, grid "hash marks" in pixel form, and other specialized CAMLS grid displays such as graphic enhancement of zooming and shifting operations, "split" screens, map or grid windows or hyper-cards, scripts or series of grid displays, multigrid displays for tracking or mapping routes, pipelines, rivers, migrations, transmissions, trajectories, dispersion of pollution, weather fronts, and other widespread geographic phenomena located typically within and across a group or groups of CAMLS grids.

453. MAP DETAIL LEVELS AND DECLUTTERING OPTIONS: An array of display/output routines which facilitate user selection as well as automated control of variable densities of information visually and graphically displayed or otherwise output by the CAMLS software. High, middle or low levels of detail are determined on a quantitative basis by limiting the length of alphanumerical text output, or the ratio of active versus inactive pixels on the screen, or the overall quantity of CAMLS loc/objects allowed on screen, or putting caps on the size of CAMLS display lists or buffers, etc.

455. MAPPING THEME, OVERLAY AND SUBJECT MATTER OPTIONS: An array of display/output routines to facilitate the user selection and automated control of the CAMLS output/display for making qualitative decisions about the specific subject matter, map overlays or themes to be included in the CAMLS display/output. For example, this step enables display/output of map themes or overlays comprised of any of the following loc/object types e.g.: roads and highways, topography, political boundaries, hotels and motels, shops, campgrounds, transportation facilities, public safety agencies, tourist attractions, eating places, municipal infrastructures such as water mains and sewers, atmospheric phenomena such as wind and weather patterns, flora and fauna and demographic data.

457. SEQUENCING AND SCRIPTING DISPLAY/OUTPUT: An array of display/output routines for arranging series and synchronized assemblages of mapping displays, text/voice outputs, analog and functional outputs, plus topical temporal arrangements like sequences and synchronizations of maps and CAMLS grids, map overlays, serial displays of local attractions and accommodations, travel scenarios, ordered lists of text/voice output of located information, associated graphic and audio scripts, etc.

459. ALARMS, SCREEN SHARING AND INTERRUPTS: An array of display/output routines facilitating automatic control and user selection of the duration, precedence, portion of screen display or other output dimension that is shared or preempted by concurrent or collocated loc/objects such as the ongoing mapping display/output with a variety of located content such as alarms, signals, communications and messages, with variable urgency or priority. These are assigned to share or interrupt the CAMLS display/ output at a particular place or location, within or outside of a specified geographic area, or in relation to some equivalent locational situation or set of conditions.

461. LOC/OBJECT DISPLAY ROUTINES: An array of graphic display procedures for the location, display or implementation of all qualified CAMLS loc/objects within the appropriate CAMLS grid quadrangle or quadrangles. Complementary procedures are taken into account if applicable such as step 453 on display detail level, step 455 on display subject matter options, step 457 on display sequences and synchrony, step 459 on screen sharing, etc.

463. SPECIAL POSITION DISPLAY ROUTINES: An array of output/display operations for the correlation, processing and output/display of current position information as derived from position sensor technologies, such as GPS, Loran-C, other radio positioning systems, or dead reckoning systems computing gyrocompass, wheel rotation and similar inputs. A range of user selectable, programmable output/display options are provided including text/voice output of grid names and related text/voice output on current position, the basic "blinking dot" graphic position display, the "arrow with hole in head" graphic display of position, speed and travel direction, the coordinated output or display of two or more positions, "breadcrumb" displays recording actual paths traveled, etc.

465. ROUTING AND OTHER LOCATED PATH OUTPUT/DISPLAY ROUTINES: An array of output/display procedures concerning optimum, intended, historical or possible courses through, under, on or above land and water including flight paths, road or highway travel, railroad, foot, cycle and hiking trails, water voyaging, trajectories, various pipelines, transmission wires as well as light or radio wave transmission paths and patterns, utilities, public works, other extensive infrastructures, etc. Output/display is based upon algorithms for routing or infrastructure planning, or prerecorded line segment and vector data. output/display modes range from voice/text output of CAMLS gridnames and related voice/text information on courses, routes or infrastructures to multigrid quadrangle, multimedia displays including mapping graphics.

470. OPEN SLOT FOR ADDITIONAL PROCEDURES: An "empty seat" or open slot in this programmable list of display/output routines facilitating amendment or additions to the list, for example, by downloading supplemental routines from a central service bureau, or to facilitate use of an updated or new display/output program or procedure supplied in object code form to tangible media.

471. TESTING, QUALITY CONTROL AND RETYPING PROCEDURES: An array of testing, quality control and retyping routines applied to the discrete ingredients and emerging constituents of the display/output procedures listed above. Procedures test for correctness and completeness relative to the standard CAMLS data structure shown in FIG. 8, error detection and repair routines, operations for returning substandard and unrepairable CAMLS data structures to other applications or to garbage, and for retyping modified CAMLS loc/objects, as appropriate.

(END OF TABLE IV)

A flow chart of the mapping display subsystem is illustrated in FIG. 11. The mapping display subsystem 213 checks the current grid quadrangle name of the currently displayed grid quadrangle and whether a new grid quadrangle name has been entered. If so the gridname is updated and the data subsystem shifts or zooms to the new grid quadrangle for display. The mapping display subsystem also checks on the display options associated with the new grid quadrangle. The mapping display subsystem checks the optional display routines called for by the mapping data subsystem, options selector, and user for actuating the appropriate output devices. The mapping display subsystem performs some database manager functions in selecting and organizing the data for display on the appropriate output devices. Example optional display routines for steps 415, 417, 421 and 423 of FIG. 11 are summarized above in TABLE IV.

Step 455 offers complementary, qualitative methods to set and control display/output. Step 455 involves software control and user selection of the topical or subject matter contents of CAMLS display/output. By contrast, step 453 discriminates only on the basis of some enumerable feature of the display/output process i.e. a factor such as pixel load or text string length and not on the basis of user preference or topical content. Step 455 is phrased, however, in terms of mapping themes and overlays traditional approaches for editing and focusing cartographic content both in print and digital mapping.

Step 455 is implemented largely around the CAMLS loc/object type stamp, as embodied in the standard CAMLS data structure shown generally in FIG. 8. For example, in a typical CAMLS database, there may appear loc/object types such as hotels and motels, shops, gas stations, campgrounds, restaurants, public safety services, tourist attractions, transportation facilities, public buildings and parks, etc. The foregoing list is not exhaustive and indicates only a partial account of CAMLS loc/objects typically depicted as points on printed and digital maps. The same prepackaged CAMLS database also may have a selected sample of vector or line segment CAMLS loc/object types, such as back roads, streets, roads and highways, railroad lines, transmission lines, political boundaries, topographic line data e.g. terrain elevation lines, planned or historical routes, lines of position for navigation and piloting, hiking trails, trajectories, rivers and streams, and others. Moreover, this exemplary CAMLS database may include at least some of the following polygon loc/objects types: water bodies, areas covered with characteristic vegetation (or possessing some other natural attribute), property tracts, townships, counties, nations and other political units, market areas, etc.

Step 455 provides for user selection and automatic prioritization for the purposes of output/display primarily among loc/object types, such as the sample listed above. Step 455 can also sort on technical, rather than topical, features of CAMLS loc/objects such as points versus vectors versus polygons or the other characteristic elements in completed CAMLS data structures, i.e., the Input Device or Time+ Date stamps. Sorting on these latter characteristics facilitates giving priority for CAMLS display/output on the basis of input source (e.g. GPS sensor) as well as input age i.e. the latest versus next latest versus first in time and other temporal factors.

Such sorted groups of CAMLS loc/objects having similar or identical CAMLS loc/object types, or Input Devices, or Times+ Dates constitute different mapping themes or overlays in conventional terms used by print and digital cartographers. Step 455 can be implemented, using various sorting or classification strategies from simple schemes including certain topics while excluding other loc/object types all together to elaborate prioritization algorithms. A preferred embodiment of CAMLS software maintains editorial control over display/output utilizing an algorithm combining the quantitative and qualitative approaches of steps 453 and 455.

In addition, a preferred embodiment of CAMLS software achieves editorial control by sorting certain loc/objects for voice/text output in association with a graphic mapping display reserved for other loc/objects, as part of steps 453 or 455. For example, CAMLS PDAs can be programmed to show roads and hotel locations on screen while simultaneously talking to the user, through audio voice output, about local tourist attractions and shops.

One feature of the CAMLS software invention provides integrated printed maps and digital displays in which loc/objects sorted by type are printed onto mylar or other transparent media. Step 455 facilitates the printing of a transparent overlay of hotel locations for example, consisting of the list of hotel locations for a particular unique CAMLS grid quadrangle selected for display. Contemporary noncomputerized graphic arts technology for printed maps makes extensive use of such printed transparent map overlays. Step 455 also enables the CAMLS software to print out hardcopy mylar hotel location overlays or thematic maps printed on opaque paper or other media. The resulting printed map output concentrates on selected mapping themes or overlays for specified CAMLS grid quadrangles for example, hotel locations and facilities.

Step 455 facilitates user selection of map themes or overlays. For example, while driving in a car, CAMLS users will usually prefer a display concentrating on the road ahead, detour, exit, intersection and hazard information. But, when users stop in some particular place, they can then use step 455 to command display or output of information on the surrounding places to stay, shop, play and eat instead of information on the road ahead and driving conditions. Automated switching can be provided between a display focused on road information and a display focused on local hotels, restaurants and other attractions.

Step 457 facilitates simple sequencing plus more elaborate temporal arrangements of CAMLS output/displays. Step 461, even when moderated by steps 453 or 455, can result in a cluttered graphic display of all of the CAMLS available loc/objects related to the current grid quadrangle at once. Step 457 displays selectable loc/object types in a revolving temporal series. For example, a CAMLS equipped PDA, with access to a comprehensive set of databases, displays streets in some city area the user is about to visit. Instead of an overly cluttered simultaneous display of all points of interest to the user, step 457 enables the CAMLS software to implement sequences of topical displays, one at a time. For example, a user can display local hotels and motels for 30 seconds, then restaurants for 30 seconds, then cultural events for 30 seconds, etc. The display sequence can repeat automatically. The user can elect to skip ahead or jump back to the 30 second display about the topic currently of greatest interest.

This revolving or sequenced mode of display has many advantages. Cluttered hard to read maps are avoided on screen. The user can compare local hotels, then browse shops and restaurants, in a manner that is consistent with everyday thought patterns and immediate goals for organizing one's personal agendas on a trip. Step 457 allows the business traveler to choose a revolving display series related to work objectives. The leisure traveler can select a different set of revolving displays that focus more on culture and recreation. Step 457 also enables the user or the CAMLS software to alter or adjust the duration and order of the revolving display. Step 457 facilitates user selection or automated subprograms to implement output/display of greater or lesser topics in sequences or temporal series with topical variability across the spectrum of available CAMLS loc/object types in conjunction with step 455. Furthermore, the user or an automated CAMLS subprogram can use step 457 to implement a mix of graphic visual display and voice output within a sequence of topical output/display. For example, hotel locations can be shown on screen for 30 seconds accompanied by audio voice output of local restaurant information.

Step 457 provides for the programming within the CAMLS software of complex travel scenarios and mapping scripts. The fundamental procedure is a simple sequential output/display of a list of named CAMLS grid quadrangles or groups of adjacent or related grid quadrangles. For example, business users can select company addresses in order to prompt a revolving display of corresponding CAMLS grid quadrangles within 457. The order of the output/display can be alphabetical, by proximity to the user's present location, or in some other order determined by known factors such as the company's financial resources or history of purchasing from the user's company. Step 457 can generate similar lists of grid quadrangles for output/display along specific computer or prerecorded routes.

Thus, the user or an automated CAMLS subprogram is enabled to play, or display, logical or even random sequences of grid quadrangles such as a series of maps on a planned or historical route. Step 457 facilitates the display of each map or grid quadrangle on screen for a specified time. Alternatively, or as an audio accompaniment to a graphical display of a sequence of maps or grid quadrangles, step 457 can be combined with step 445 to permit voice output of information on selected topics related to grid quadrangles or displayed maps in series. Moreover, step 457 facilitates user selection or automated manipulation of the logical or temporal order of the display/output sequences. Grid after grid, or map after map, can be the subject of graphic display, or other output, in accord with the order of travel, reverse order of travel, according to a ranking or priority chosen by the user or computed by an automated CAMLS routine, or according to criteria of proximity to a specified location, or by a variety of other logical, or contingent, sequences.

Complex travel scripts or map scenarios can be constructed using routine procedures from step 457 in combination with other CAMLS display/output routines. For example, presentation of a proposed vacation itinerary made by CAMLS software can be programmed to "zoom" to a more distant map scale and then to "speed" over long stretches of anticipated highway travel which lack sights to see and places, topics, or loc/objects of interest. But, when the travel scenario or presentation "arrives" at a place of special interest, the rate of apparent travel slows down, and the display zooms down to closer scale maps, revealing more local detail. Once at places of special interest, this step 457 map presentation can then be interrupted by video of local sights and sounds, a menu to allow interactive audience choice over the topical display/output, an overdrive button so users can "speed" on to the next place of interest, a reservations menu to book local accommodations and get tickets for sporting or cultural events plus transportation via agents or communications links, etc. Step 457 facilitates display/output of travel scripts and map scenarios by processing lists of maps in combination with other CAMLS display/output routines.

Step 457 also plays a critical role in tracking and routing vehicles travelling in the field. Using GPS, CAMLS equipped devices are also capable of performing real time route calculations. In the event the vehicle strays off of the prescribed course, step 457 with other CAMLS routines, such as steps 463 and 465 facilitates the display/output of corrective action showing the user how to resume the original route. Step 457 can also determine on the fly how to take a new optimal route in response to the off course position data. Position information can be sensed by GPS or equivalent location detectors.

In the case of straying off a prescribed course, step 457 displays where the user made a wrong turn and displays maps of alternative corrective actions. The computation of a new optional route or a plan to backtrack to resume the original course uses steps 463 and 465. The general process for course corrections is as follows. First, deviation from a prescribed course is detected by a subprogram monitoring conformity of route actually taken with prescribed route. Second, along with altering the vehicle operations, the CAMLS system responds to deviation from prescribed course by making the vehicle's current off-course position the starting point for a new route calculation. Using a routing algorithm, or a pre-recorded list of routes, steps 463+465 compute optional routes back to the prescribed course or onto the original destination. Step 457 allows the user to display these new corrective courses as a sequence or series of maps or guides to aid in deciding how to proceed.

Step 459 governs user selection and automated programming of the parameters by which CAMLS output/display is interrupted, or shared, by loc/objects competing for time and space on screen or other outputs. The issue generally resolved by step 459 routines is whether the ongoing graphical map display or other output of location information must give way in some degree to alarms, signals, communications, text messages, even software operations, etc. These signals have been assigned a location through operations such as steps 376, 374 & 377 in the table of optional location assignment routines, TABLE II. Step 459 facilitates a range and combination of responses as follows: (1) full and continuing interruption of the ongoing output/display; (2) a priority signal or alarm giving the user the option to interrupt ongoing display/output; (3) sharing a low priority portion of the screen space; (4) a delayed, short term interruption fit into the next pause in audio output; (5) memorizing text messages or saving of an operation for later review or implementation; or (6) ignoring or declining potential interrupts all together.

Step 459 plays a role even on CAMLS devices not equipped with position sensors such as GPS. Located screen sharing can take place just because the user or an automated function chooses to display a certain CAMLS grid quadrangle or group of grid quadrangles, or a geographical point or line or area to which a particular text message, or a specific operation, has been assigned. Located screen sharing can also be used for advertising. Further applications of step 459 require position sensor data from GPS or the equivalent. Thus, the user entering or leaving a specified location, with her GPS equipped CAMLS device, becomes a potential trigger for alarms, messages or operations modulated by step 459. In other words, a subprogram can employ step 459 to allow more interrupts and screen sharing to displace basic road information display/output while a vehicle equipped with CAMLS and GPS is proceeding along a stretch of uneventful highway, as determined by distance from exits, hazards and detours. The subprogram encourages interruptions and screen sharing also (1) when GPS has detected the vehicle stopped for a time and (2) when GPS has detected travel in an area frequented by the user by comparing current position to travel history kept in memory.

Step 461 provides routines for the display/output of CAMLS loc/objects. Loc/objects are broadly defined to include not only cartographic representations of natural geographic entities such as rivers or towns, but also abstract phenomena such as political boundaries or planned routes, lines and polygons, point data, and even unsituated documents data or functions which have been assigned specific geographic locations. Conceptually, step 461 goes forward "mindlessly" proceeding to display graphically or describe with voice output all of the CAMLS loc/objects available in all accessible databases or new input. On more powerful CAMLS devices such as advanced PDAs and laptops, and desktop PCs with access to abundant CAMLS databases and inputs, step 461 typically is implemented in restricted form to narrow the possible range of loc/objects which are eligible for concurrent display. Steps 453, 455, 457 & 459 function to select, sequence and prioritize the loc/objects available for output/display.

Simpler CAMLS technologies such as handheld location lookup devices, pager style communicators and lesser PDAs, have restricted access to geographic databases, structured or prepackaged CAMLS data records, and display/output limits imposed by physical hardware constraints. For the lesser CAMLS devices, step 461 works well by itself, or jointly with steps 445 and 451. In such application, constraints on the display/output of loc/objects are effectively built in to the data and hardware.

Step 411 in FIG. 11 facilitates text or voice output of the current gridname in response to corresponding input from GPS or equivalent position sensors. Step 411 names the unique CAMLS grid quadrangle currently occupied by the GPS equipped CAMLS device.

A momentary, pinpoint graphic display of current position, derived from GPS or its equivalent, can be achieved by step 461 treating each successive position data input as an individual loc/object. GPS equipped CAMLS devices can utilize step 463 to compute, output or display position information derived from computing relationships between the most recent position input and the previous position data input. This enables determination of speed, travel direction and recordation of the path of travel. Step 463 also handles any display of multiple positions e.g. as shown in FIG. 2. Step 463 may also provide GPS altitude data. The altitude data has utility not only for aircraft applications but also to detect elevations on earth.

In preferred CAMLS embodiments, particularly in vehicle applications and related travel planning, step 465 provides display or output related to so called routing algorithms, or line segment route descriptions either prerecorded in memory or input into the CAMLS software. Step 463 prompts text or voice output of names of CAMLS grid quadrangles and related information on a route, with step 445 as well as graphic display of routes. Step 465 is not limited to routes but covers a broad range of cartographic vector, line segment, even polygon data. Road networks can be digitized as polygons. Step 465 presents a nonexhaustive list of specific geographical phenomena readily represented as line segments or related digital geometric forms. Step 465 also covers abstract cartographic line data such as political boundaries, line and fill graphical entities representing the broadest range of demography, weather, flora and fauna, terrain, hydrography and man made phenomena.

The review of TABLE IV display/output options by the mapping display subsystem includes checking whether graphic enhancements are to be displayed augmenting the background or context in the current grid quadrangle. Second, the mapping display subsystem 213 determines what loc/objects are to be displayed in the selected grid quadrangle and whether further text messages should be included. After determining what other map details are enabled for display, the mapping data subsystem checks whether any classes of loc/objects or map details should specifically be removed to "de-clutter" the display at the command of the user. Subsystem 213 also checks whether any of the voice output options are enabled.

TABLE IV optional display/output routines are readily combined by automated subprograms. For example, in the case of a user traveling with a CAMLS GPS equipped PDA, a subprogram automatically modifies and adjusts the displayed mapping detail as a direct function of velocity and direction of travel. This subprogram is implemented as an aspect of the workings of the FIG. 11 options loop involved in optional display routines. For example, the list of display procedures and routines for this display options loop appears in a general form at steps 415, 417, 421 and 423. Automated changes in the subject matter of the CAMLS output/display as a function of GPS sensor data on rate of speed are accomplished by a combination of steps 455 and 463.

One routine concentrates on displaying information on moving vehicle position, direction of travel, speed and details concerning the road ahead pertinent to driving. Another of the procedures in the display OPTIONS loop de-emphasizes or eliminates display of vehicle position and related information opting instead to display information on facilities and attractions surrounding the current position of the PDA with GPS e.g. hotels, restaurants, campgrounds, tourist attractions, shops, hospitals and police stations. The road ahead versus surrounding displays are straight forward applications of step 455. GPS determined switching is a step 463 routine. Step 463 can also focus display in front of the direction of travel, de-emphasizing display behind or off to the sides of the present apparent travel direction. Consistent with concepts that the listed procedures in every options loop are selectable and programmable through the options selector 215, the GPS equipped PDA can switch back and forth quickly between two different display routines such as the alternative routines described above. The final step in picturing this display subprogram is to visualize that the options selector 215 is programmed to switch from one routine to another depending on the velocity and direction of travel of the GPS PDA user's vehicle.

Suppose the user and the GPS equipped PDA are in motion, as determined by the GPS measurements of immediate velocity. The options selector 215 is automatically adjusted to concentrate on displaying position, speed and the road ahead. What is ahead is determined as a function of GPS derived data on direction of travel. This adjustment is accomplished, within the FIG. 11 display options loop, by enabling the vehicle motion display option while disabling the alternative option which favors the display of facilities and attractions surrounding the user's current position. But, whenever the user and CAMLS GPS PDA stop or slow down below a preset speed, then the proposed subprogram proceeds to readjust the option selector 215 automatically. More particularly, the subprogram switches between alternative routines on the programmable list of display options as implemented by the options loop, illustrated in FIG. 11 at 415, 417, 421 and 423. As a result, while at rest or slow speed mode, the display shifts away from information on vehicle position, speed and travel direction in order to look around at surrounding hotels, restaurants and the like.

In summary, while the user is driving along at travelling speed, the PDA focuses on the road ahead and the motion of the vehicle. However, when the user stops or slows down, then the PDA display is preprogrammed to readjust itself and display more information on local facilities and attractions including campgrounds, shops, tourist attractions, parks, hospitals, police stations, etc. As soon as the user returns to her car, however as a result of starting to move or achieving a preset speed, the subprogram readjusts the display options again such that the GPS PDA map display resumes its concentration on vehicle motion and road ahead information.

MENUS. DISPLAY/OUTPUT TABLES V–VIII. FIGS. 15A–G

TABLE V illustrates an example of a primary menu for the Display/Output Options available through the optional display routines listed in TABLE IV and the mapping display subsystem flow chart illustrated in FIG. 11. The main menu of TABLE V permits user selection among a number of submenus or subsidiary menus, three of which are shown by way of example in TABLES VI, VII, and VIII. The subsidiary menus shown by way of example in TABLES VI–VIII are selected from the main menu using a menu bar, entering commands on the keyboard, clicking on icons, etc. Some sub-submenus may also be provided, selected similarly from the subsidiary submenus of TABLES VI–VIII.

In the examples of TABLES V–VIII, the submenu of TABLE VI is selected from the main menu of TABLE V by placing the menu bar over "5) MAPPING OVERLAYS" and pressing a key, entering a command, or clicking with a mouse at the appropriate icon or location. The submenu of TABLE VI provides a selection of the available mapping overlays for supplementing the display of a selected grid quadrangle. The submenu of TABLE VII is selected from the main menu by placing the menu bar over the selection "8) GPS DISPLAY/OUTPUT" and pressing a key, entering the appropriate command, or mouse clicking, etc. The submenu of TABLE VIII is selected from the main menu by placing the menu bar over "6) SEQUENCES/SCRIPTS" and pressing a key, entering the appropriate command, mouse clicking, etc. The submenu of TABLE VIII provides a selection of the travelogs and travel information available for a selected route.

Figure 15A:
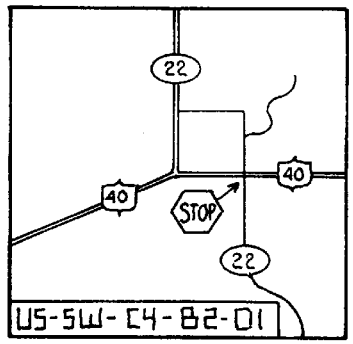
FIGS. 15A and 15B illustrate computer displays or hardcopy outputs for dialog box selections from the Loc/Object type submenu of TABLE VI, one of the submenus of the Display/Output Options main menu of TABLE V.

FIG. 15A illustrates an example of user selection from the submenu of MAPPING OVERLAYS in TABLE VI. Using step 455 of TABLE IV the user has selected the submenu entry "ROADS FOR DRIVING" displaying the available roads for driving in the selected grid quadrangle US-SW-C4-B2-D1. FIG. 15A illustrates the selected unique CAMLS grid quadrangle with the road information useful for motor vehicle operation.

Figure 15B:
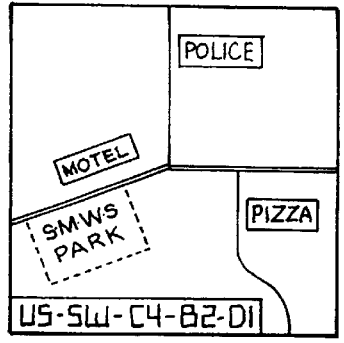

FIG. 15B illustrates MAPPING OVERLAYS of four of these selections from the submenu of TABLE VI including "EATING PLACES", "PLACES TO STAY", "PUBLIC SAFETY", and "PUBLIC PARKS". These overlays selected from the menu of TABLE VI are displayed against a simple road network background. The user can readily switch or toggle between the two alternative digital overlays illustrated by FIGS. 15A and 15B. The user can also readily print out a hardcopy of the maps illustrated in FIGS. 15A and 15B. In each of the examples of FIGS. 15A and 15B, the user cross references, coordinates, and correlates the display of the unique grid quadrangle US-SW-C4-B2-D1 with the corresponding grid quadrangle of a CAMLS printed map for reference to other surface features and mapping features.

Figure 15C:
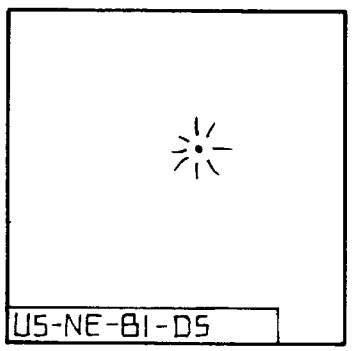
FIGS. 15C, 15D, 15E and 15F illustrate computer displays or hardcopy outputs for dialog box selections from the GPS Display/Output submenu of TABLE VII, also one of the submenus of the Display/output Options main menu of TABLE V.
Figure 15D:
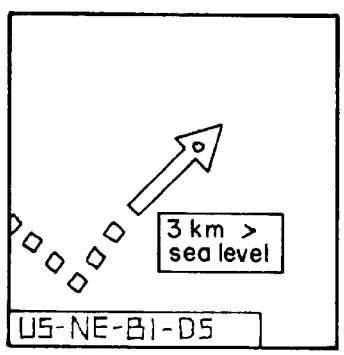

FIG. 15C illustrates the selection "DOT-IN-A-BOX" from the submenu for GPS DISPLAY/OUTPUT of TABLE VII. FIG. 15C provides a simple indication by means of a dot of the location of a user with a GPS sensor in the unique grid quadrangle with the grid name US-NE-B1-D5. FIG. 15D illustrates the result of selection of the submenu entries "TRAVEL DIRECTION", "CURRENT SPEED", "BREADCRUMBS", and "ALTITUDE/ELEVATION" from the submenu for GPS DISPLAY/OUTPUT of TABLE VII. Travel direction is indicated by direction of the arrow, current speed is indicated by the length of the arrow, the "breadcrumbs" or dots illustrate the previous path of the user, and altitude/elevation is indicated in a box accompanying the arrow. In each of the examples of FIGS. 15C and 15D the user coordinates and correlates the display of the unique grid quadrangle US-NE-B1-D5 with the corresponding grid quadrangle of a printed CAMLS map for reference to surface features and mapping features shown in greater detail on the printed map. The user can also switch or toggle between FIGS. 15C and 15D as alternative digital display formats. Hardcopies of the respective displays illustrated in FIGS. 15C and 15D can also be printed from an available printer. The CAMLS software can be programmed to switch automatically between the displays of FIGS. 15C and 15D for example according to whether the user or the user's vehicle is moving or at rest. Such an operation uses step 463 of the routines listed in TABLE IV.

Figure 15E:
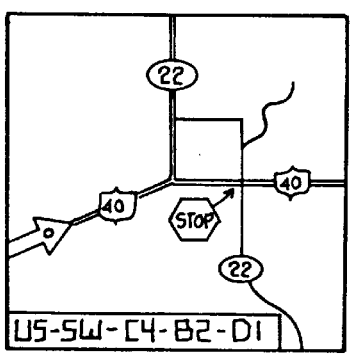
Figure 15F:
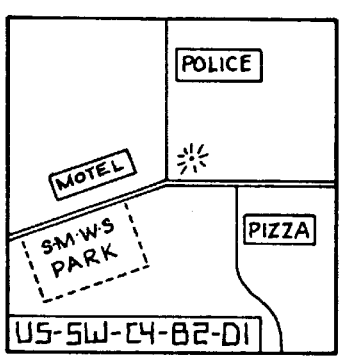

FIGS. 15E and 15F illustrate alternative digital displays for the unique grid quadrangle US-SW-C4-B2-D1 selected from the menu entries "ROAD EYES AND EARS" and "LOOK ABOUT" from the submenu GPS DISPLAY OUTPUT of TABLE II. As shown in FIG. 15E the selection "ROAD EYES AND EARS" focuses on critical driving information along the road ahead giving speed, travel direction and position with reference to identified roads for driving. On the other hand FIG. 15F shows user vehicle location only by a simple blinking dot when the user vehicle is at rest. The "LOOK ABOUT" selection then focuses on items of interest in the surrounding area such as restaurants, motels, parks, etc. A subprogram of the DISPLAY/OUTPUT OPTIONS can automatically switch between the displays of FIGS. 15E and 15F according to whether the user's vehicle is in motion or at rest. In either instance the user can coordinate and correlate the displays illustrated in FIGS. 15E and 15F with the correspond grid quadrangle US-SW-C4-B2-D11 of a CAMLS printed map which may show greater or lesser detail of the surrounding area and other mapping features.

Figure 15G:
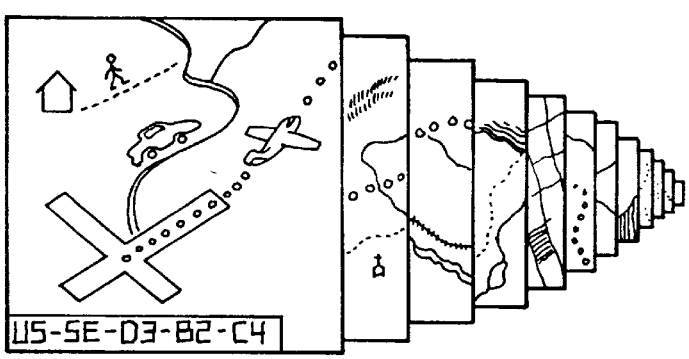
FIG. 15G illustrates computer displays or hardcopy outputs for dialog box selections from the Sequences/Scripts submenu of TABLE VIII.

FIG. 15G illustrates the capability for display of groups of maps accessed through the submenu selections "GRIDS ON ROUTE" and "MAP SERIES" from the submenu for SEQUENCES/SCRIPTS shown in TABLE VIII. This capability of effectively selecting a travelog with substantive travel information along a proposed route relates to steps 457 and 465 of TABLE IV. FIG. 15G illustrates a stack of maps representing a collection of grid quadrangles, windows or tiles along a selected route. The composition and script for such a map sequence is therefore composed by the user selecting and delineating a route. Such map sequences and series can be organized into complex travel scenarios for education, entertainment, travel, research and planning. Such map sequences and scripts can be implemented by digital display or by print media hardcopy etc. Text, and voice or audio outputs, videos and animations can supplement the graphic display and for some aspects text and audio can substitute for the graphic display.

TABLE V

DISPLAY/OUTPUT MAIN MENU

DISPLAY/OUTPUT OPTIONS

1) TEXT DISPLAYS
2) HARDCOPY OUTPUT
3) ANALOG INTERFACE
4) LOCATED OPERATIONS
5) MAPPING OVERLAYS
6) SEQUENCES/SCRIPTS
7) ROUTES AND LINES
8) GPS DISPLAY/OUTPUT
9) TRAVEL INFO

TABLE VI

LOC/OBJECT TYPE SUBMENU #5

5) MAPPING OVERLAYS

FLORA/FAUNA
ROADS FOR DRIVING
EATING PLACES
PLACES TO STAY
PUBLIC SAFETY
PUBLIC PARKS
TOPOGRAPHY
TRANSPORTATION
ADDRESSES

TABLE VII

POSITION SENSOR SUBMENU #8

8) GPS DISPLAY/OUTPUT

DOT-IN-A-BOX
TRAVEL DIRECTION
CURRENT SPEED
BREADCRUMBS
LOCATED MESSAGES
LOCATED FUNCTIONS
ALTITUDE/ELEVATION
ROAD-EYES & EARS
LOOK-ABOUT

TABLE VIII

MAP/GRID LISTS SUBMENU #6

6) SEQUENCES/SCRIPTS

SEQUENCE OVERLAYS
GRIDS EN ROUTE
MAP SERIES
COMPARE PLACES
CROW FLIGHTS
SIGHTS & SOUNDS
FACTS & FIGURES
LOCAL HISTORY
TAKE A HIKE

OTHER ASPECTS OF THE INVENTION

For business purposes, access by end-users to distributed extra mapping tools and geographical information can require a special key or encrypted code available for a fee for a specified time or on a per-use basis. In effect, such keys emulate the options selector 215, enabling and disabling procedures and routines. The keys or encrypted access codes are supplied on tangible digital media, or in the form of a password for user entry, or are dispensed from a remote centralized service bureau CAMLS network server system. Turning to a concrete example, the access to the options for conversion of other geographical data is the lock opened and closed i.e. enabled or disabled by the key. While communications links are being maintained, the options selector 215 is controlled from a remote, central service bureau to switch on and off certain other geographic data conversion routines. Or a suppressed conversion routine can be unlocked by a user entered password or a digital key as supplied on tangible media.

An alternative embodiment meters or measures the extent or duration of the end user's usage of the selected optional other geographic data conversion routines for purposes of assessing a usage fee. Metering can be done remotely when communications links are involved in the downloading of supplemental functions or map data. Internal metering on stand alone devices consists of some digital accounting and reporting subprogram for tracking the extent or duration of usage accessed by a key password or code. With respect to the objectives of interoperability and communications, these features of the CAMLS invention permit switching on and off optional CAMLS capabilities in the field, along with metering or accounting for the duration or extent of usage.

As shown in FIG. 9, another point of access or gateway for remote control, for keys and for metering usage inheres in steps 109, 119 and 129. These steps work to initiate or bypass i.e. enable or disable typing operations ultimately determinative of whether raw data packets of certain types are incorporated into CAMLS software and its standard data structures. Also, at step 105, a critical identification is made of the origin of each raw data packet or input event without which all further data processing or display within the CAMLS software would be largely impossible. Step 105, therefore also has potential as a lock requiring some form of key. Moreover, Step 105 forms a gateway at which inputs from particular input devices can be metered as well as enabled and disabled, for implementing a "fee for service" information distribution and support system.

Figure 12:
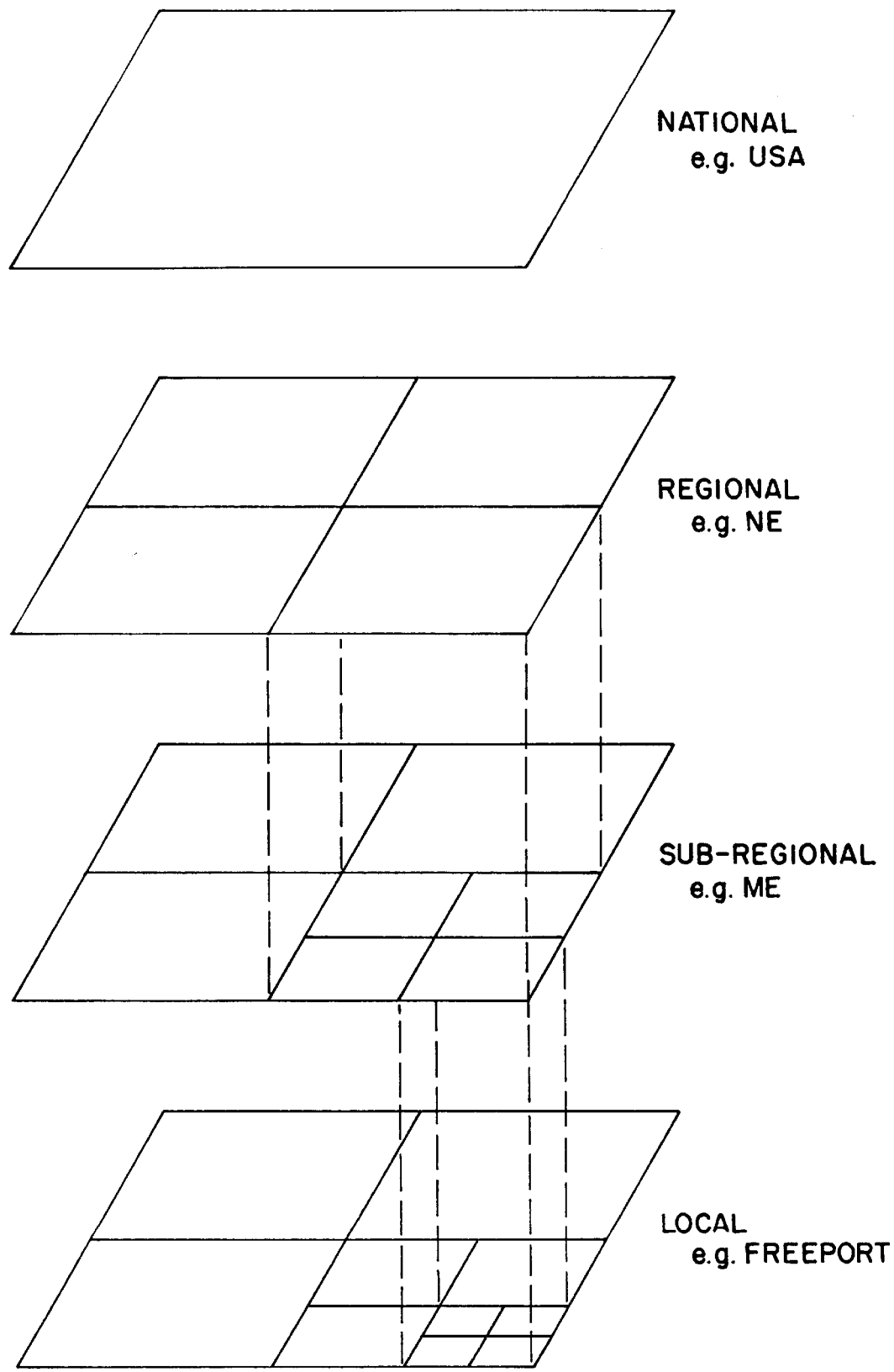
FIG. 12 is a diagrammatic perspective view showing a "tree" data structure relationship between grid quadrangles at different grid levels for "shifting" or "scrolling" between grid quadrangles at the same grid level and "zooming" between grid quadrangles at different levels.

An example tree data structure relating the grid quadrangles of different grid levels is illustrated in FIG. 12. In the example of FIG. 12, a quadtree data structure is used to relate the different levels. Of course other tree structures can be used such as hextrees and octaltrees. Another example of a quadtree data structure is set forth in applicant's U.S. Pat. Nos. 4,972,319 and 5,030,117 referred to above. In the quadtree example of FIG. 12, each grid quadrangle is divided into 4 descendant grid quadrangle at the next grid level below. Four grid quadrangles compose a single ancestor grid quadrangle in the next grid level above.

In order to shift or scroll to an adjacent grid quadrangle at the same grid level, the user or other input source merely specifies the unique name of one of the adjacent grid quadrangles and the shift is completed as set forth in the flow chart of FIG. 11. To zoom down to a greater level of detail the user or other input source specifies one of the descendant grid quadrangles at the lower level. Or, the data subsystem calculates and determines the appropriate applicable descendant grid quadrangle according to the user location, location of a specified loc/object, etc. To zoom up to a higher grid level for a larger perspective but lesser detail, the user or other input source can specify either the page number in which the current grid quadrangle is an ingredient element or the unique name of the ancestor grid quadrangle if known. Yet a fourth tree level is also shown in the quad-tree structure of FIG. 12 providing detailed local level or metro level grid quadrangles.

By way of example, a Country Atlas can be prepared at a first scale of 1:3.2M with grid quadrangles of a first level grid at a regional scale. A set of Country Regional Atlases can be prepared at a second scale of 1:800K with grid quadrangles of a second level grid at a subregional or state scale. Finally, a set of Metro Atlases can be prepared at a third scale of 1:200K with grid quadrangles of a third level grid at a local scale. In this example the grid levels are related in a hexadecimal tree data structure. Alternatively the grid levels may be viewed as related in a quadtree structure but selecting only every other generation in the quadtree.

According to various alternative embodiments of the invention, reference is made to FIGS. 1–3. In each of the embodiments of FIGS. 1–3 a personal digital assistant PDA 15 incorporates a digital computer dimension in association with a printed map 14 and atlas 10. According to one alternative embodiment, the PDA 15 can be constructed with a transparent or "see through" screen 18. Such a see through screen is available for example from Bosch Telecom of Germany under the trademark TELDIX (TM). In the preferred alternative embodiment the dimensions of the transparent screen 18 coincide with the dimensions of the grid quadrangles of the grid printed over the printed map 14. Grid quadrangles displayed on the screen 18 of PDA 15 therefore coincide in dimensions with the grid quadrangles of the printed map 14. With the see through screen, PDA 15 can be placed directly on the printed map 14. The grid quadrangle on display 18 can be aligned with the corresponding grid quadrangle on printed map 14 identified by unique name on the alphanumeric line display shown variously in FIGS. 1, 1C, 2, 3, and 3A. By this physical arrangement, the display of the location 28 of a loc/object or user location on the PDA screen 18 can be precisely correlated with a location on the corresponding grid quadrangle of the printed map 14.

According to another alternative embodiment, the graphic screen display 18 of the PDA 15 may not be used at all or may be replaced with a speaker for voice output. According to this alternative embodiment, the outputs provided by PDA 15 are a voice output sounding the name of a uniquely named grid quadrangle or an alphanumeric line display or text line display setting forth the unique name of an identified grid quadrangle as shown by way of example in FIGS. 1, 1C, 2, 3, and 3A. Step 445 provides text display or voice output of related information.

Thus the user might enter a query in PDA 15 "Where is Freeport, Me.?" or "Where is the Blue Onion Restaurant?". In response to this query the PDA 15 addresses the appropriate database, available, for example on PCMCIA cards or other database sources on memory devices, wired data links, or wireless data links and identifies the pertinent grid quadrangle at the PDA computer outputs. The unique name of the grid quadrangle is sounded by the voice output or displayed on the alphanumeric line display. Referring to the corresponding grid quadrangle on the printed map 14, the location of Freeport, Maine can be readily identified. With respect to the Blue Onion Restaurant, additional queries may be posed by the user operating within the selected grid quadrangle to obtain address location, current specials for the day, and other pertinent information afforded the traveler.

Figure 13:
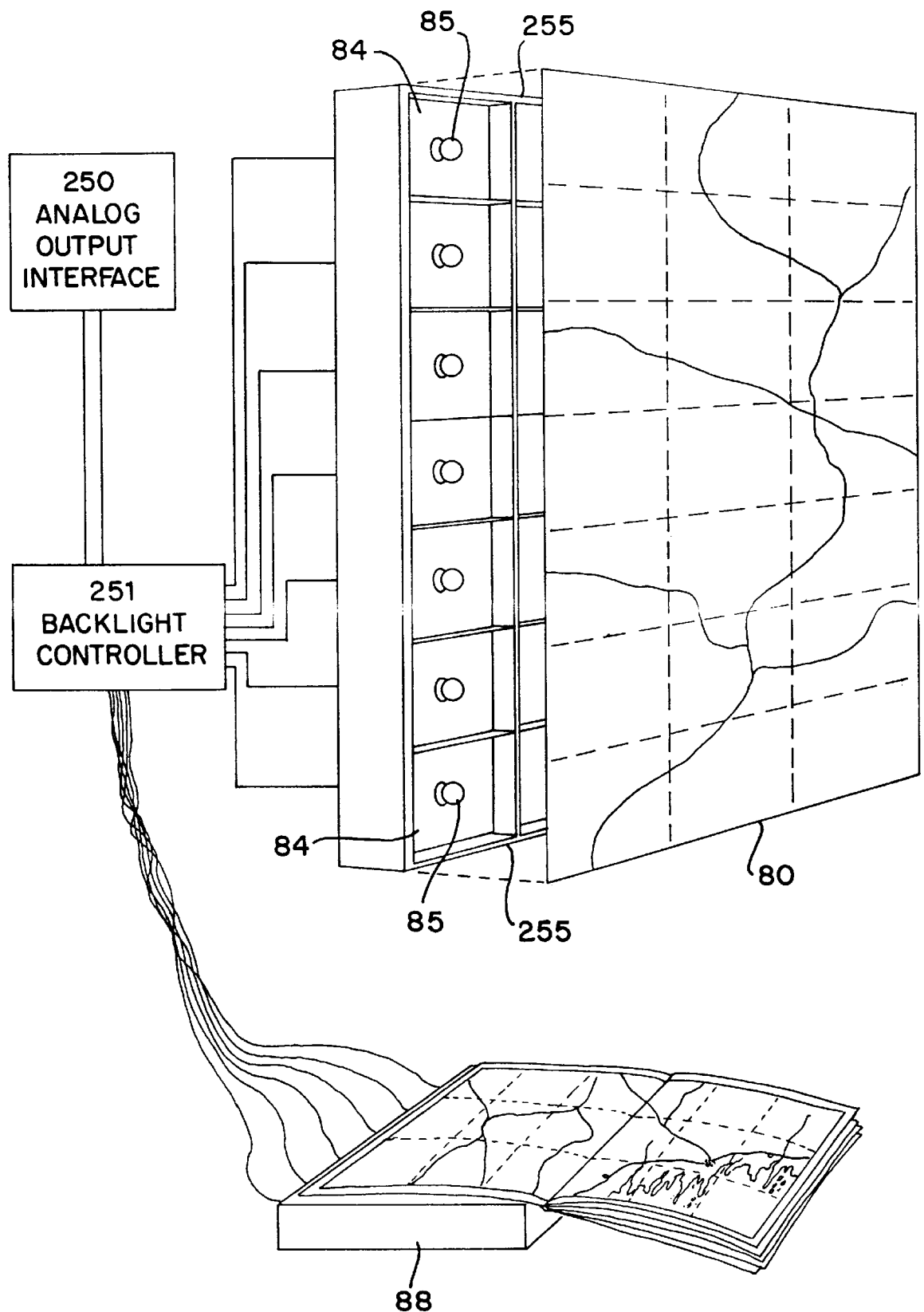
FIG. 13 is a diagrammatic perspective view partially exploded of another CAMLS in which the printed map is in the form of an enlarged backlighted wall map display for example for use at a command and control headquarters for tracking fleets of vehicles through a multi-grid area.

As previously noted the printed maps may take the form not only of paper maps and other sheet media presentations, but also projections from the printed map or other sheet media. For example, a wall map can be provided at an enlarged scale by suitable projection optics, for example for tracking fleets of vehicles. According to another example as shown in FIG. 13, an enlarged printed map 80 on paper, transparent sheet, or other light transmissive medium can be back lighted by a light box 82 covering the area of the map 80. The enlarged translucent map 80 represents the printed map or other fixed media component of the system. The light box 82 is divided into separate light compartments 84 each with its own light source 85 controlled by the back light controller 251 and analog output interface 250 previously shown in FIG. 7. Selective back lighting or illumination can be used to highlight a relevant or selected grid quadrangle for example for tracking a vehicle of a fleet of vehicles. A smaller back lighted map book 88 is also shown. Step 447 of TABLE IV provides the analog or projected outputs.

Figure 14A:
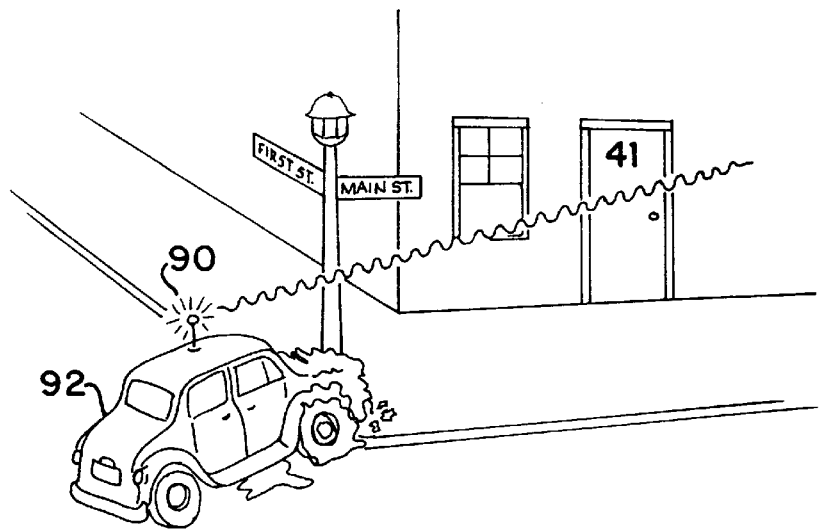
FIG. 14A is a simplified diagrammatic view of an accident scene for a vehicle having a GPS CAMLS alarm system actuated by the accident impact to initiate wireless communication of emergency "geocoded" accident location data.
Figure 14B:
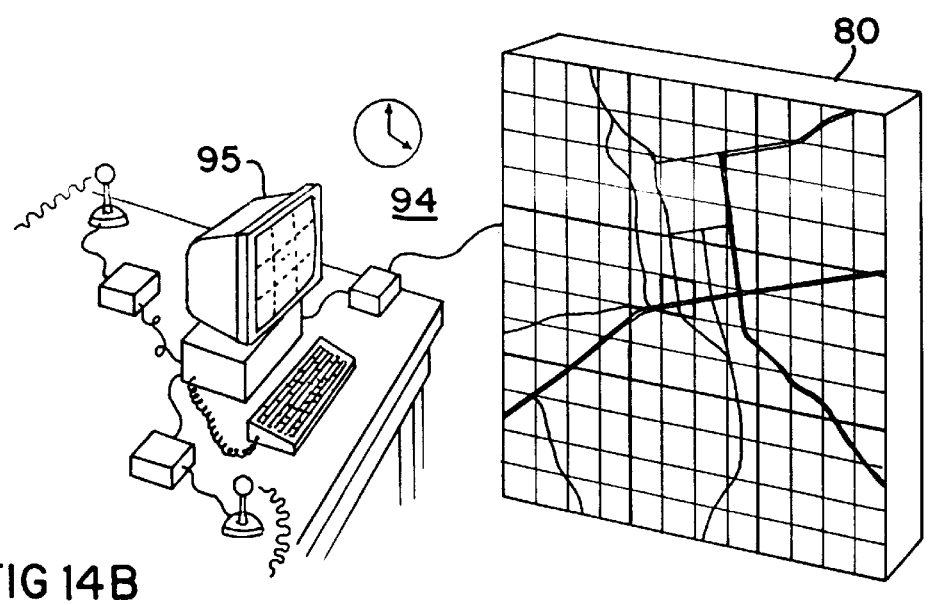
FIG. 14B is a simplified diagrammatic view of the central dispatcher headquarters with a CAMLS system including the backlighted translucent wall map of FIG. 13, receiving the emergency communication and calling a tow truck.
Figure 14C:
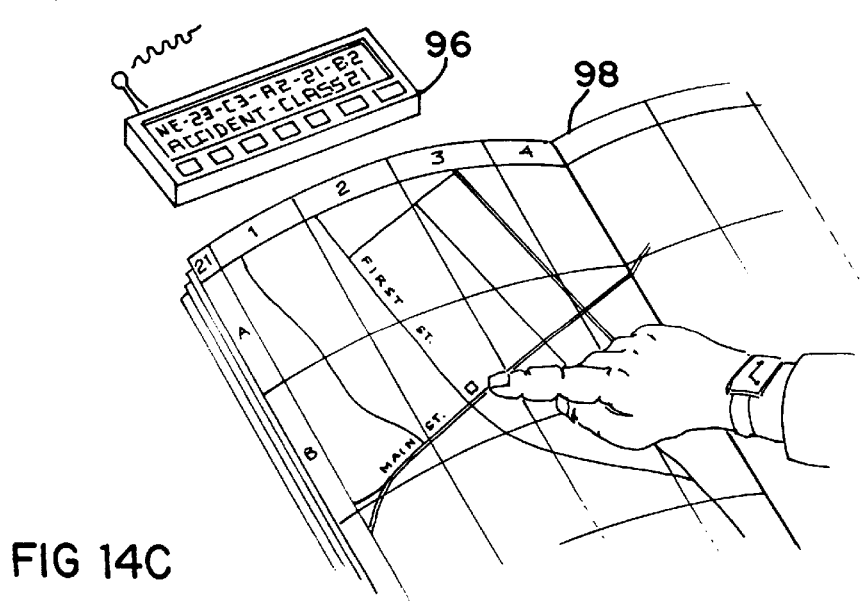
FIG. 14C is a simplified action view of the tow truck operation with a simplified CAMLS system checking the corresponding grid of the accident location on a printed map.

A communications application of the CAMLS system for an accident location and response system is illustrated in FIGS. 14A–14D. As shown in FIG. 14A an in-vehicle alarm system 90 is actuated by the accident impact of vehicle 92. The in-vehicle alarm system 90 can be actuated e.g. by means of an airbag type sensor. The alarm system transmits GPS type position data along with an emergency signal indication to a central dispatch office 94 illustrated in FIG. 14B. This is an example of the optional display routines set forth in steps 449 & 459 of TABLE IV.

The central dispatch office 94 receives the emergency signal and displays location of the accident based on transmitted GPS data on a desktop monitor 95 and on a back-lighted wall map 80 of the type illustrated in FIG. 13. The central office can of course make a hardcopy from a printer for record keeping purposes or for circulation. The central dispatch 94 also transmits the accident location data to a tow truck equipped with a CAMLS pager type receiver 96 illustrated in FIG. 14C, an example of step 445 of TABLE IV. Alternatively the tow truck may incorporate an in-vehicle FAX machine for downloading a map of the accident scene.

The tow truck pager 96 receives the accident location data and displays it in the form of extended text and name along with characterization of the emergency. The tow truck operator uses the extended grid quadrangle name with a CAMLS printed map 98 to ascertain the location of the accident.

Figure 14D:
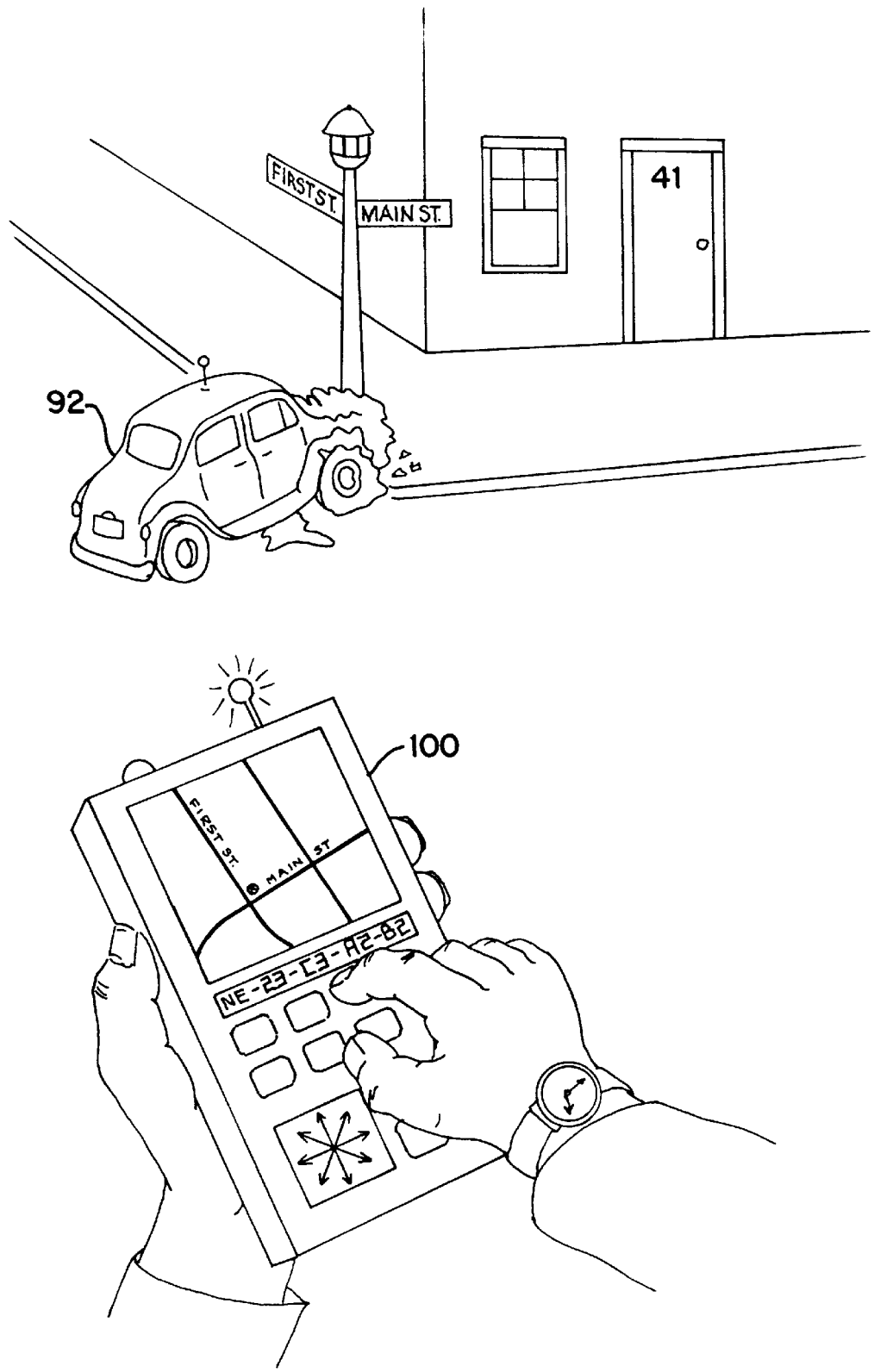
FIG. 14D is a simplified action view of an alternative embodiment showing a CAMLS PDA user at the accident scene "geocoding" the accident scene location for transmission of position data to the central dispatch office.

According to an alternative embodiment illustrated in FIG. 14D a police officer or other witness to the accident uses a CAMLS PDA 100 either with GPS for automatically geocoding the accident location, or without GPS manually geocoding the accident scene. The accident location data is then communicated via wireless communications link such as an FM communications link to the central dispatch office 94 of FIG. 14B. The police officer may at the same time be correlating the grid quadrangle of the accident location shown on the PDA display with a corresponding grid quadrangle of a CAMLS printed map providing additional information about the accident scene.

In the case of manual geocoding, the PDA can be programmed to place a cursor at the accident location. The user then pushes a geocode button for geocoding the accident scene by latitude and longitude coordinate location and grid quadrangle name or gridname of the grid quadrangle in which the accident scene is located.

According to a further alternative embodiment illustrated in FIG. 14E the locus of the accident is geocoded by hand by a witness or observer of the accident. The witness or observer 100 marks the locus of the accident with a pen or pencil 102 on a CAMLS printed map 104. The printed map 104 is of course encoded with the grid quadrangles of the CAMLS grid system for identifying the location of the accident by gridname. As shown on the watch of observer 100 the accident location is geocoded by hand with a pen at approximately 3 P.M.

Figure 14F:
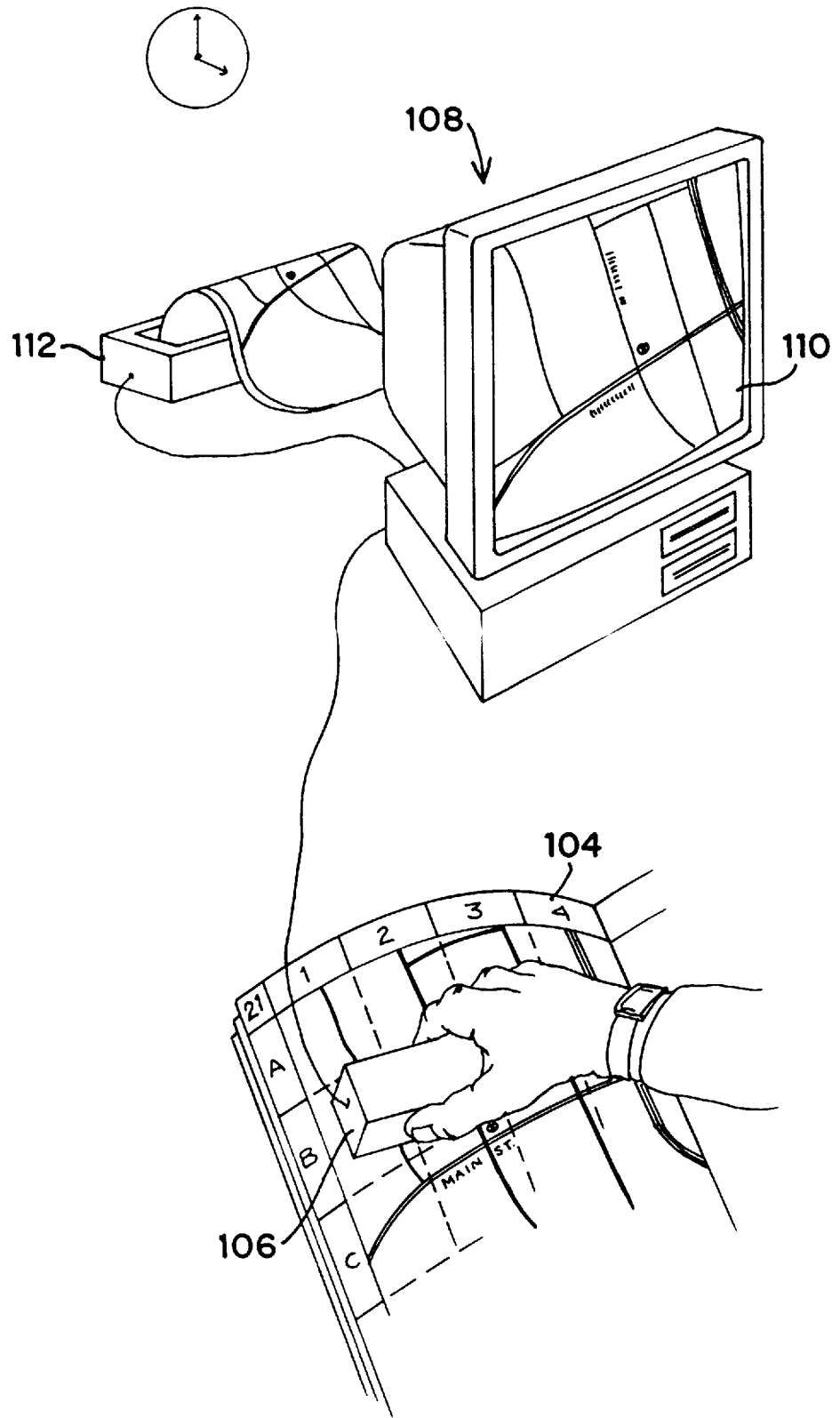
FIG. 14F is a simplified diagrammatic view of a central headquarters location where the indicia marking the accident location on the printed map are scanned into the central computer database along with sufficient context from the corresponding grid quadrangle of the printed map.

Subsequently at 5 P.M. a handheld scanner device 106 is used to digitize the geocoded accident location into a CAMLS computer system such as a desktop computer system 108 equipped with CAMLS software as shown in FIG. 14F. The accident scene and geographical location can then be displayed on the computer display 110, stored in the computer database, and printed out by printer 112 all under the control of the CAMLS software. This is an example of steps 357 and 361, of TABLE I and step 371 of TABLE II.

While the invention has been described with reference to particular example embodiments it is intended to cover all modifications and equivalents within the scope of the following claims.

We claim:

1. A computer aided map location system (CAMLS) for assisting a user in map reading and map use comprising:

at least one printed map corresponding to a selected geographical area, said printed map depicting surface features at a particular level of detail, said printed map comprising grid lines substantially parallel with coordinate lines of a selected geographical coordinate system, said grid lines defining boundary lines of printed map grid quadrangles identified by printed map grid quadrangle names;

a first computer means having a display, said first computer means being programmed to display on said display selected display grid quadrangles identified by first display grid quadrangle names corresponding to said printed map grid quadrangle names;

at least one database of selected geographical-coordinate-locatable objects (loc/objects) storable on a memory device and readable by said first computer means, said selected loc/objects identified by geographical coordinate location in said selected geographical coordinate system, said first computer means being programmed to display on said display locations of one or more of said selected loc/objects in said display grid quadrangles corresponding to map locations of said selected loc/objects in said printed map grid quadrangles of said printed map;

a second computer means having an output programmed to indicate second grid quadrangles names for user correlation with corresponding printed map grid quadrangles.

2. The CAMLS as claimed in claim 1 wherein said second computer means includes a second display, said second computer means being programmed to display on said second display selected grid quadrangles identified by said second display grid quadrangle names for user correlation with corresponding printed map grid quadrangles;

and a data communications link between said first computer means and said second computer means.

3. The CAMLS as claimed in claim 1 wherein said second computer means is located at a location remote from said first computer means, said second computer means having at least one database of loc/objects, and said CAMLS includes a data communications link between said first computer means and said second computer means.

4. The CAMLS as claimed in claim 1 further comprising locating means couplable to said first computer means, to said second computer means, or to both.

5. The CAMLS as claimed in claim 4 wherein said locating means is a Global Positioning System (GPS) receiver.

6. A computer aided map location system (CAMLS) comprising:

a first set of printed maps corresponding to selected geographical areas, said first set of printed maps depicting surface features at a particular level of detail, said first set of printed maps substantially coinciding in geographic area with grid quadrangles of a first set of printed map grid quadrangles of substantially equal area and substantially constant scale, said first set of printed map grid quadrangles having boundary lines substantially parallel with coordinate lines of a selected geographical coordinate system and forming a first-level printed map grid, said first set of printed map grid quadrangles being identified by first printed map grid quadrangle names;

said first set of printed maps being subdivided into a second set of printed map grid quadrangles of substantially equal area and constant scale by a second level grid, wherein each grid quadrangle of said second set of printed map grid quadrangles covers a smaller geographical area than said grid quadrangles of said first set of printed map grid quadrangles, said second set of printed map grid quadrangles being defined by boundary lines substantially parallel with coordinate lines of said selected geographical coordinate system and being identified by second printed map grid quadrangle names;

first computer means having a display, said first computer means being programmed to display on said display selected display grid quadrangles corresponding to said first set of printed map grid quadrangles and to said second set of printed map grid quadrangles identified by display grid quadrangle names;

at least one database of selected geographical-coordinate-locatable objects (loc/objects) storable on a memory device and readable by said computer means, said selected loc/objects identified by geographical coordinate location, said first computer means being programmed to display on said display locations of one or more of said selected loc/objects in said display grid quadrangles corresponding to map locations of said selected loc/objects in said first set of printed map grid quadrangles and said second set of printed map grid quadrangles;

a second computer means at a location remote from said first computer means, said second computer means being programmed in a manner similar to said first computer means;

and a data communications link between said first computer means and said second computer means.

7. A computer aided map location system (CAMLS) comprising:

a first set of substantially constant-scale printed maps at a first scale depicting surface features over a specified geographical area, over a specified geographical area, said first set of substantially constant-scale printed maps substantially coinciding with substantially equal-area first printed map grid quadrangles of a first scale grid, said first printed map grid quadrangles being identified by a first set of printed map grid quadrangle names;

a first computer means having a display, a first database, and a display subsystem performing functions of a database manager, said first database comprising said first set of printed map grid quadrangle names;

said first scale grid comprising grid lines defining boundary lines of said first set of grid quadrangles, said boundary lines of said first scale grid being substantially parallel to lines of latitude and longitude across said specified geographic area and being identified in said first database by latitude and longitude location;

said display subsystem being constructed to cause the drawing and display of selected printed map grid quadrangles of said first scale grid as a first set of display grid quadrangles identified by a first set of display grid quadrangle names, said display grid quadrangles being correlated with printed maps from said first set of printed maps substantially coinciding in geographic area with said selected printed map grid quadrangles;

said first computer means comprising a user location system for generating signals corresponding to the latitude and longitude of a location of a CAMLS user, and wherein said display subsystem is constructed for displaying on said first computer means display said location of said CAMLS user on selected display grid quadrangles displayed on said display for correlation of locations with said printed maps of said first set of printed maps coinciding in geographic area with said selected printed map grid quadrangles;

said first set of printed maps comprising a second scale grid formed on said first set of printed maps subdividing each of said printed map grid quadrangles of said first scale grid into a plurality of substantially equal area second scale second printed map grid quadrangles identified by a second set of printed map grid quadrangle names, said second scale grid comprising grid lines defining boundary lines of said second set of printed map grid quadrangles, said boundary lines of said second scale printed map grid quadrangles being substantially parallel to lines of latitude and longitude across said specified geographic area; and said first database comprising said second set of printed map grid quadrangle names, said boundaries of said second printed map grid quadrangles being identified by latitude and longitude in said first database, said display subsystem being constructed for drawing and displaying on said display of said first computer means boundary lines of selected grid quadrangles of said second scale grid identified by unique name and for displaying the location of a CAMLS user on the second printed map grid quadrangles for correlation of locations with printed maps of said first set of printed maps with greater localization;

a second set of substantially constant scale maps at said second scale depicting surface features in greater detail than in said first set of printed maps over said specified geographical area, said second set of printed maps substantially coinciding in geographic area with grid quadrangles of said second scale grid for correlating said location and a route of said CAMLS user displayed on a second display grid quadrangle with locations on a coinciding printed map of said second set of printed maps; and a second database storable on a memory device and readable by said first computer means comprising latitude and longitude locatable objects (loc/objects) identified by latitude and longitude location in said specified geographical area, said display subsystem causing selected loc/objects to be displayed in displayed grid quadrangles of said first scale grid or said second scale grid for correlation with locations on said printed map of said first set of printed maps or said second set of printed maps coinciding in geographic area with said specified printed map grid quadrangles;

a second computer means;

and a data communications link between said first computer means and said second computer means.

8. A computer aided map location system (CAMLS) for assisting a user in reading and using a printed map comprising:

at least one printed map corresponding to a selected geographical area, said printed map depicting surface features at a desired level of detail, said printed map comprising grid lines substantially parallel with coordinate lines of a selected geographical coordinate system, said grid lines defining boundary lines of printed map grid quadrangles identified by printed map grid quadrangle names;

a first computer means having an output, said first computer means being programmed to identify selected grid quadrangles by selected grid quadrangle names at said output for correlation by a system user with said printed map grid quadrangles;

and at least one database storable on a memory device and readable by said first computer means, said database including selected geographical coordinate locatable objects (loc/objects) identified by geographical coordinate location, said first computer means being programmed to transmit grid quadrangle names of grid quadrangle locations of one or more specific selected loc/objects in response to user queries for user correlation with said printed map grid quadrangles;

a second computer means at a location remote from said first computer means, said second computer means comprising at least one database of information about loc/objects;

and a data communications link between said first computer means and said second computer means.

9. The CAMLS as claimed in claim 8 wherein said second computer means is located at a location remote from said first computer means, said second computer means comprising a loc/object information service bureau;

and said CAMLS includes a data communications link between said first computer means and said second computer means.

10. A computer aided map location system (CAMLS) for assisting a user in map reading and map use comprising:

a first computer means having a display, said first computer means being programmed to display on said display selected display grid quadrangles identified by first display grid quadrangle names;

at least one database of selected geographical-coordinate-locatable objects (loc/objects) storable on a memory device and readable by said first computer means, said selected loc/objects identified by geographical coordinate location in said selected geographical coordinate system, said first computer means being programmed to display on said display locations of one or more of said selected loc/objects in said display grid quadrangles;

a second computer means having an output programmed to indicate second grid quadrangles names for user correlation with corresponding first display grid quadrangle names.

11. The CAMLS as claimed in claim 10 further comprising at least one printed map corresponding to a selected geographical area, said printed map depicting surface features at a particular level of detail, said printed map comprising grid lines substantially parallel with coordinate lines of a selected geographical coordinate system, said grid lines defining boundary lines of printed map grid quadrangles identified by printed map grid quadrangle names corresponding to said first display grid quadrangle names.

12. The CAMLS as claimed in claim 10 further comprising a data communications link between said first computer means and said second computer means.

13. The CAMLS as claimed in claim 12 wherein said second computer means is located at a location remote from said first computer means, said second computer means having at least one database of loc/objects, and said CAMLS includes a data communications link between said first computer means and said second computer means.

14. The CAMLS as claimed in claim 13 wherein said data communications link permits a CAMLS user to obtain information regarding said loc/objects and waypoints and to relate positions of said loc/objects and said waypoints to said display grid quadrangles.

15. The CAMLS as claimed in claim 10 further comprising locating means couplable to said first computer means, to said second computer means, or to both.

16. The CAMLS as claimed in claim 15 wherein said locating means is a Global Positioning System (GPS) receiver.

17. The CAMLS as claimed in claim 15 further comprising a data communications link between said first computer means and said second computer means.

18. The CAMLS as claimed in claim 17 wherein said second computer means is located at a location remote from said first computer means, said second computer means having at least one database of loc/objects, and said CAMLS includes a data communications link between said first computer means and said second computer means.

19. The CAMLS as claimed in claim 17 further comprising at least one printed map corresponding to a selected geographical area, said printed map depicting surface features at a particular level of detail, said printed map comprising grid lines substantially parallel with coordinate lines of a selected geographical coordinate system, said grid lines defining boundary lines of printed map grid quadrangles identified by printed map grid quadrangle names corresponding to said first display grid quadrangle names.

* * * * *